United States Patent
Arlton et al.

[19]

[11] Patent Number: 5,879,131
[45] Date of Patent: Mar. 9, 1999

[54] MAIN ROTOR SYSTEM FOR MODEL HELICOPTERS

[76] Inventors: Paul E. Arlton; David J. Arlton, both of 1132 Anthrop Dr., West Lafayette, Ind. 47906

[21] Appl. No.: 729,184

[22] Filed: Oct. 11, 1996

Related U.S. Application Data

[63] Continuation-in-part of Ser. No. 292,719, Aug. 18, 1994, Pat. No. 5,597,138, which is a continuation-in-part of Ser. No. 233,159, Apr. 25, 1994, Pat. No. 5,628,620.

Related U.S. Application Data

[60] Provisional application No. 60/005,373, Oct. 11, 1995 and provisional application No. 60/006,006, Oct. 24, 1995.

[51] Int. Cl.[6] .................................................. B64C 27/46
[52] U.S. Cl. ............................ 416/223 R; 416/132 A; 416/134 A; 416/DIG. 5; 416/175
[58] Field of Search ........................... 416/223 R, 224, 416/228, 236, 235, 132 A, 134 A, 175, 203, DIG. 5; 244/17.11, 17.13

[56] References Cited

U.S. PATENT DOCUMENTS

| | | | |
|---|---|---|---|
| 4,392,781 | 7/1983 | Mioulle et al. | 416/223 R |
| 4,927,331 | 5/1990 | Vuillet | 416/238 |
| 4,975,023 | 12/1990 | Miura et al. | 416/237 |
| 5,137,427 | 8/1992 | Shenoy | 416/223 R |
| 5,628,620 | 5/1997 | Arlton | 416/114 |

*Primary Examiner*—Edward K. Look
*Assistant Examiner*—Richard Woo
*Attorney, Agent, or Firm*—Barnes & Thornburg

[57] ABSTRACT

A main rotor is provided for use on a model helicopter. The main rotor includes rotor blades having an inboard section and an outboard section. The inboard section includes a higher camber, thin, wide airfoils, and greater pitch and camber relative to the outboard section. The outboard section includes an average chord length that is less than the chord length of the inboard section, The rotor blades also include a blade body that is semiflexible to bend during a crash landing of the model helicopter.

67 Claims, 30 Drawing Sheets

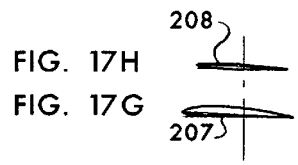
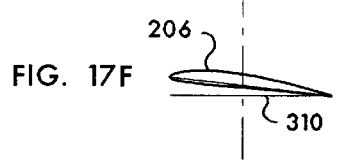
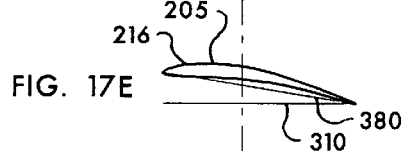
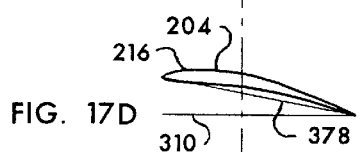
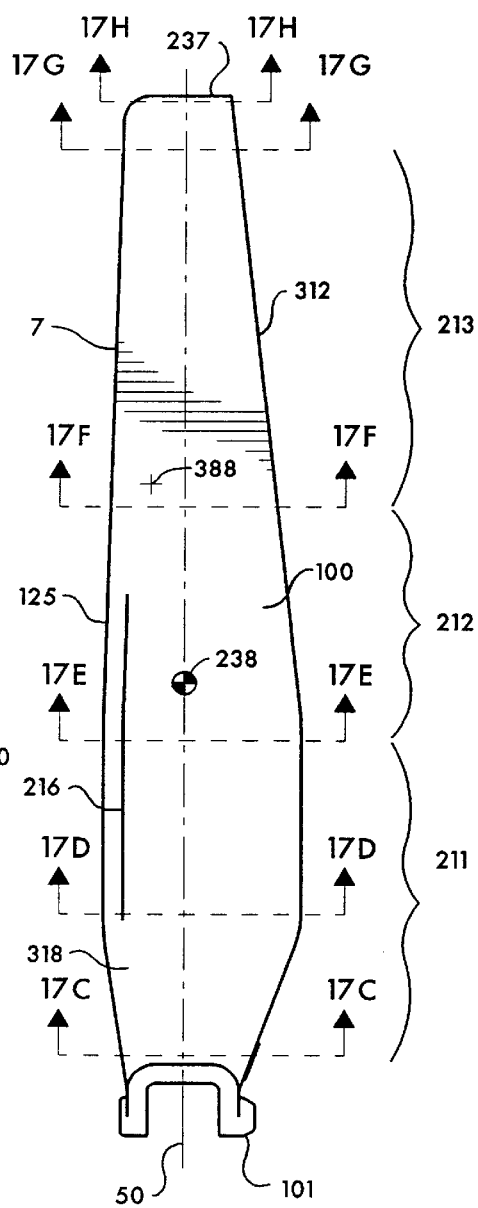
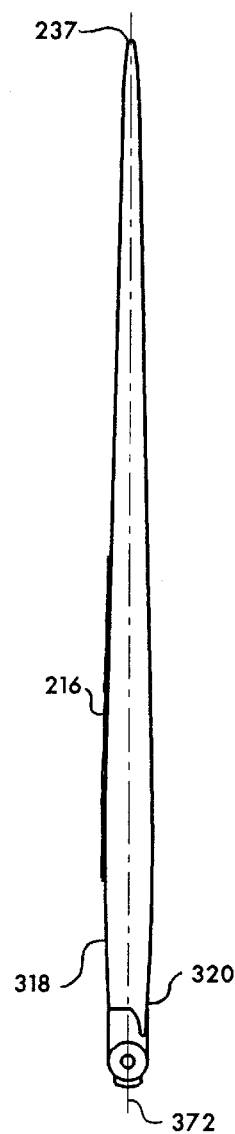
FIG. 17A  FIG. 17B

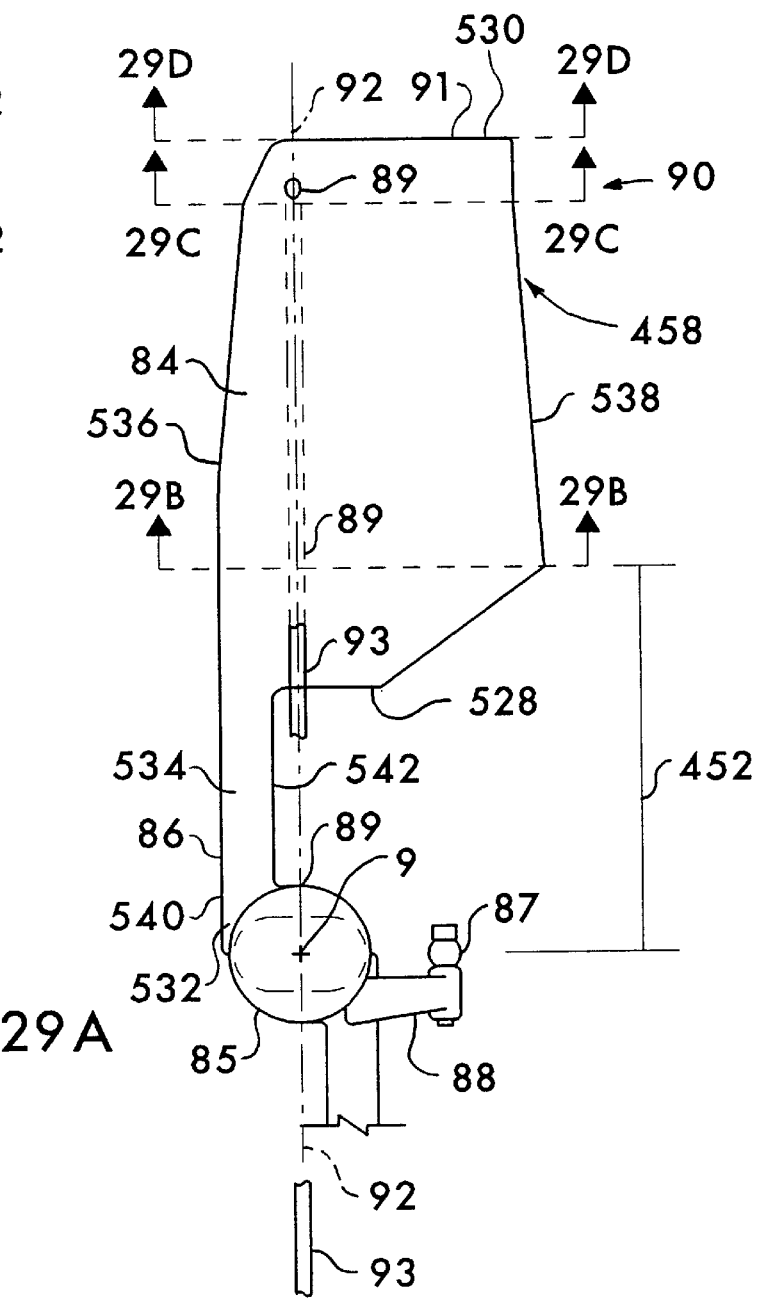
FIG. 29D
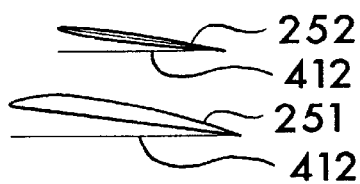
FIG. 29C
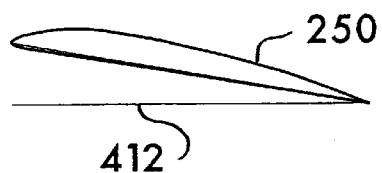
FIG. 29B
FIG. 29A

MAIN ROTOR SYSTEM FOR MODEL HELICOPTERS

This patent application is a continuation-in-part application of U.S. patent application Ser. No. 08/292,719 by Paul E. Arlton et al., filed Aug. 18, 1994 now U.S. Pat. No. 5,597,138 which is a continuation-in-part of U.S. patent application Ser. No. 08/233,159 by Paul E. Arlton et al., filed Apr. 25, 1994. now U.S. Pat. No. 5,628,620. This patent application is also a continuation application of U.S. Provisional patent application Ser. Nos. 60/005,373 filed Oct. 11, 1995 by Paul E. Arlton and David J. Arlton and Ser. No. 60/006,006 filed Oct. 24, 1995 by Paul E. Arlton.

BACKGROUND SUMMARY OF THE INVENTION

The present invention relates to thrust-producing rotor systems for model helicopters. More particularly, the present invention relates to main rotor systems for model helicopters that can withstand repeated crashes of the model helicopter without significant degradation of their flying qualities.

In general, helicopters are flying machines with the ability to hover and fly forwards, backwards, and sideways. With all of their spinning mechanisms and mechanical linkages, helicopters are intrinsically interesting. It is little wonder that aviation buffs have always taken special interest in model helicopters.

The first practical radio-controlled model helicopters flew in about 1969. Since then, designers have endeavored to develop model helicopters that fly better and cost less. Model helicopter designers, who are more often hobbyists than professional engineers, frequently fail to consider the differences between large-scale and small-scale structures and aerodynamics and base their model designs on full-size helicopters.

When full-size helicopters are scaled down to model proportions, however, their small main rotor systems are typically so inefficient at producing lift that many small model helicopters can barely get off the ground. To compensate for low lift main rotor systems, the structures of small helicopters are typically light weight and fragile and incapable of absorbing much abuse before breaking. As a consequence, conventional model helicopters are expensive, complex, and fragile and the general public consensus is that conventional small model helicopters are impractical and undesirable.

The main rotor blades on conventional radio-controlled model helicopters are usually made of either laminated wood, styrofoam, or fiberglass. Rotor blades for radio-controlled models should not be confused with the rotor blades of toys or free-flight models. Rotor blades on toy helicopters have modest operational requirements and are not feasible for use on larger, heavier, more powerful models that must carry a heavy radio control system.

Most rotor blades on radio-controlled model helicopters are made of laminated wood and covered with a thin plastic film. Airfoil selection and "planform" shape of these blades are limited by the capabilities of the wood-working tools used in their manufacture. Wooden rotor blades typically are made from rectangular blanks that are drawn through revolving cutters which form the upper and lower surfaces of the blades. For this reason, they usually are built straight (with no twist or taper) and have a single airfoil section along their entire length. Wooden rotor blades are relatively inexpensive, but require time-consuming hand assembly, finishing, and balancing. Wooden rotor blades often break when the model helicopter crashes.

Styrofoam rotor blades usually have a rigid structural core covered with an airfoiled skin made of hard polystyrene or urethane foam. The core, which may be made of metal, wood, or glass fibers is designed to withstand high radial flight loads. The styrofoam skin surrounding the core forms the aerodynamic shape of the blade and may be molded with complicated geometries. Styrofoam blades are moderately expensive and very susceptible to crash damage since the styrofoam skin is very soft. Even minor impacts with objects or the ground can render them completely unusable.

Fiberglass rotor blades are usually formed in molds by hand, are hollow or have a styrofoam core, and may be designed with complicated geometries. Fiberglass blades are extremely stiff both torsionally and longitudinally. Hand-built fiberglass rotor blades are very expensive and may be damaged or destroyed in a crash.

In contrast to the wood, foam, and fiberglass rotor blades of existing radio-controlled model helicopters, the main rotor blades of the current invention are preferably made from a solid molded plastics material such as nylon.

Solid plastic blades have always had several serious drawbacks. Rotor blades made of stiff, low weight, plastic materials, such as injection-molded polystyrene, tend to shatter upon impact with the ground. Rotor blades made of materials such as flexible polyurethane are highly impact resistant, but cannot maintain their shape when subjected to high centrifugal and aerodynamic flight loads which leads to such problems as blade flutter.

Common injection-molded plastic materials are also 2 to 5 times higher in density than the maple and obechi woods commonly used in rotor blades for radio-controlled model helicopters. If plastic rotor blades are geometrically identical to wooden blades, they will not improve flight performance but they will weigh substantially more. In addition, the high weight of these plastic rotor blades can radically increase the centrifugal force a rotor blade must withstand in flight. A rotor blade made of wood generating a nominal centrifugal force of 500 pounds (as is common on large radio-controlled model helicopters) would generate a force of 1,000 pounds to 2,500 pounds if made of solid plastic. In this case, the structure of the main rotor hub would have to support an additional 500 to 1500 pounds of force with no gain in flight performance.

As a result of all these drawbacks, model helicopter designers have viewed molded plastic materials as inappropriate for rotor blades. They are accustomed to the idea that traditional rotor blades will break during a crash and treat the rotor blades as a replaceable item.

Although many rotor designs exist, no known design or method of manufacture has produced a main rotor system that is capable of efficiently lifting a radio-controlled model helicopter into the air and surviving repeated energetic crashes, such as impacts with a brick wall or tree trunk. What is needed are efficient, durable, and inexpensive rotor elements for use on model helicopters. To be practical, the rotor elements must generate enough lift to allow the helicopter to fly. To be popular and appropriate for the general public, the rotor elements must absorb the punishment of the unsophisticated novice. To be a commercial success, the rotor elements must be inexpensive and easy to manufacture.

What is needed is a main rotor system that efficiently lifts a radio-controlled model helicopter into the air and is capable of surviving repeated crashes. Such a main rotor system would be welcomed by model helicopter enthusiasts.

In accordance with the present invention, a main rotor is provided for use on a model helicopter. The main rotor includes a main rotor shaft rotatable about a main rotor rotation axis and first and second main rotor blades linked to the main rotor shaft to extend radially outward from and substantially perpendicular to the main rotor shaft. The first and second main rotor blades rotate with the main rotor shaft in a steady-state main rotor blade plane of rotation when the main rotor blade plane of rotation is perpendicular to the main rotor rotation axis. The main rotor further includes a mechanism to pitch the first and second main rotor blades about first and second main rotor blade pitching axes, respectively. Each of the first and second main rotor blades include a blade root linked to the main rotor shaft, a blade tip spaced apart from the blade root, a leading edge, a trailing edge spaced apart from the leading edge, a plurality of chord lines extending in a straight line between the leading edge and the trailing edge perpendicular to the first and second main rotor blade pitching axes, an inboard section situated adjacent to the blade root, and an outboard section situated adjacent to the blade tip.

The inboard section includes a first steady-state angle-of-attack defined as an included angle between one of the plurality of chord lines in the inboard section and the main rotor blade plane of rotation. The outboard section includes a second steady-state angle-of-attack defined as an included angle between one of the plurality of chord lines in the outboard section and the main rotor blade plane of rotation. The first steady-state angle-of-attack is greater than the second steady-state angle-of-attack. One of the plurality of chord lines in the inboard section includes a first length and one of the plurality of chord lines in the outboard section includes a second length that is shorter than the first length. The inboard section includes a cupped-shaped cross-section between the trailing edge and the leading edge and the outboard section includes a flat cross-section between the trailing edge and the leading edge.

In a preferred embodiment of the present invention, the inboard and outboard sections of the main rotor blade include airfoils having a chord length, camber, steady-state angle-of-attack, and thickness within a specified range. These airfoils provide a relatively lightweight rotor blade that produces a desired amount of lift for the model helicopter.

A main rotor blade in accordance with the invention may be bent between a nominal position and a plurality of bent positions. Each main rotor blade includes a blade root linked to the main rotor shaft, a blade tip spaced apart from the blade root, and a blade body that may be bent so that the blade tip touches the blade root. After the blade body is bent to one of its bent positions and released, the blade body will return to its nominal position. The ability of the main rotor blades to bend and return to their nominal position provides rotor blades that are less likely to break in a crash of the model helicopter.

In preferred embodiments of the present invention, the main rotor system includes stabilizer rotor blades with airfoils pitched to a steady-state positive angle-of-attack. Because the stabilizer rotor blades are at a positive angle-of-attack, the stabilizer rotor blades produce lift to assist the main rotor blades.

The main rotor system further includes stabilizer rotor blade extensions that connect the stabilizer rotor blades to the main rotor hub and a separate stabilizer pivot rod arranged to extend along a stabilizer rotor blade pivot axis through the stabilizer rotor blades. The stabilizer rotor blade pivot extension is spaced apart from the stabilizer pivot rod so that the stabilizer pivot rod does not have to support radial loads generated by the stabilizer rotor blades.

A system is provided for changing the steady-state pitch angle of a main rotor blade. The system includes interchangeable main rotor element sets such as interchangeable rotor blade grips. To change the steady-state pitch angle of the main rotor blade, a first interchangeable blade grip that orients the main rotor blade in a particular steady-state pitch angle is replaced with a second interchangeable blade grip that orients the main rotor blade in a different steady-state pitch angle.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description that follows particularly refers to the accompanying figures in which:

FIGS. 17a–24 are views of a main rotor blade in accordance with the present invention showing details of airfoiled cross sections for several span-wise stations of the main rotor blade;

FIGS. 17a is a top plan view of a main rotor blade in accordance with the present invention;

FIG. 17b is a side elevational view of the main rotor blade of FIG. 17a;

FIG. 17c is a sectional view taken along line 17c—17c of FIG. 17a showing an airfoil of the main rotor blade;

FIG. 17d is a sectional view taken along line 17d—17d of FIG. 17a showing another airfoil of the main rotor blade;

FIG. 17e is a sectional view taken along line 17e—17e of FIG. 17a showing another airfoil of the main rotor blade;

FIG. 17f is a sectional view taken along line 17f—17f of FIG. 17a showing another airfoil of the main rotor blade;

FIG. 17g is a sectional view taken along line 17g—17g of FIG. 17a showing another airfoil of the main rotor blade;

FIG. 17h is a sectional view taken along line 17h—17h of FIG. 17a showing another airfoil of the main rotor blade;

FIG. 18 is an enlarged view of FIG. 17c;

FIG. 19 is an enlarged view of FIG. 17d;

FIG. 20 is an enlarged view of FIG. 17e;

FIG. 21 is an enlarged view of FIG. 17f;

FIG. 22 is an enlarged view of FIG. 17g;

FIG. 23 is an enlarged view of FIG. 17h;

FIG. 24 is a perspective view of the model helicopter of FIG. 1 illustrating the flexible and foldable nature of the main rotor blades in accordance with a preferred embodiment of the present invention;

FIG. 28b is a top plan view of the structural component of the blade shown in FIG. 28a;

FIGS. 29a–32 are views of a stabilizer rotor blade in accordance with the present invention showing details of airfoiled cross sections of the stabilizer rotor blade;

FIG. 29a is a top plan view of a stabilizer rotor blade;

FIG. 29b is a sectional view taken along line 29b—29b of FIG. 29a showing an airfoil of the stabilizer rotor blade;

FIG. 29c is a sectional view taken along line 29c—29c of FIG. 29a showing another airfoil of the stabilizer rotor blade;

FIG. 29d is a sectional view taken along line 29d—29d of FIG. 29a showing another airfoil of the stabilizer rotor blade;

FIG. 30 is an enlarged view of FIG. 29b;

FIG. 31 is an enlarged view of FIG. 29c;

FIG. 32 is an enlarged view of FIG. 29d;

DETAILED DESCRIPTION OF THE DRAWINGS

Figure 1:
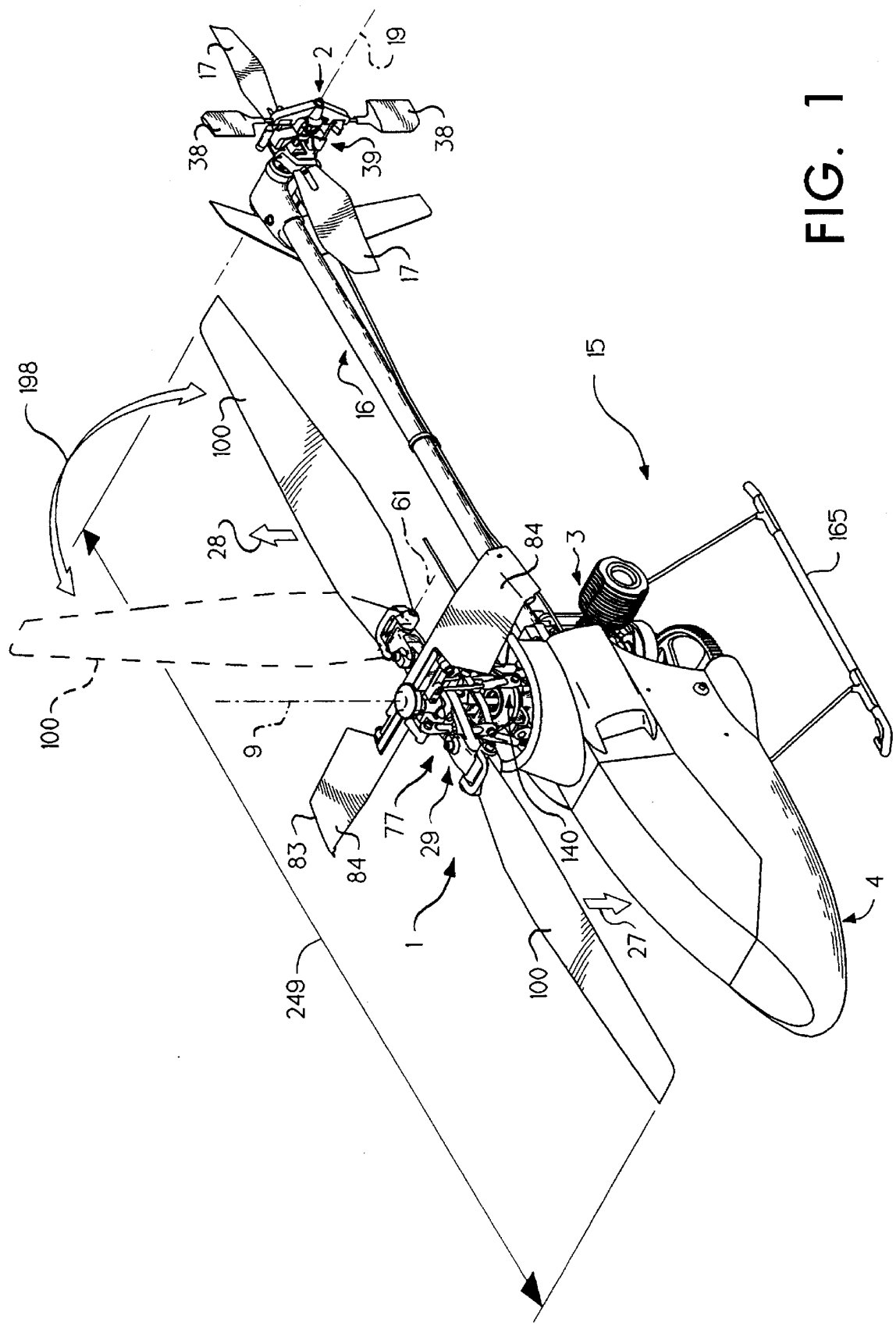
FIG. 1 is a perspective view of a model helicopter incorporating a main rotor system in accordance with a preferred embodiment of the present invention, with broken lines illustrating a folding motion of a main rotor blade.

Referring to FIG. 1, a helicopter 15 in accordance with the present invention includes a large main rotor 1 which lifts helicopter 15 into the air and a smaller tail rotor 2 which is used to counteract the torque produced by main rotor 1 and to steer helicopter 15. Main rotor 1 includes a main rotor shaft 110 that rotates about a main rotor rotation axis 9. Main rotor 1 further includes a pair of rotor blades 100 and a pair of shorter stabilizer rotor blades 84 that rotate about main rotor rotation axis 9. Both main rotor 1 and tail rotor 2 are driven by an engine 3 usually located within a helicopter fuselage (body) near vertical main rotor shaft 110. Helicopter 15 further includes landing gear 165 and a streamlined fuselage shell 4.

From a distance, helicopter main rotors 1 look superficially like large propellers sitting atop the helicopter fuselage. Like propellers, helicopter main rotors 1 are designed to produce a thrust or lift force. Helicopter main rotors 1, however, operate in a manner completely different from propellers. Unlike propellers, helicopter main rotors 1 are designed to move through the air sideways. The lift force produced by main rotor 1 which keeps the helicopter 15 aloft can also be directed to push the helicopter 15 sideways in any direction. Reference is thereby made to U.S. patent application Ser. No. 08/233,159 filed Apr. 25, 1994, by Paul E. Arlton et al., which is hereby incorporated by reference herein.

Tail rotor 2 functions to control the yaw motion of helicopter 15 and is supported for rotation about a transverse tail rotor axis 19 as shown in FIG. 1. Yaw motion is an angular motion of helicopter 15 about a vertical axis such as main rotor rotation axis 9.

Tail rotor 2 includes a tail rotor shaft (not shown) extending along a tail rotor axis 19, a pair of tail rotor blades 17, and a pair of secondary stabilizer blades 38 coupled to a gyro mechanism 39 for varying the pitch of tail rotor blades 17. Tail rotor 2 is rotated about transverse tail rotor axis 19 by a drive linkage (not shown) interconnecting engine 3 and tail rotor 2 to generate a thrust force transverse to tail boom 16 and offset from the vertical main rotor rotation axis 9 of the main rotor 1. The magnitude of the thrust force of tail rotor 2 can be varied by varying the collective pitch of tail rotor blades 17 to cause helicopter 15 to turn about vertical axis 9 so that it will head in a particular direction. Reference is hereby made to U.S. Pat. No. 5,305,968 to Paul E. Arlton and to U.S. patent application Ser. No. 08/292,719 filed Aug. 18, 1994, by Paul E. Arlton, which are hereby incorporated by reference herein, for descriptions of suitable devices for operating a tail rotor to automatically stabilize the yaw motion of a helicopter.

Figure 2:
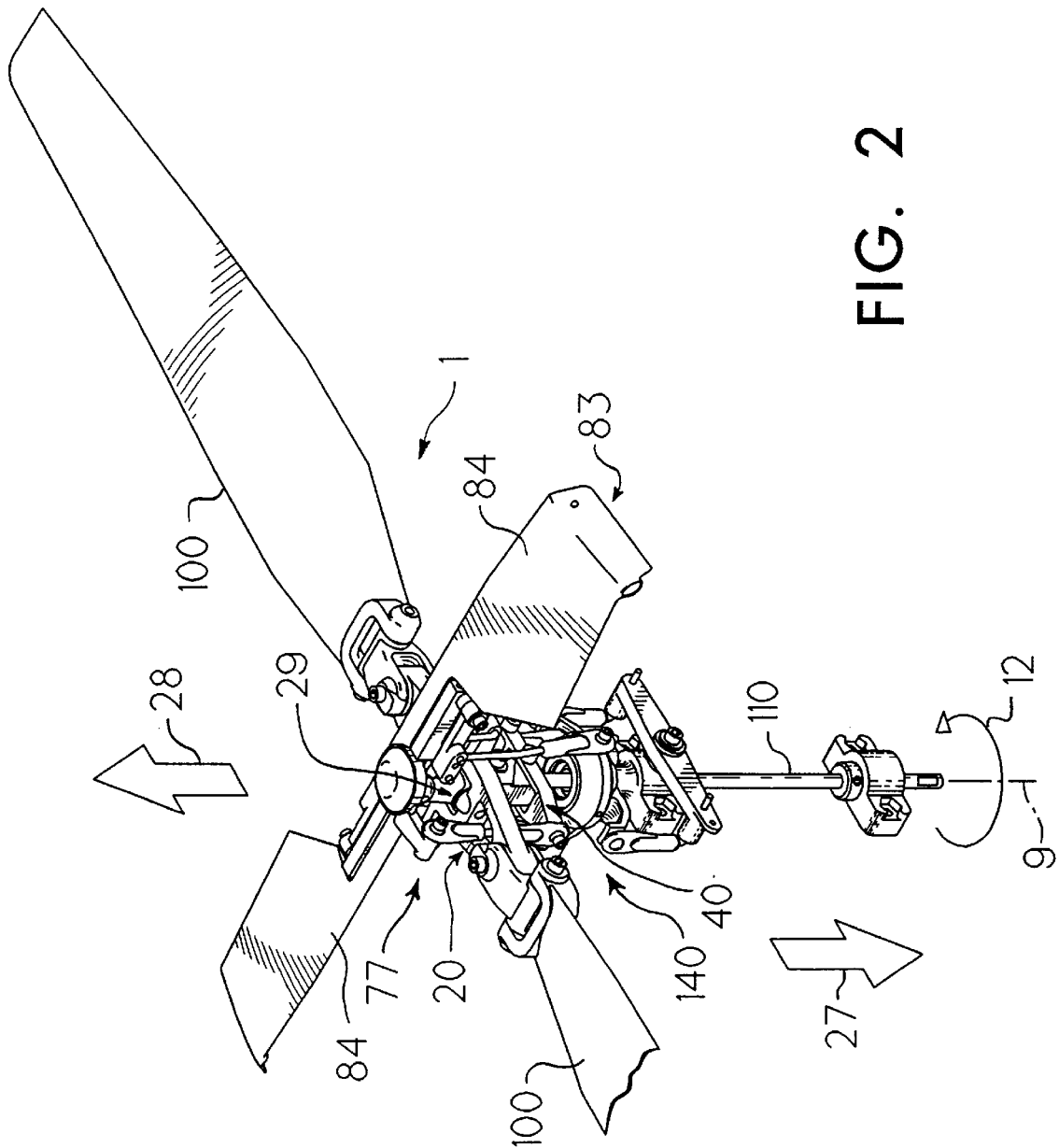
FIG. 2 is a perspective view of the main rotor system of FIG. 1 with all other parts of the helicopter removed for clarity.

Referring now to FIG. 2, in operation, engine 3 causes main rotor shaft 110 to rotate rapidly about main rotor rotation axis 9 in rotor rotation direction 12. As main rotor shaft 110 rotates, rotor blades 100 and stabilizer rotor blades 84 act like propellers or fans moving large amounts of air in downward direction 27, thereby creating a force that lifts helicopter 15 upward in direction 28. To control helicopter 15 in horizontal flight, the pilot causes rotating main rotor 1 to tilt slightly in one direction or another relative to main rotor shaft 110. The offset lift force produced by the tilted main rotor 1 causes the helicopter 15 to move horizontally in the direction of the tilt.

Because main rotor 1 on helicopter 15 rotates while the body 4 of helicopter 15 does not, some mechanism is needed to transmit control commands from the non-rotating pilot to rotating main rotor 1. One such mechanism is swashplate 140 which is essentially a large ball bearing assembly surrounding main rotor shaft 110. To tilt main rotor 1, the pilot moves linkages attached to swashplate 140 which in turn are connected through linkages to rotor blades 100 and stabilizer rotor blades 84. The lower portion of swashplate 140 is attached to the helicopter fuselage structure and does not rotate with main rotor 1, while the upper portion is connected to and rotates with main rotor 1.

Figure 5:
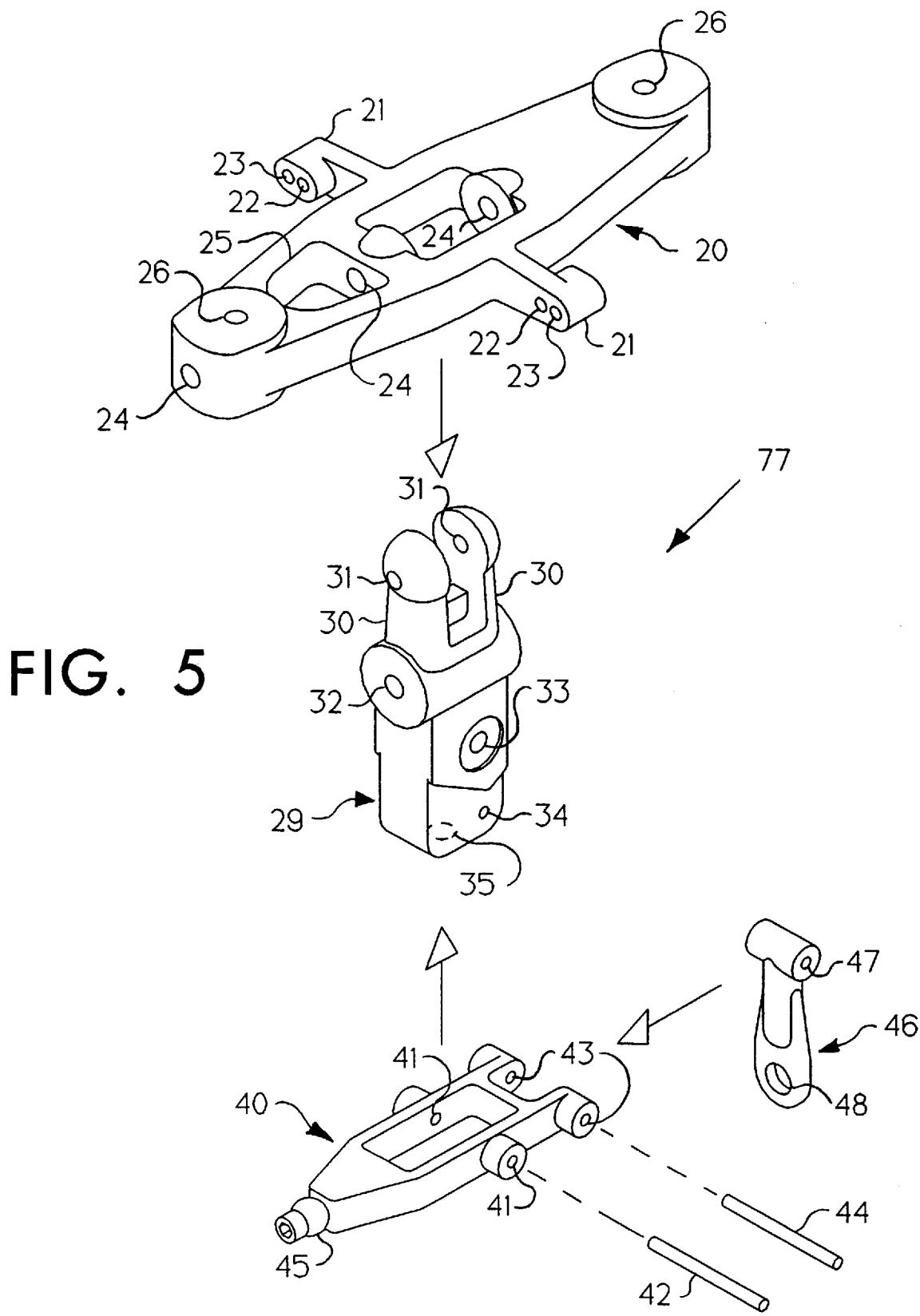
FIG. 5 is an exploded perspective view of a main rotor hub assembly of the main rotor system of FIGS. 1 and 2 showing various components of the main rotor hub, with all other parts omitted for clarity.

Main rotor 1 further includes a rotor hub assembly 77 as shown, for example, in FIG. 5. Rotor hub assembly 77 is mounted underneath stabilizer rotor blades 84 and between main rotor blades 100 as shown in FIGS. 1 and 2. Rotor hub assembly 77 includes a pitch plate 20, a rotor hub 40, and a follower arm 29 as shown in FIG. 5.

Figure 3:
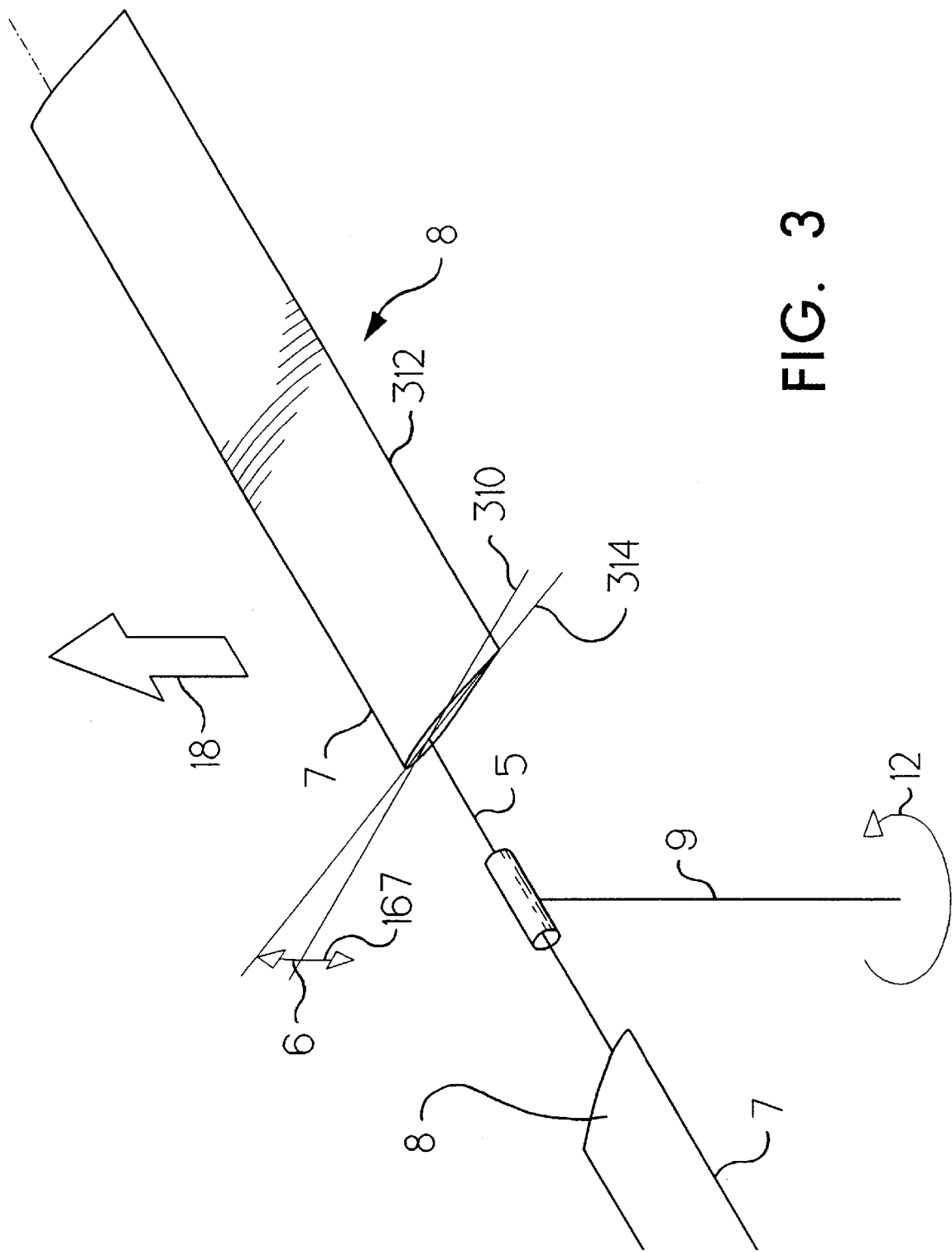
FIG. 3 is a schematic representation of a simplified main rotor blade.

To understand generally how helicopter main rotor systems work, it is easiest to begin with a simplified representation of a rotor system. Referring now to FIG. 3, a schematic rotor blade 8 rotates in a main rotor blade plane of rotation in the sense of rotation direction 12 about main rotor rotation axis 9. Rotor blade 8 rotates in a steady-state main rotor blade plane of rotation 310 when main rotor blade plane of rotation is perpendicular to main rotor rotation axis 9. Rotor blade 8 includes a leading edge 7, a trailing edge 312, and a pitch axis 5 extending horizontally along the length of rotor blade 8.

Angle-of-attack or blade pitch 6 is the included angle between main rotor blade plane of rotation 310 and a chord line 314 extending as a straight line between trailing edge 312 and leading edge 7 of blade 8. As shown by vertical pitch arrow 6, blade pitch (also called "angle-of-attack") is considered positive when leading edge 7 of rotor blade 8 is rotated upward in direction of vertical pitch arrow 6 about pitch axis 5. Angle-of-attack 6 is considered negative when leading edge 7 of rotor blade 8 is rotated downward in direction 167 about pitch axis 5. Positive angles-of-attack 6 are considered greater than or above negatives angles-of-attack 167. The aerodynamic lifting force produced by a rotor blade 8 is related to blade pitch 6. Increased (positive) pitch or angle-of-attack 6 corresponds to increased lift.

Figure 4:
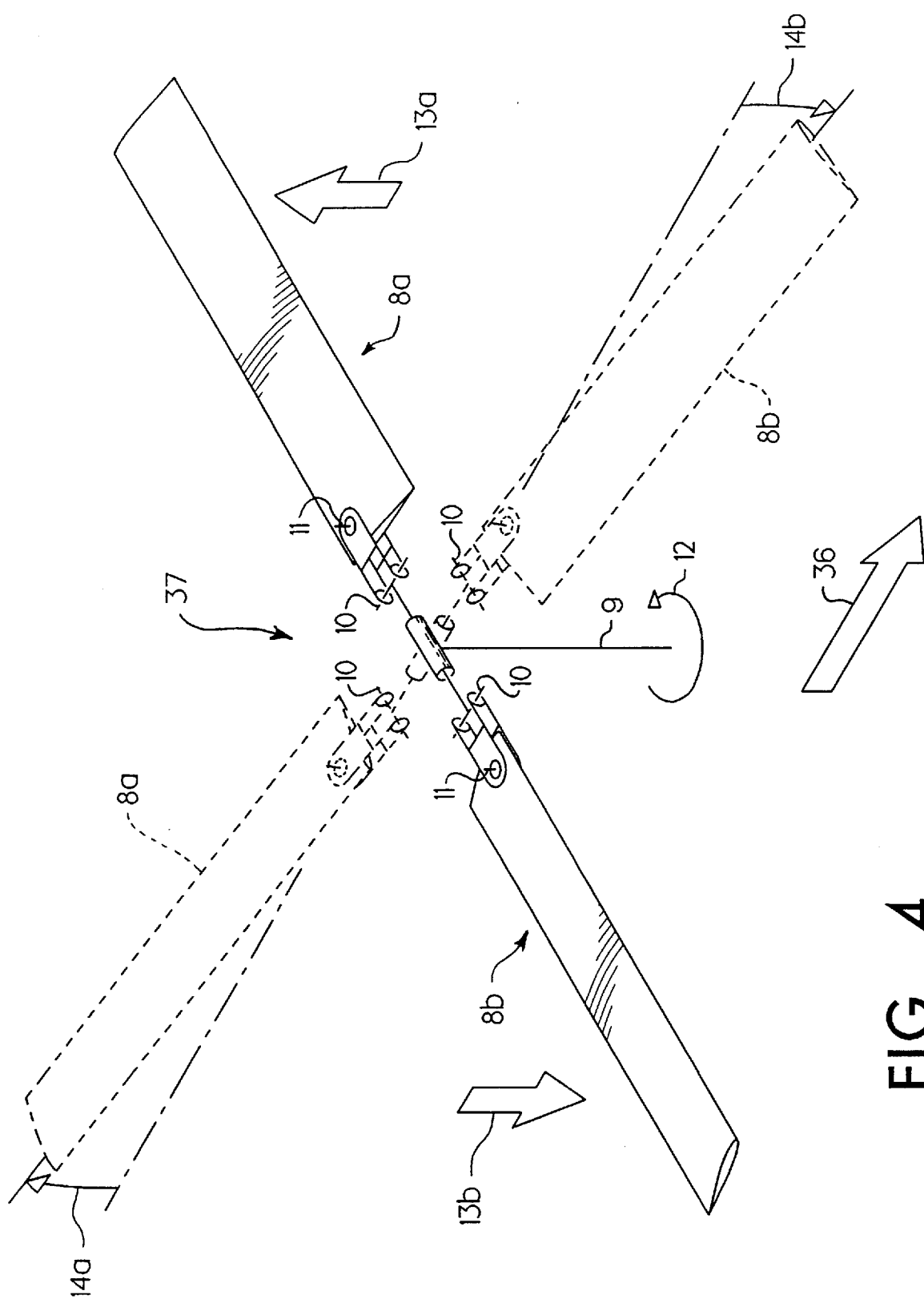
FIG. 4 is a schematic representation of a main rotor blade having flapping and lead-lag hinges.

As shown in FIG. 4, rotor blades 8 are generally hinged near rotor hub area 37 to allow each rotor blade 8 to flap up and down about flapping hinge 10, and swing forward and backward on lead/lag hinge 11. Hinges 10 and 11 allow rotor blades 8 to react to the constantly changing aerodynamic and gyroscopic forces encountered in flight. Without hinges 10 and 11, the rotor blades 8 would have to be built stronger and heavier to withstand in-flight forces.

Helicopter dynamics are substantially different from airplane dynamics. The rotating main rotor 1 on top of helicopter 15 acts like an immense gyroscope. As such, the main rotor 1 obeys the physical laws of gyroscopes which are not intuitively obvious. A rule of thumb can help one remember how gyroscopes operate: a force applied to a rotating gyroscope produces motion 90 degrees later in the direction of rotation. For example, as shown in FIG. 4, if an aerodynamic force 13a is applied to rotor blade 8a rotating rapidly in rotation direction 12, rotor blade 8a, acting under the laws of gyroscopes, will flap upward 90° later in the direction of rotation 12 at 14a. Likewise, if another aerodynamic force 13b is applied to rotor blade 8b, as also shown in FIG. 4, then rotor blade 8b will flap downward 90° later in the direction of rotation 12 at 14b. This flapping will be seen by an observer as a tilt of the entire main rotor "disk." (When a rotor rotates at high speed, it is difficult for an observer to discern individual rotor blades; the rotor appears as a transparent disk. As a consequence, a rotating rotor is typically referred to as a rotor disk.) It will be understood by those skilled in the art that an aerodynamic force such as 13a or 13b can be either an external force created by unplanned gusts of wind or other environmental factors or a force created by a planned change in pitch of a single rotor blade controlled by the helicopter pilot.

Traditionally, the pilot of a full-size helicopter controls the main rotor by manipulating a joystick called the "cyclic" control located in front of the pilot and a lever called the "collective" control located to the left of the pilot. Cables, push-pull rods, and bellcranks connect the cyclic and collective controls through the swashplate 140 to the pitch controls of the main rotor blades 100.

Main rotor systems of most radio-controlled model helicopters operate in an manner similar to full-size helicopters. The pilot manipulates small joysticks on a hand-held radio transmitter which in turn sends commands to electromechanical servo actuators located within the flying model. Push-pull rods and bellcranks connect the servos through the swashplate to the pitch controls of the main rotor blades.

To bank the helicopter 15 to the right or left, or move forward or backward, rotating rotor blades 8 are pitched upward as they pass around one side of the helicopter 15 and then downward as they pass around the other creating the aerodynamic forces shown diagrammatically in FIG. 4. This is called "cyclic" pitching since the rotor blades 8 cycle up and down as the rotor rotates. The difference in lift produced on either side of the helicopter 15 causes main rotor blades 8 to flap up and down and the rotor disk (or the appearance of rotor blades 8 as they are rotating rapidly about main rotor blade rotation axis 9) appears to tilt. The tilted rotor disk produces a lateral thrust force which then pushes the helicopter 15 in the direction of the tilt (e.g., in direction 36 shown in FIG. 4).

Helicopter main rotors 1 cannot change speed quickly because of their large size and high inertia. For this reason, main rotors 1 are usually designed to operate at a nearly constant rotational speed throughout all flight regimes. To control main rotor 1 lift, main rotor blades 8 are pitched upward or downward in unison. Because all main rotor blades 8 move together, this is called "collective" pitching. The change in pitch, and associated lift force, of the rotating main rotor blades 8 causes the helicopter 15 to gain or loose altitude.

Some small model helicopters rely on variable engine speed instead of collective blade pitch for altitude control since main rotor thrust is proportional to engine speed as well as blade pitch. The main rotor blades on these models are typically built at a fixed pitch (relative to each other) and are light enough to react quickly to changes in engine speed. The primary advantage of fixed-pitch rotors on models is reduced mechanical complexity. A preferred embodiment of the present invention is of the fixed-pitch variety, but the present invention may be generalized to collective-pitch rotors.

Flight stability is often a problem for small model helicopters. To augment stability, weighted stabilizer bars are usually incorporated into conventional model helicopters, but are uncommon on modern full-size helicopters. First patented by Hiller in 1953 and refined for use on models by Shluter in 1970, these flybars (not shown) are tipped with aerodynamic paddles (Hiller paddles) (not shown), and are connected through linkages (not shown) to the swashplate (not shown) and main rotor blades (not shown).

Hiller control systems naturally exhibit a slight control delay. A hybrid stabilization system called the Bell/Hiller system incorporates additional linkages to mix pilot control inputs with flybar stabilization. The Bell/Hiller system responds quickly to pilot control since control commands are transmitted directly to the main rotor blades, while the system is stabilized by a Hiller-type flybar and paddles (not shown).

A major drawback of flybars and paddles is increased aerodynamic drag. A cylindrical flybar wire (not shown) supports the Hiller paddles (not shown). The cylindrical flybar wire (not shown) includes a circular cross-section that produces drag as high or higher than that produced by the Hiller paddles (not shown). Moreover, because Hiller paddles (not shown) are typically configured to operate at a zero angle-of-attack (relative to the main rotor blade plane of rotation), and because air passing through a main rotor (not shown) is almost always flowing downward, Hiller paddles (not shown) can actually operate at a negative angle-of-attack with respect to the incoming airflow. Thus, Hiller paddles (not shown) may actually contribute negative lift tending to push the helicopter downward toward the ground in opposition to the positive lift created by the main rotor.

A main rotor system 1 for model helicopters in accordance with the present invention employs unique aerodynamics and pitching, flapping, and lead/lag configurations, and mechanisms which significantly improve aerodynamic efficiency, stability, durability and manufacturability. The following sections describe the details of preferred rotor blade construction, rotor blade geometry, stabilizer rotor blade configuration, rotor blade attachment, and pitch adjustment. Subsequent sections describe how best to combine the unique features of the current invention for the best effect.

Rotor Blade Construction

Refer now to FIG. 2 which is an isometric view of main rotor system 1 of model helicopter 15 in accordance with the current invention. Rotor blades 100 of the current invention are preferably made of an injection-molded plastic material such as nylon, ABS, or polycarbonate, and, as in the case of nylon, may be made semi-flexible. Rotor blades 100 molded in substantially one piece are termed "single-component" rotor blades 100 herein.

A non-reinforced injection-molded plastic material with dry tensile-strength in the range of 5,000 to 12,000 psi, flextural modulus in the range of 250,000 to 500,000 psi, and specific gravity in the range of about 1.0 to 1.3 is particularly well suited for use in the manufacture of rotor blade 100 of the current invention. Foaming or blowing agents can be added to moderately reduce density without substantially affecting other physical properties. Ultimate elongation in the range of 25% to 200% is preferred. Izod impact strength is not a crucial factor for small rotors having a diameter of about 36 inches or less (Izod impact strength is determined from a standard test in the plastics industry to measure the impact strength of plastics material). Izod values in the range of 1 ft-lb/in to 4 ft-lb/in are acceptable. High-notched Izod values in the range of 5 to 20 ft-lb/in, as are typical of ABS and polycarbonate plastics, are desirable for larger rotors or if impacts with sharp objects, such as steel sign posts, are expected. Materials with low-notched Izod values (below 1 ft-lb/in) and low ultimate elongations (below 10%) should be avoided at all times as these materials are brittle in operation.

Figure 28A:
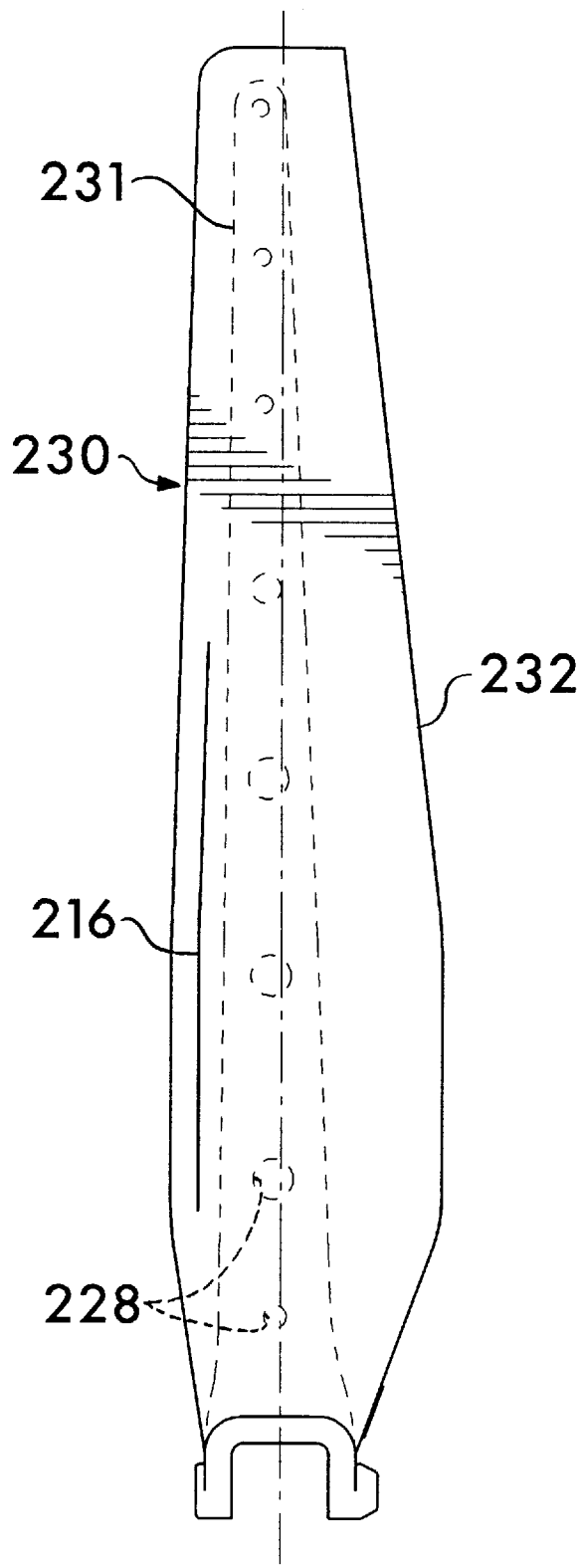
FIG. 28a is a top plan view of a multi-component rotor blade having a structural component (phantom lines) and a shape component surrounding the structural component.
Figure 28B:
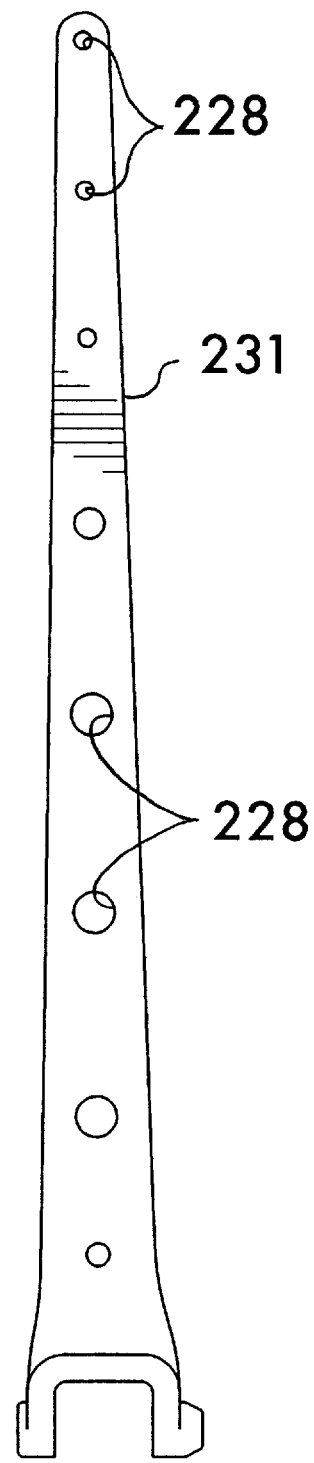

An alternative rotor blade constructed in accordance with the current invention, as shown in FIGS. 28a and 28b, is two-piece rotor blade 230. Two-piece rotor blade 230 is made of a flexible, impact resistant plastic material such as thermoplastic urethane, injection molded around a relatively rigid structural core or spar. Rotor blade 230 may be described as a "multi-component" rotor blade having, in this case, a structural component 231 and a shape component 232. Structural component 231 contributes primarily to the stiffness and tensile strength of rotor blade 230, while shape component 232 contributes primarily to the aerodynamic shape of rotor blade 230. In alternative embodiments of the present invention, multi-component rotor blades may be formed of more than two components.

Structural component 231 of two-piece rotor blade 230 may be, for instance, a fiberglass core or a spar injection molded from a relatively stiff plastic material such as polycarbonate. Shape component 232 is preferably injection molded around structural component 231 in an insert molding operation and may be made of a very flexible plastic material. A non-reinforced injection-molded plastic material with dry tensile strength in the range of 5,000 to 8,000 psi, flextural modulus in the range of 20,000 to 100,000 psi, and specific gravity in the range of about 1.0 to 1.3 is particularly well suited for shape component 232 of rotor blade 230. Foaming or blowing agents can be added to moderately reduce density without substantially affecting other physical properties. Ultimate elongation in the range of 200% to 500% is preferred. Flexible plastic materials, such as thermoplastic urethanes, naturally have high Izod impact strength. Most multi-component rotor blades 230 in accordance with the current invention may be described as semi-flexible.

Structural component 231 is formed to include apertures 228 as shown in FIGS. 28a and 28b. Apertures 228 are provided in the illustrated embodiment to provide a means for attaching shape component 228 to structural component 231. When shape component 232 is molded around structural component 231, the flexible plastic material of shape component 232 fills in apertures 228 to mechanically attach shape component 232 to structural component 231. In alternative embodiments of the present invention, the shape component may be attached to the structural component in any manner.

Injection molded plastic rotors for large model helicopters can require huge, expensive molds and molding machinery. Plastic materials that can be molded at low pressures, such as reaction-injection-molded (RIM) urethanes, can be employed for large helicopter blades. Reaction injection molding is a process wherein a multi-component plastic material is chemically mixed and then injected into a mold under relatively low pressure. The plastic material then hardens chemically and/or with the addition of heat to form a solid part. An advantage of RIM blades is that molds and molding machinery are lighter and less expensive. Structural cores, such as fiberglass spars or reinforcements, may be embedded within a RIM blade to increase strength and stiffness.

Figure 24:
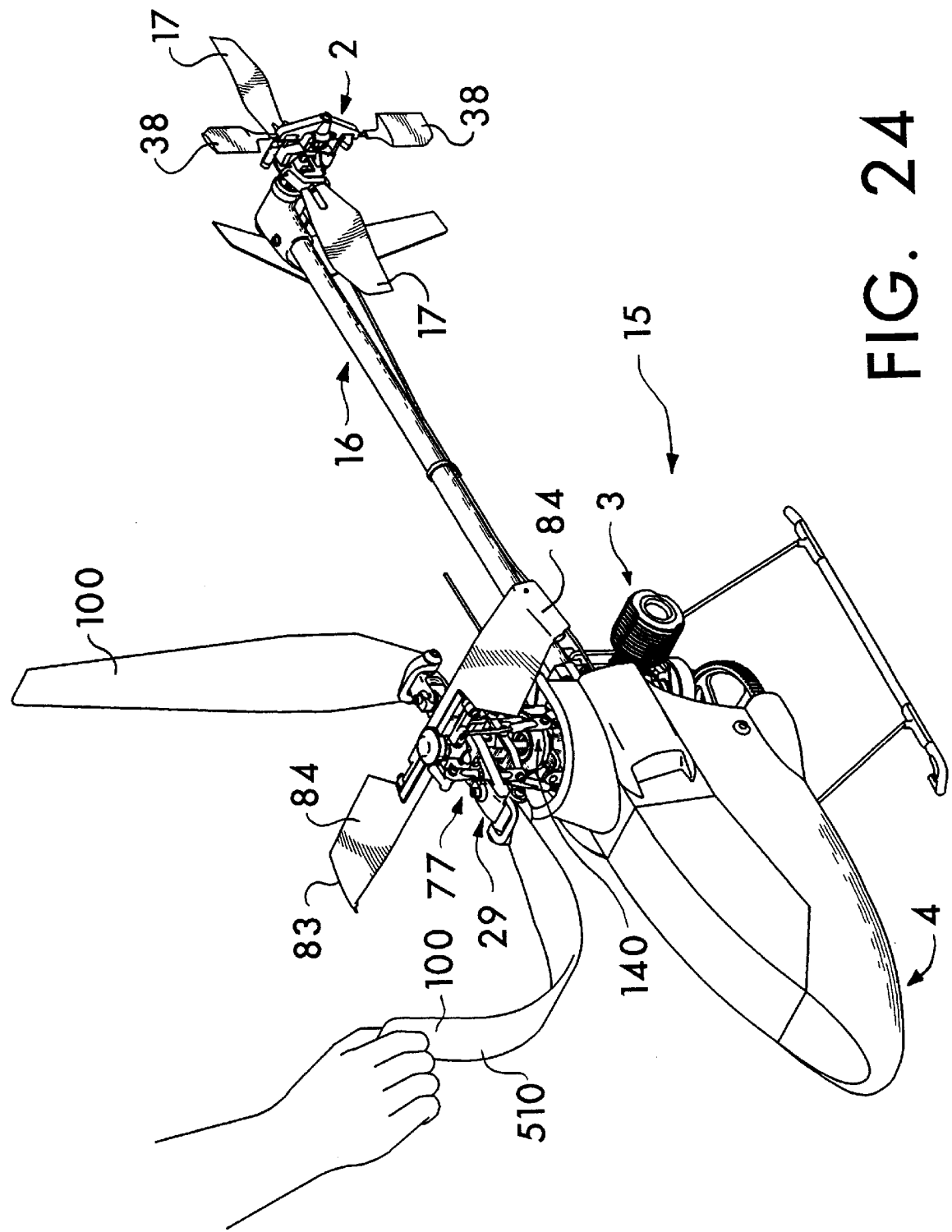
Figure 25:
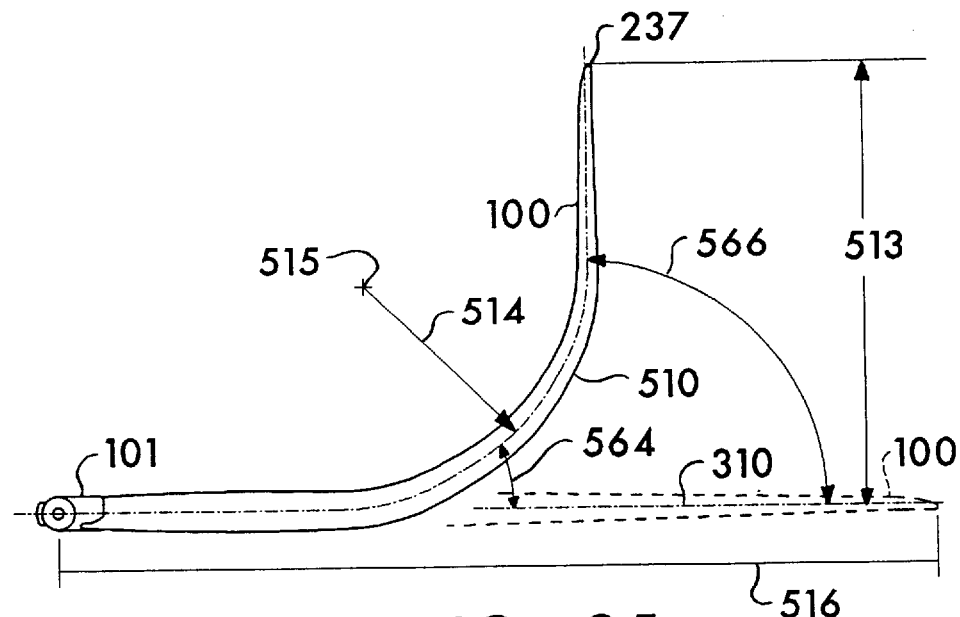
FIG. 25 is a side elevational view of a main rotor blade bent about 90 degrees.
Figure 26:
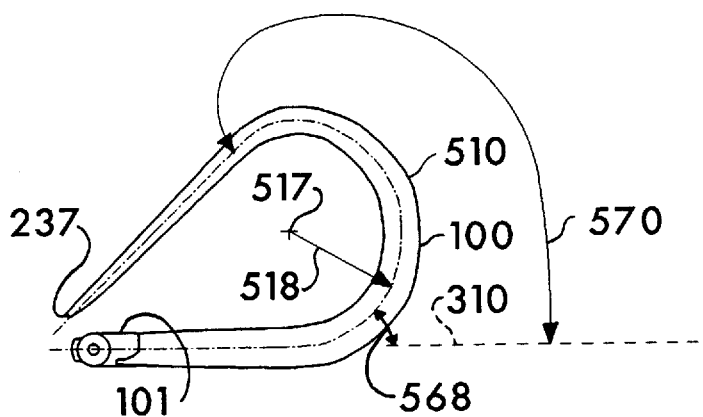
FIG. 26 is side elevational view of a main rotor blade showing the main rotor blade having a blade root and a blade tip spaced apart from the blade root and the main rotor blade is bent so that the blade tip is situated adjacent to the blade root.
Figure 27:
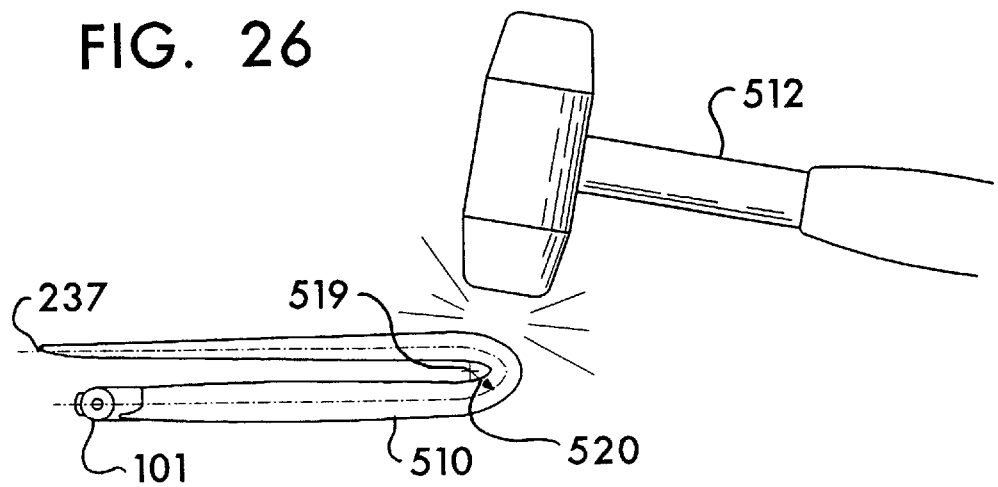
FIG. 27 is a side elevational view of a main rotor blade bent so that the blade tip is situated adjacent to the blade root and the main rotor blade is being struck by a mallet.

A rotor blade 100 manufactured in accordance with the current invention may be described as "semi-flexible". The phrase "semi-flexible" as used herein refers to a rotor blade 100 having a blade body 510 that may be bent through a broad angle, such as 90 degrees, and then straightened without materially reducing its functionality. The tip of a semi-flexible single-component nylon rotor blade 100 in accordance with the current invention can be bent by hand more than 90 degrees as shown in FIGS. 24 and 25. When released, rotor blade 100 will return close to its original unbent shape without losing any of its functional properties. As shown in FIG. 26, blade body 510 of rotor blade 100 may even be folded 180 degrees (so that blade tip 237 touches blade root 101) and blade body 510, kinked, and then straightened and flown. In fact, as shown in FIG. 27, blade body 510 of rotor blade 100 may be kinked, the fold line of blade 100 struck with a plastic mallet 512, and then blade 100 may be straightened and flown. In the above examples, blade body 510 bends within an elastic range without causing any permanent deformation of blade body 510.

Blade body 510 bends so that an included angle between blade body 510 and the steady-state main rotor blade plane of rotation 310 increases as blade body 510 extends between blade root 101 and blade tip 237. For example, in FIG. 25, included angle 564 is situated closer to blade root 101 than included angle 566 and is smaller than included angle 566. Similarly, in FIG. 26, included angle 568 is situated closer to blade root 101 than included angle 570 and is smaller than included angle 568.

As can be seen in FIGS. 25–27, semi-flexible nylon blade 100 can be bent about a radius of curvature that approaches zero. As shown for example in FIG. 25, blade 100 can bend around a flex axis 515 through a radius of curvature 514 of about 30% of blade length 516 that lifts blade tip 237 out of main rotor plane of rotation 310 by a distance 513 of about 50% of blade length 516. Radius of curvature 518 from flex axis 517 in FIG. 26 is smaller than radius 514 and is about 15% of blade length 516. Radius of curvature 520 from flex axis 519 in FIG. 27 is about 2% of blade length 516 and is approaching zero.

The bending tests provided herein are only sufficiency tests and plastic rotor blades 100 that are materially affected by tight bending can still operate in accordance with the current invention as long as they retain their functional properties after the impact of a crash. A multi-component blade 230 having structural reinforcement component 231, such as a fiberglass spar, surrounded by a high-impact injection-molded urethane skin would be in accordance with the invention even if the spar snapped when struck with a mallet 512. Such a blade 230 would still absorb and dissipate crash energies in normal operation on a radio-controlled model helicopter 15.

Figure 15:
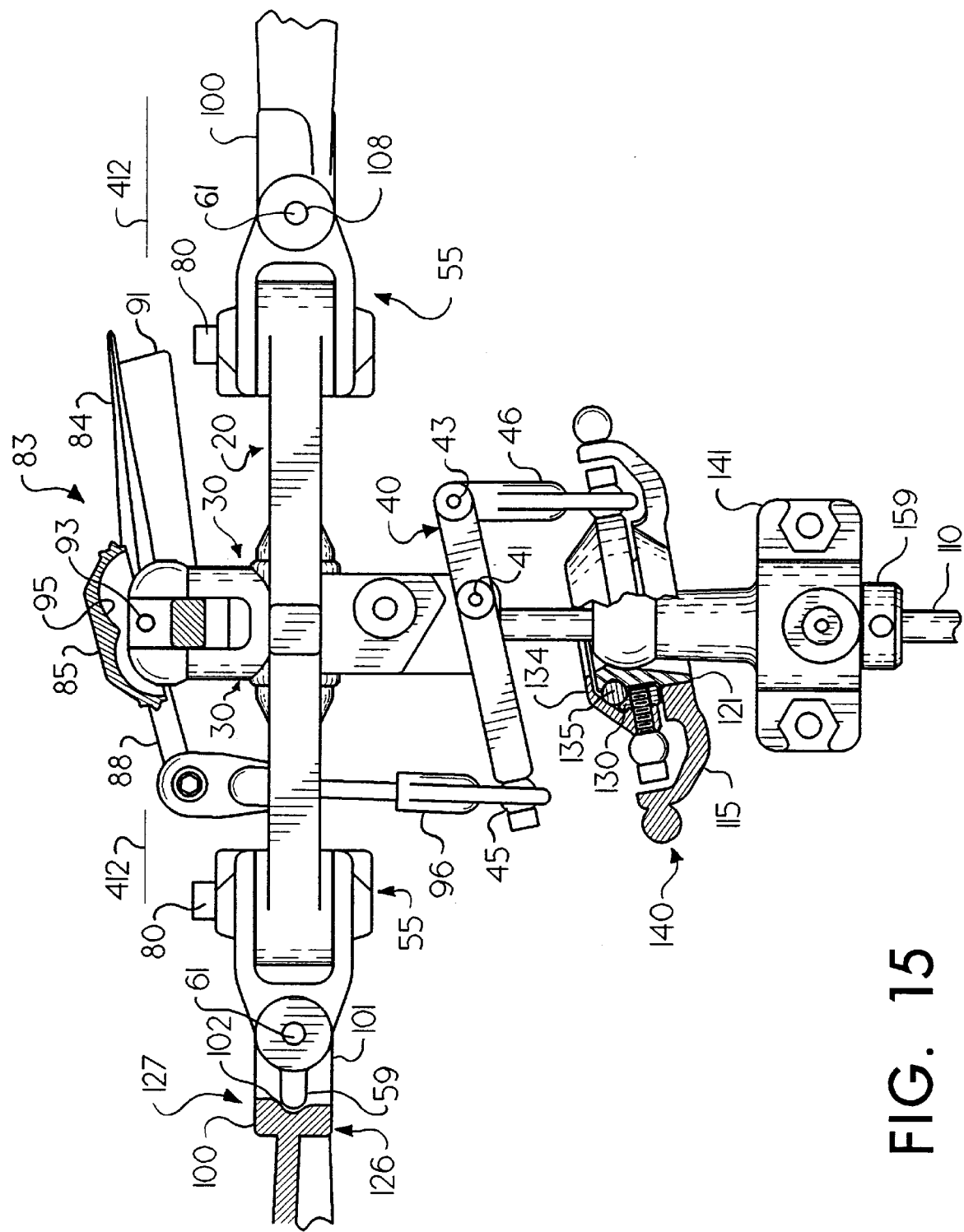
FIG. 15 is a side elevation view of the main rotor system of FIG. 1, with portions cutaway, showing stabilizer rotor control linkages that pitch the stabilizer rotor blades in response to tilting of the swashplate, and all other parts omitted for clarity.
Figure 15A:
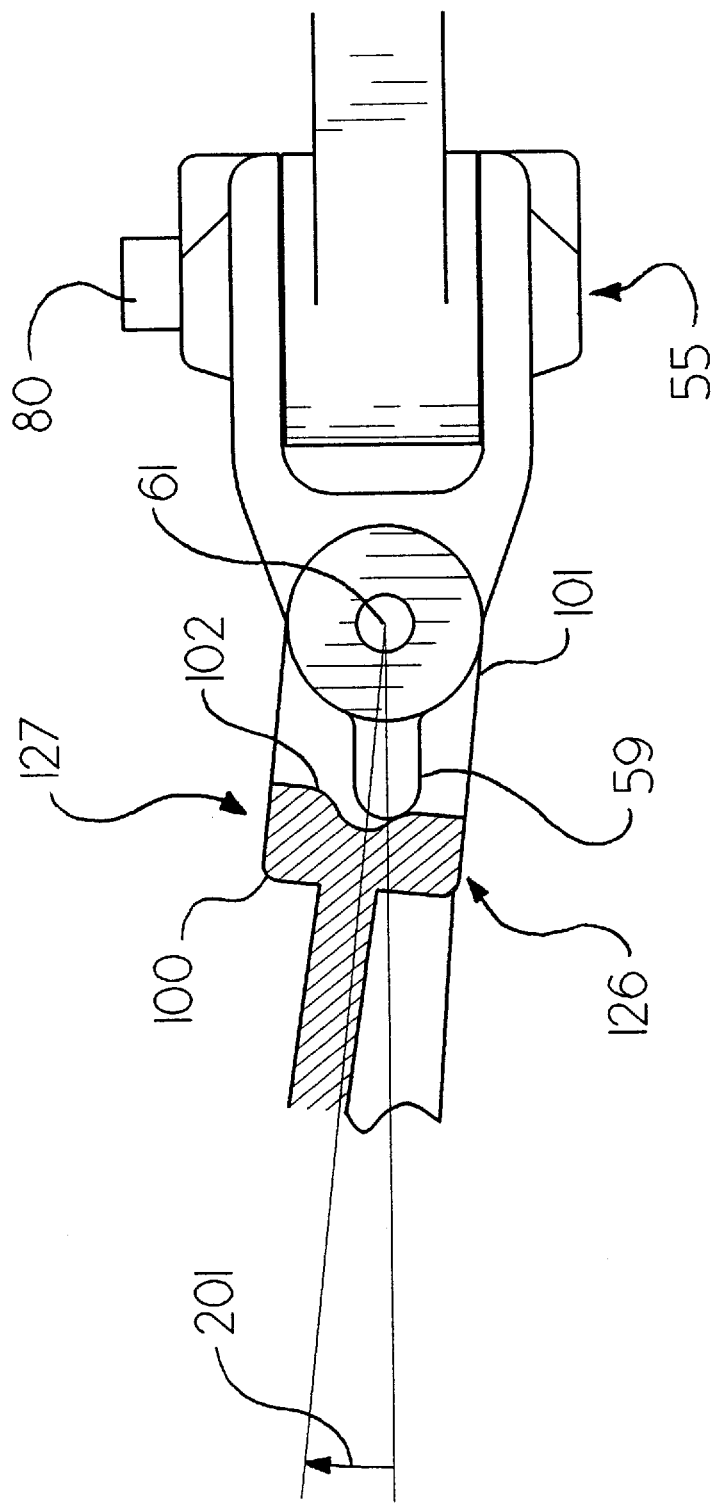
FIG. 15a is an enlarged side elevation view of the blade flapping mechanism of the main rotor system of FIG. 1 showing upward flapping of a rotor blade.
Figure 15B:
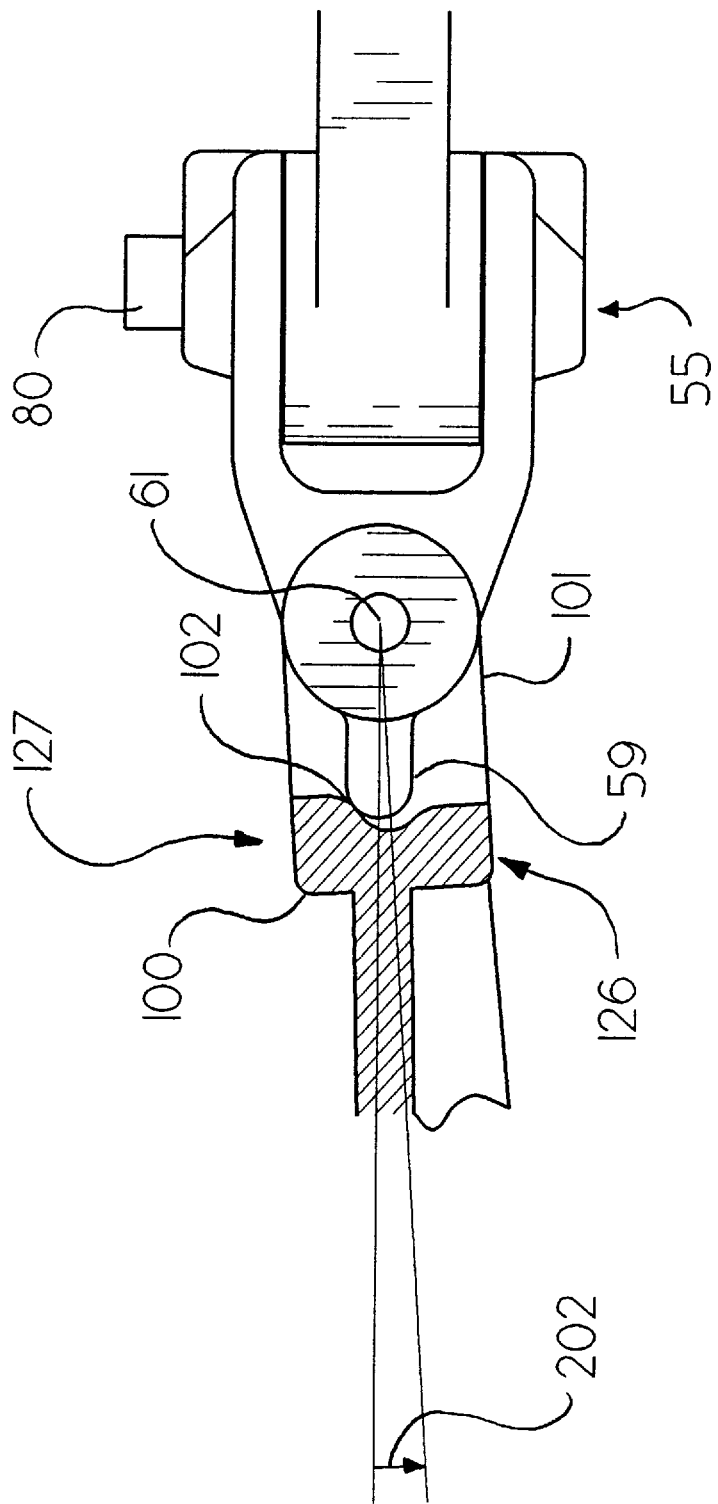
FIG. 15b is an enlarged side elevation view similar to FIG. 15a showing downward flapping of a rotor blade.

It can be seen that root airfoil 203 of rotor blade 100 shown in FIG. 17c is illustratively connected to a C-shaped root 101 shown in FIG. 17a which forms a flapping hinge for operably connecting rotor blade 100 to main rotor 1 of helicopter 15. In alternative embodiments of the present invention, C-shaped root may be replaced by a lead-lag hinge, feathering hinge, or rigid mounting. As shown in FIGS. 15, 15a, and 15b, rotor blade 100 can flap upward and downward about a flapping axis 61 in response to the aerodynamic and gyroscopic forces encountered in flight.

Rotor blades 100 of a preferred embodiment of the current invention have, in effect, a primary (nominal) configuration and a secondary (bent, folded, flexed, or other) configuration such that rotor blades 100 are transformed from a primary configuration to a secondary configuration during a crash or impact of model helicopter 15, and, after a period of time, return to their primary configuration, or can be returned to their primary configuration without repair, for subsequent or continued operation (repair, in this context includes, for instance, addition of reinforcing material or adhesives). The crashes can occur repeatedly at full rotor speed into solid surfaces such as concrete or grass growing in dry, hard-packed dirt. The primary and secondary configurations may result from properties of the material from which rotor blades 100 are manufactured, the geometry of the rotor blades 100, and the operation of mechanical mechanisms or combinations of all three. Rotor blades 100 having a primary and secondary configuration in accordance with the current invention are termed "dual-configuration rotor blades" herein.

In some preferred embodiments of the present invention, a temperature-sensitive material that changes color as temperature changes (a so-called "chromo-thermic" additive) may be added to the plastic resin of the rotor blades 100. Many types of plastic materials become stiff and brittle as ambient air temperatures approach the freezing point of water. If the temperature drops near freezing, for instance, the plastic in the rotor blades can turn from white to blue thereby providing a visual indication of rotor blade temperature. This provides a visual warning to the operator that the rotor blade is becoming cold and possibly brittle.

Rotor Blade Geometry

Main rotor blades 100 and stabilizer rotor blades 84 of the current invention are carefully designed to maximize flight performance of radio-controlled model helicopters 15 and keep the weight of helicopters 15 within certain bounds. Weight is an especially important consideration if the blades 100, 84 are to be made of a plastic material. Blades 100, 84 can substantially improve the flight performance of almost any size of conventional model helicopter. Blades 100, 84 are especially advantageous for use on small and mid-size model helicopters with rotors operating at tip Reynolds numbers less than about 120,000. Reynolds number is an aerodynamic scale factor which depends primarily upon airfoil chord length and operational speed.

In general, rotor design is a careful balance between rotor blade diameter, rotor blade solidity, rotor blade twist, rotor blade taper, airfoil chord, airfoil camber, airfoil thickness, airfoil pitch, and overall weight. Rotor blade diameter, rotational speed, and rotor blade solidity (defined as the total blade projected area divided by the total rotor disk area) are primarily important. Long, narrow, low-speed blades used on many conventional model helicopters produce high drag because of excessive frontal area. Short, wide, high-speed rotor blades produce high drag because of excessive speed of rotation. It can be shown mathematically that there is a theoretical optimum combination of primary rotor blade parameters that maximizes lift in hover.

Real helicopters, however, are rarely designed at the theoretical maximum point because of design requirements that conflict with maximizing lift in hover. Forward flight performance and stability both benefit from high-speed rotors. Heavy, high speed rotors are also more stable in hover than light, low speed rotors. High speed rotors are also less susceptible to wind gusts because the speed of the wind is low relative to the speed of the rotor blades.

Because of these conflicting requirements, there is no one best rotor blade design for a model helicopter, however, a class of rotor blades can be identified that is advantageous in a particular application. While the rotor blades of the current invention can benefit conventional large model helicopters, they are particularly advantageous when applied to small-size and mid-size model helicopters that spend most of their time upright during flight. The shape of the current rotor blades 100, 84 is not advantageous for helicopters designed to fly upside-down as are many aerobatic model helicopters, but the shape can be tailored so that certain aerobatic maneuvers are possible.

Figure 16A:
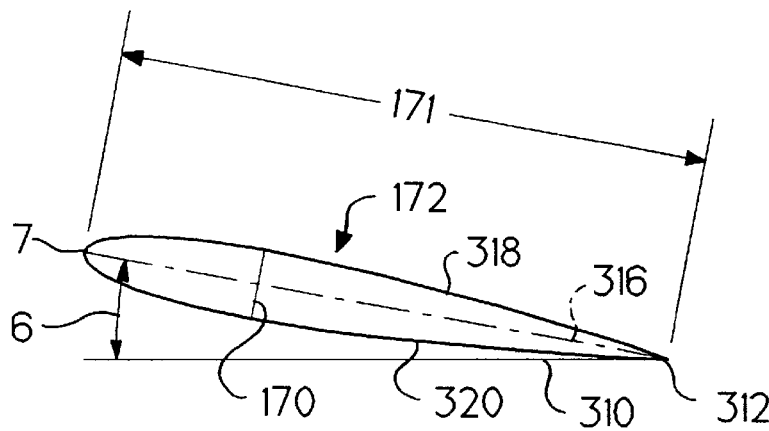
FIG. 16a is a cross-sectional view of a typical rotor blade for a model helicopter rotor shown at a positive pitch angle.
Figure 16B:
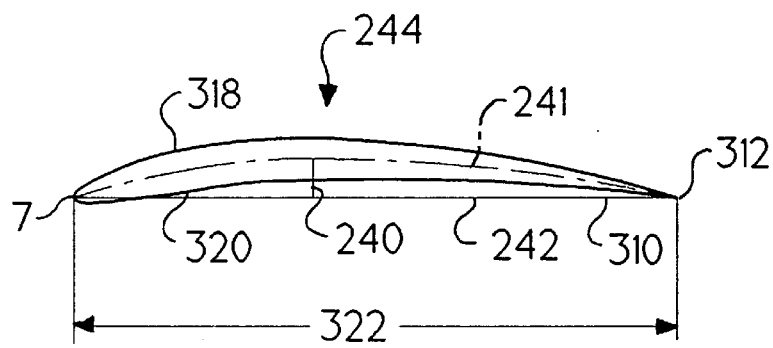
FIG. 16b is a cross-sectional view of a cambered airfoil shown at zero pitch angle.
Figure 16C:
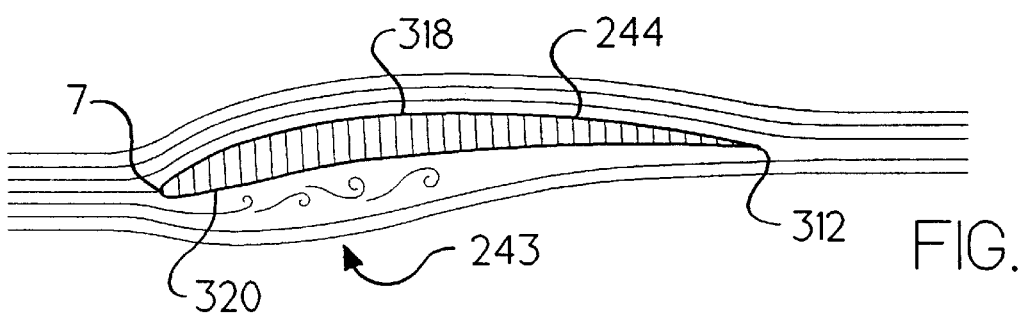
FIG. 16c is a schematic representation of separated airflow along a lower surface of a cambered airfoil operating at a negative pitch angle.
Figure 20:
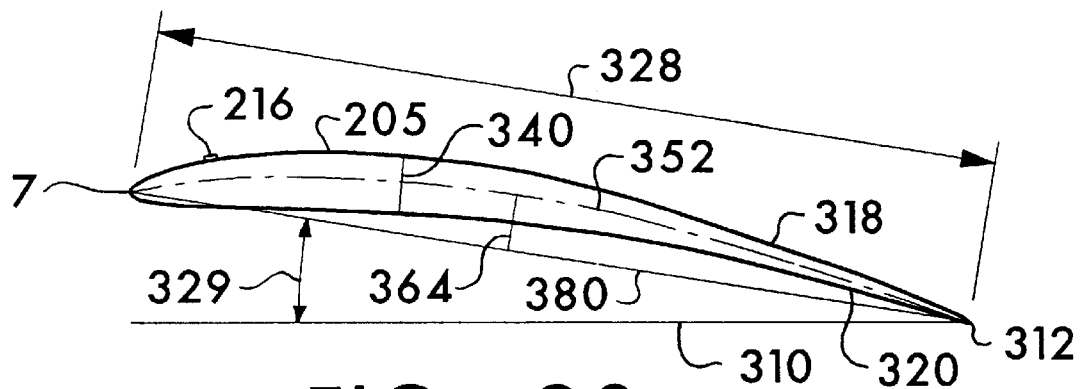
Figure 19:
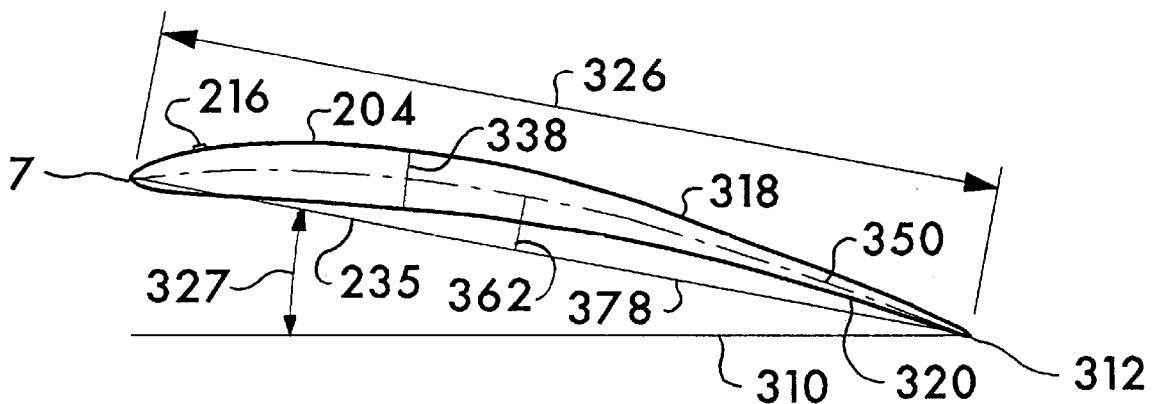
Figure 18:
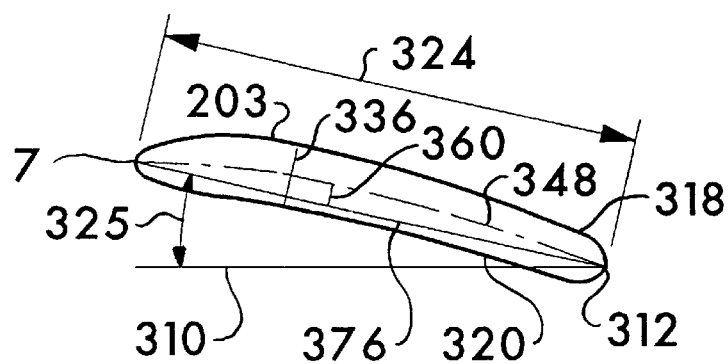
Figure 23:
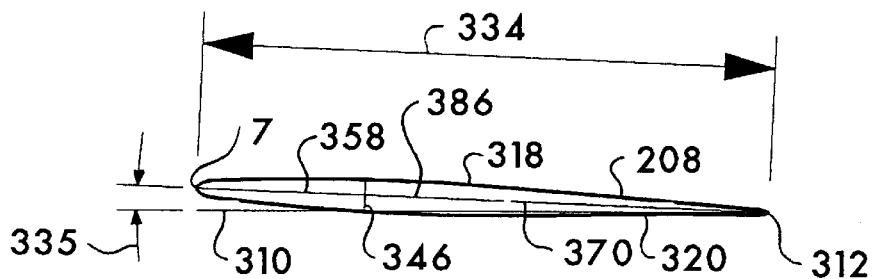
Figure 22:
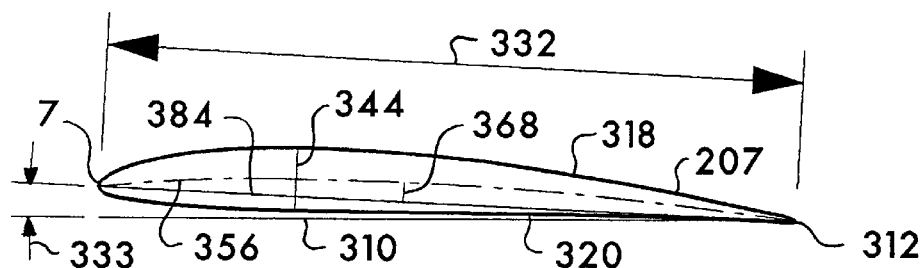
Figure 21:
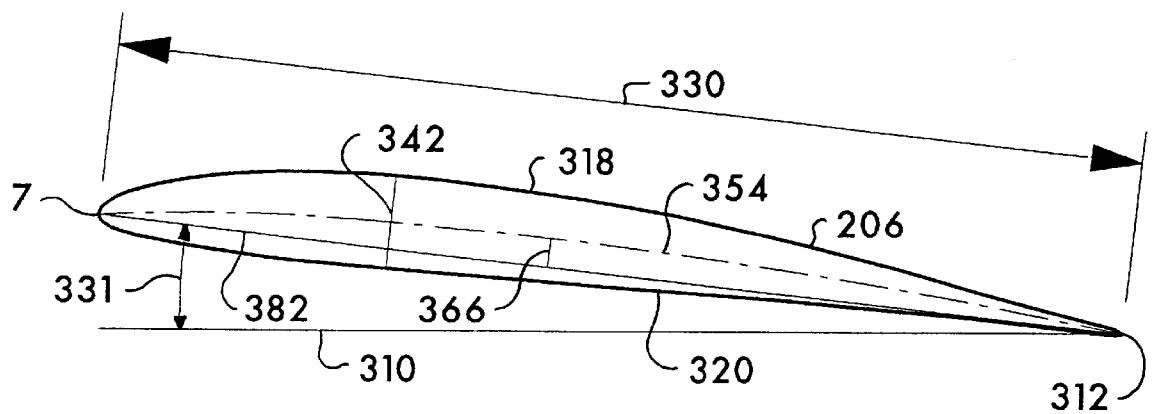

Two types of helicopter main rotor blade airfoils 172, 244 are shown in FIGS. 16a–16c. The most common airfoils 172 used on model helicopter main rotor blades 100 are symmetric about a straight camber line 316 (mean-line) as shown in FIG. 16a that extends between trailing edge 312 and leading edge 7. When camber line 316 is a straight line, camber line 316 is also called a chord line. Airfoil drag is greatly affected by airfoil thickness 170 which is usually expressed as a percentage of airfoil chord length 171. Airfoil thickness 170 of a typical model helicopter rotor blade airfoil 172 is 12% to 15% of airfoil chord length 171. Thick airfoils 172 develop high drag, but increase the angle-of-attack at which separation (stall) occurs.

A cambered airfoil 244 having a curved camber line 241 is shown in FIG. 16b. Because cambered airfoil 244 is curved, airfoil 244 includes a separate camber line 241 and chord line 242. Chord lines 242 always extend in a straight line between leading edge 7 and trailing edge 312. Camber lines 241 extend between leading edge 7 and trailing edge 312 midway between an upper surface 318 and lower surface 320 of rotor blades 100. Airfoil camber is commonly measured as the maximum distance 240 between airfoil camber line 241 and chord line 242 along a line situated perpendicular to chord line 242, and is expressed as a percentage of chord length 322. Cambered airfoils such as airfoil 244 generate positive (upward) lift when airfoil camber line 241 is cupped downward as shown in FIG. 16b. Airfoil lifting potential is greatly affected by airfoil camber. To a certain extent, the higher the camber, the higher the lifting potential.

For high lift and low drag, therefore, it seems advantageous to employ thin, highly cambered airfoils on rotor blades 100. In practice, however, rotor blades 100 with these airfoils do not perform as expected and designers are forced to employ more familiar traditional airfoils.

One problem is that cambered airfoils such as airfoil 244 generate aerodynamic twisting forces (pitching moments) that cause the cambered airfoil 244 to pitch downward toward lower (negative) angles-of-attack 6. Helicopters rotors rarely employ highly cambered airfoils 244 because the camber exerts twisting forces on the rotor blades 100 and blade pitch control linkages. These twisting forces can distort rotor blades 100 in flight and overload the main rotor control system.

It is widely known that airflow over the upper surface 318 of an airfoil can separate from the upper surface 318 of the airfoil at high positive angles-of-attack 6. Separated airflow substantially increases aerodynamic drag. The angle-of-attack at which separation starts to occur is generally taken as the operational upper limit of the airfoil. Minimum or negative limits are not usually considered since low or negative angles-of-attack are only necessary when an aircraft is maneuvering or descending, in which case maximizing positive lift is not as important.

Airfoil camber also affects the way an airfoil stalls. Airflow along the underside of a thin, highly cambered airfoil can become separated if the airfoil is pitched below a certain angle-of-attack 6. FIG. 16c depicts separated airflow 243 on the lower surface 320 of cambered airfoil 244 which is pitched to a negative angle-of-attack relative to the oncoming airflow. The airflow cannot follow the contour of the relatively sharp leading edge 7 of thin airfoil 244 and separates from the lower surface 320. This problem is especially severe for small airfoils operating at Reynolds numbers below about 50,000 because of aerodynamic scale effects. This means that thin, cambered airfoils 244 can have both a maximum and minimum angle-of-attack limit.

For helicopter designers this is problematic because rotor blades 100 operate within a very narrow angle-of-attack range, and designers cannot arbitrarily increase main rotor blade 100 pitch to lie above the minimum angle-of-attack 6 limit because the extra main rotor blade 100 pitch angle 6 will overload the engine 3 driving main rotor 1. Reducing rotor diameter 249 or blade chord length 171, 322 to unload engine 3 will upset the careful balance of rotor parameters and helicopter 15 may not generate enough lift to fly. Even if helicopter 15 flies with rotor blades 100 pitched above the minimum limit, the rotor blades 100 must be cyclically pitched to low or negative angles-of-attack 6 for forward flight and maneuvers, so lower-surface separation is likely to occur at some point causing cyclic drag and vibration. The solution to the problem lies in the proper selection of the airfoil, chord length 171, 322, and pitch angle 6 at each spanwise station of the rotor blade 100. The rotor blade 100 parameters that follow work very well in practice, and are novel in the field of radio-controlled model helicopters.

As shown in FIGS. 17a and 17b, a rotor blade 100 in accordance with a preferred embodiment of the current invention has an inboard section 211, a transition region 212, and an outboard section 213. Several sectional views of rotor blade 100 are shown in FIGS. 17c–17h to illustrate various airfoils 203–208 along the length of rotor blade 100. These sectional views 17c–17h are shown in enlarged views in FIGS. 18–23. Each airfoil 203–208 includes a chord line 376, 378, 380, 382, 384, 386, respectively, that is oriented relative to steady-state main rotor blade plane of rotation 310 to provide each airfoil, 203–208, with a particular pitch angle or angle-of-attack 325, 327, 329, 331, 333, and 335, respectively. In addition, each airfoil 203–208 includes a chord length 324, 326, 328, 330, 332, 334, respectively, a thickness 336, 338, 340, 342, 344, 346, respectively, a camber line 348, 350, 352, 354, 356, 358, respectively, and camber 360, 362, 364, 366, 368, 370, (camber 370 is equal to zero), respectively, with camber expressed as the maximum distance between chord line 376, 378, 380, 382, 384, 386, respectively, and camber line 348, 350, 352, 354, 356, 358, respectively measured along a line perpendicular to chord line 376, 378, 380, 382, 384, 386, respectively.

Inboard section 211 includes airfoils with a wide maximum chord length 326 (about 7% to 10% of rotor diameter 249 shown in FIG. 1) and small thickness 338 (about 4% to 8% of chord length 326), highly cambered 362, 364 (about 4% to 7% of chord length 326) airfoils 204 and 205, with airfoil 203 pitched to a high angle-of-attack 325 (about 8 to 14 degrees) relative to the angle-of-attack 335 of tip airfoil 208. These airfoils 204, 205 generate substantial lift while helicopter 15 is hovering and are generally pitched to a higher angle-of-attack 327, 329 than airfoils 206, 207 in outboard section 213 to prevent lower-surface separation. If root airfoil 204 is highly cambered, a good trade-off between maximum hover lift and forward flight performance can be attained by pitching chord line 378 of root airfoil 204 about 6 to 12 degrees higher than chord line 386 of tip airfoil 208 situated adjacent to blade tip 237. As root airfoil 204 camber is reduced, so should be the maximum angle-of-attack 327, so that at zero camber, pitch angle 327 of root airfoil 204 is about 5 to 10 degrees higher than pitch angle 335 of tip airfoil 208.

The wide chord length 326 of inboard section 211 increases operational Reynolds number which reduces the sectional drag coefficient, minimizes the possibility of separation, and induces more airflow over inboard section 211 which is traveling more slowly than outboard section 213. Proper inboard airfoil 211 selection is particularly important for Reynolds numbers less than 50,000. Airfoils designed for use with turbulators, such as turbulator strip 216, as shown in FIGS. 17a and 17b, are applicable in this inboard section 211. Thin inboard airfoils 204 and 205 are generally chosen to reduce the drag and weight of inboard section 211. Because rotor blade 100 on a preferred embodiment of the current invention is designed to be manufactured from a relatively dense plastic material, weight is an important consideration. In alternative embodiments of the present invention, the rotor blades for a particular application may be made of a low density material and thus thicker inboard airfoils may be used if desired.

Outboard section 213 of rotor blade 100 includes airfoils 206 and 207 that can operate at low and/or negative angles of attack 331, 333 without lower surface separation. Outboard airfoils 206 and 207 have a narrower chord length 330, 332 (about 3% to 6% of main rotor blade diameter 249) with lower camber 366, 368 (about 0% to 4% of local chord length 330, 332) than inboard airfoils 204 and 205 to reduce the drag of outboard section 213 and subsequently the engine 3 power consumed by rotor blades 100. Outboard airfoils 206, 207 have a greater thickness 342, 344 (about 8% to 11% of the local chord length 330, 332 of airfoils 206, 207, respectively) for a broader range of allowable pitch angles 331, 333.

It should be noted that the Reynolds numbers associated with rotor blades on full-size helicopters are orders of magnitude higher than those of model helicopters. Full-size rotor blade designs are driven more by sonic-shock effects at the blade tips than by lower surface separation. In addition, full-size helicopters never utilize thin airfoils with so much camber that lower-surface separation is a problem. Because of differences in scale and operational speeds, very thin, highly cambered airfoils are usually applicable only to model helicopters.

In addition to lower surface separation, upper surface separation is a concern at low Reynolds numbers. Where possible, airfoils should be designed and tested for use at the particular Reynolds numbers expected when hovering. An incorrectly chosen airfoil designed for use at high Reynolds numbers may develop an upper-surface separation bubble. Separation bubbles are difficult to diagnose in practice, but can substantially increase the power consumption of a rotor blade.

Some thin airfoils, and airfoils operating at very low Reynolds numbers can benefit from turbulator strips such as turbulator 216 shown in FIG. 17a appended to the upper surface 318 of airfoils 204 and 205 on rotor blade 100. Turbulators 216 are usually thin, raised strips of material running spanwise about 10% to 20% back from leading edge 7 of an airfoil (upper and/or lower surface 318, 320) that induce the airflow to become turbulent and stick more readily to the surface 318, 320 of the rotor blade 100. Turbulators are usually about 1% of local chord length in width and 0.2% of local chord length in height. Turbulators 216 can reduce the drag produced by some airfoils operating at certain (especially low) speeds where the airflow tends to separate from the surface 318, 320. While turbulators 216 have found applications on some fixed wing-aircraft such as radio-controlled gliders, turbulators 216 on helicopter rotor blades 100 are novel because most helicopters currently available utilize relatively large, high speed rotors where turbulators 216 are not beneficial. Turbulators 216 for use on the inboard sections 211 of rotor blades 100 for radio-controlled model helicopter 15 were first disclosed by Paul Arlton et. al. in U.S. patent application Ser. No. 08/233,159 filed Apr. 25, 1994 which is hereby incorporated by reference.

Transition region 212 is located between inboard section 211 and outboard section 213 of rotor blade 100. Transition region 212 is roughly 8% or less of rotor diameter 249 in length and is used to smoothly transition from inboard airfoil 205 to outboard airfoil 206. The actual spanwise location of transition region 212 is usually centered about 40% of rotor diameter 249 inboard of blade tip 237, but may be shifted inboard or outboard depending on the particular application for which rotor blade 100 is used. On small helicopter 15 shown in FIG. 1 with a rotor diameter 249 of about 24 inches and rotor blades 100 operating at a tip Reynolds number of about 90,000 to 100,000, for instance, the center of transition region 212 is located at the spanwise station where Reynolds number crosses 60,000. It is assumed that the danger of separation is greatest below a Reynolds number of 50,000 and that a transition region 212 centered at the region of rotor blade 100 where the Reynolds number is 60,000 provides a margin of safety for the composite airfoils in transition region 212. As a precaution, turbulator strip 216 extends into transition region 212 to insure attached flow in transition region 212.

It should be noted that transition region 212 lengths in excess of 8% of the rotor diameter 249, while within the scope of the invention, are not preferred. The airfoils selected for the inboard and outboard sections 211, 213 of blade 100 are designed to operate at particular Reynolds numbers and angles-of-attack. The airfoils in transition region 212 are usually mathematical composites of these airfoils and may violate certain surface curvature principles known to minimize the possibility of separation.

While maximizing lift is the primary consideration at inboard section 211 of rotor blade 100, minimizing drag is the most important consideration at outboard section 213. High lift at the end of outboard section 213 near blade tip 237 is not desirable because it will induce high drag at a portion of rotor blade 100 furthest from the center of rotation of the main rotor 1 (main rotor rotation axis 9 in FIG. 1).

This equates to high driving torque which consumes substantial power of engine 3. The last ½ tip-chord length of rotor blade 100 between airfoils 207 and 208 is designated as a non-lifting tip. Airfoil 208 should not be cambered and should be as thin (thickness 346 of about 4% to 9% of local chord length 334) and streamlined as reasonably possible. Trailing edge 312 design is also important to reducing drag. All airfoils should have very thin, sharp trailing edges 312.

Because the chord lengths 330, 332, 334 of airfoils 206, 207 and 208, respectively, are preferably shorter than chord lengths 326, 328 of airfoils 204 and 205, respectively, the planform of rotor blade 100 appears tapered when viewed from above as shown in FIG. 17*a*. Taper ratios of roughly 2:1, expressed as the ratio of the chord length 326 of airfoil 204 to the chord length 332 of airfoil 207, are common with the current invention. Lower sensitivity to rotor blade pitch adjustment which is advantageous on fixed-pitch main rotor systems can be attained with taper ratios of about 2.5:1 (as will be discussed in more detail later).

Much experimental work on low speed aerodynamics has been conducted for radio-controlled gliders. Although designed for use on airplanes, glider airfoils may be advantageously employed on helicopters rotor blades if carefully selected.

A detailed description of an example rotor blade embodiment in accordance with the current invention is described in U.S. patent application Ser. No. 08/292,719 filed Aug. 18, 1994, by Paul E. Arlton which is incorporated herein by reference. In this embodiment, main rotor 1 is 24 inches in diameter and operates at about 1,400 to 1,600 RPM while hovering and at about 1800 to 1900 RPM maximum. Airfoils 204 and 205 are 7.1% thick 338, 340 Sokolov airfoils with 6% camber 362, 364 (where thickness and camber are measured as a percentage of chord lengths 326, 328, respectively) and have turbulator strip 216 appended to the upper surface 318 at the 10% chord location (as described by Dieter Althaus in his book "Profilpolaren Fur Den Modellflug" published by C. F. Muller in Germany). Airfoils 204 and 205 in this embodiment can also be other similar airfoils suitable for use at Reynolds numbers below about 60,000. Airfoils 206 and 207 are 9.2% thick 342, 344 SD7037-PT airfoils with 3% camber 366, 368 (where thickness and camber are measured as a percentage of chord lengths 330, 332, respectively) developed by Michael Selig et. al. for use on gliders at low Reynolds numbers (described in Soar Tech 8 published by H. A. Stokely of Virginia Beach, Va., USA). It will be understood that airfoils 206 and 207 in this embodiment may be other similar airfoils suitable for use in the Reynolds number range of 50,000 to 100,000. Airfoils 204, 205, 206, and 207 are pitched about main rotor blade pitch axis 5 to 8.8, 7.0, 4.4, and 0.5 degrees respectively relative to tip airfoil 208.

This example embodiment illustrates an advantage of small rotor blades 100 configured in accordance with the current invention for use on small and mid-sized radio-controlled model helicopters 15. The main rotor blades 100 in this example embodiment are made of nylon, weigh 22 to 25 grams, and generate 20 to 25 pounds of centrifugal force when operated at a tip Reynolds number of about 90,000. Traditional balsa and maple wood rotor blades in this application would generate about 10 pounds of force. The 10 to 15 pound difference in centrifugal force in this example compares to the 500 to 1500 pounds of added centrifugal force that could be expected if plastic blades are used on large model helicopters (as previously discussed). This vast difference in operational forces contributes to the durability of the example rotor blade 100 and the model helicopter 15 to which it is attached.

Several other features of rotor blades 100 configured in accordance with the current invention make them particularly well suited for use on small-and mid-size model helicopters, especially those with fixed-pitch main rotors such as main rotor 1 shown on helicopter 15 in FIG. 1. In practice, the pitch of a fixed-pitch rotor blade 100 is difficult to accurately adjust. Even small changes in the pitch of a traditional constant-chord blade (not shown) will alter the aerodynamic drag produced at the tip of the traditional constant-chord blade (not shown) enough to load or unload the engine. Because outboard section 213 of blade 100 generally has a narrow chord length 334 at blade tip 237, changes in blade pitch 335 will not generate significant changes in drag. Rotor blades 100 in accordance with the current invention are therefore less pitch sensitive and easier to adjust than traditional constant-chord blades.

Another advantage of rotor blades 100 for use on fixed-pitch rotor systems which rely on variable rotor speed for altitude control, is that center-of-gravity 238 is located approximately 60% of the length of blade 100 inboard of tip 237 and is closer to the main rotor hub 29 than the center-of-gravity of a conventional constant-chord blade. This means that the rotational moment of inertia of rotor blade 100 will be lower so that main rotor 1 will respond more rapidly to changes in engine 3 torque and provide better altitude control of model helicopter 15.

Rotor blade 100 also reduces pitching forces generated by airfoil camber. Conventional rotor blades (not shown) for model helicopters are mounted to the main rotor hub to pitch about their 25% average chord location. The center of gravity of these conventional rotor blades (not shown) must be located on the 25% average chord location, or the conventional rotor blades will lead (swing forward) in flight and become unstable and pitch divergent.

Rotor blade 100 is pivotably mounted to rotor hub 29 to pitch about a pitch axis 50 located about 43% aft of leading edge 7 to coincide with center of gravity 238, instead of aerodynamic center of pressure 388, so that rotor blades 100 do not lead or lag appreciably in flight. A benefit for collective pitch rotor systems is that coning (when all blades 100 flap upward simultaneously) of rotor blades 100 tends to lift the center of gravity 238 of rotor blades 100 out of the main rotor plane of rotation 310. Because the center of gravity 238 of rotor blades 100 is located behind the aerodynamic center of pressure 388 (which is approximately 25% aft of the leading edge 7), centrifugal forces acting through the center of gravity 238 will produce a pitch-up moment that helps offset the negative pitching moment of the cambered airfoils 204–207. In addition, low aerodynamic pitching forces at blade tip 237 of rotor blade 100, due to reduced camber of airfoils 206–208, result in lower twisting forces throughout the length of rotor blade 100. This is advantageous when rotor blade 100 is manufactured of a flexible plastic material.

The foregoing description of a preferred embodiment of the current invention illustrates a method for designing rotor blades 100 that transition between two airflow or Reynolds number regions across the span of the rotor blade 100. Additional regions may be added for particular purposes (such as to account for the change in airflow over main rotor blade 100 induced by stabilizer rotor blades 84) and are within the spirit and scope of the invention. Although the invention is primarily useful on main rotor blades 100, it can be advantageously employed on tail rotor blades 17. The current invention also illustrates a blade design that may be advantageously manufactured from a plastic material, for instance, nylon, ABS, or polycarbonate.

Rotor blades 100 in accordance with the current invention having an inboard section 211 with higher camber than the outboard section 213 are termed "dual-camber rotor blades 100" herein. Rotor blades 100 having thin, wide airfoils (measured as a percentage of local chord length) in the inboard section 211, and thicker, narrower airfoils (measured as a percentage of local chord length) in the outboard section 213 are termed "weight-reduced rotor blades 100" herein. Rotor blades 100 having an outboard section 213 with reduced pitch and reduced camber relative to the inboard section 211, are termed "lower-surface separation-controlled rotor blades 100" herein. Rotor blades 100 having an outboard section 213 with an average chord length less than the chord length of the inboard section 211 are termed "pitch-insensitive rotor blades 100" herein.

Stabilizer Rotor Blade Configuration

Stabilizer rotor 83 shown in FIG. 1, for instance, performs three functions: 1) As part of the main rotor control system, stabilizer rotor 83 amplifies pilot control commands to main rotor blades 100; 2) As part of the main rotor stability system, stabilizer rotor 83 keeps main rotor 1 spinning in a constant plane in space; and 3) Stabilizer rotor 83 produces lift to reduce or eliminate the reversed airflow commonly found near main rotor hub 29.

Stabilizer rotor 83 includes stabilizer rotor blades 84 that are preferably only half or less as long as main rotor blades 100. Stabilizer rotor 83 is connected to main rotor shaft 110 to rotate about main rotor rotation axis 9 in a stabilizer rotor blade plane of rotation. Stabilizer rotor blades 84 rotate in a steady-state stabilizer rotor blade plane of rotation 412 when stabilizer rotor blade plane of rotation is perpendicular to main rotor rotation axis 9.

Figure 32:
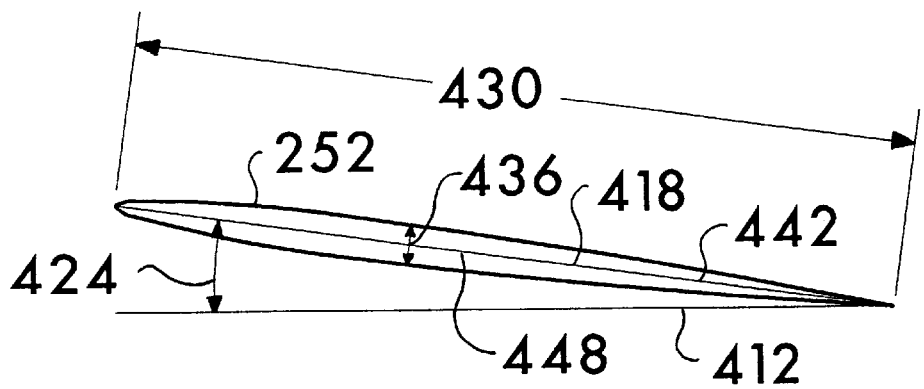
Figure 33:
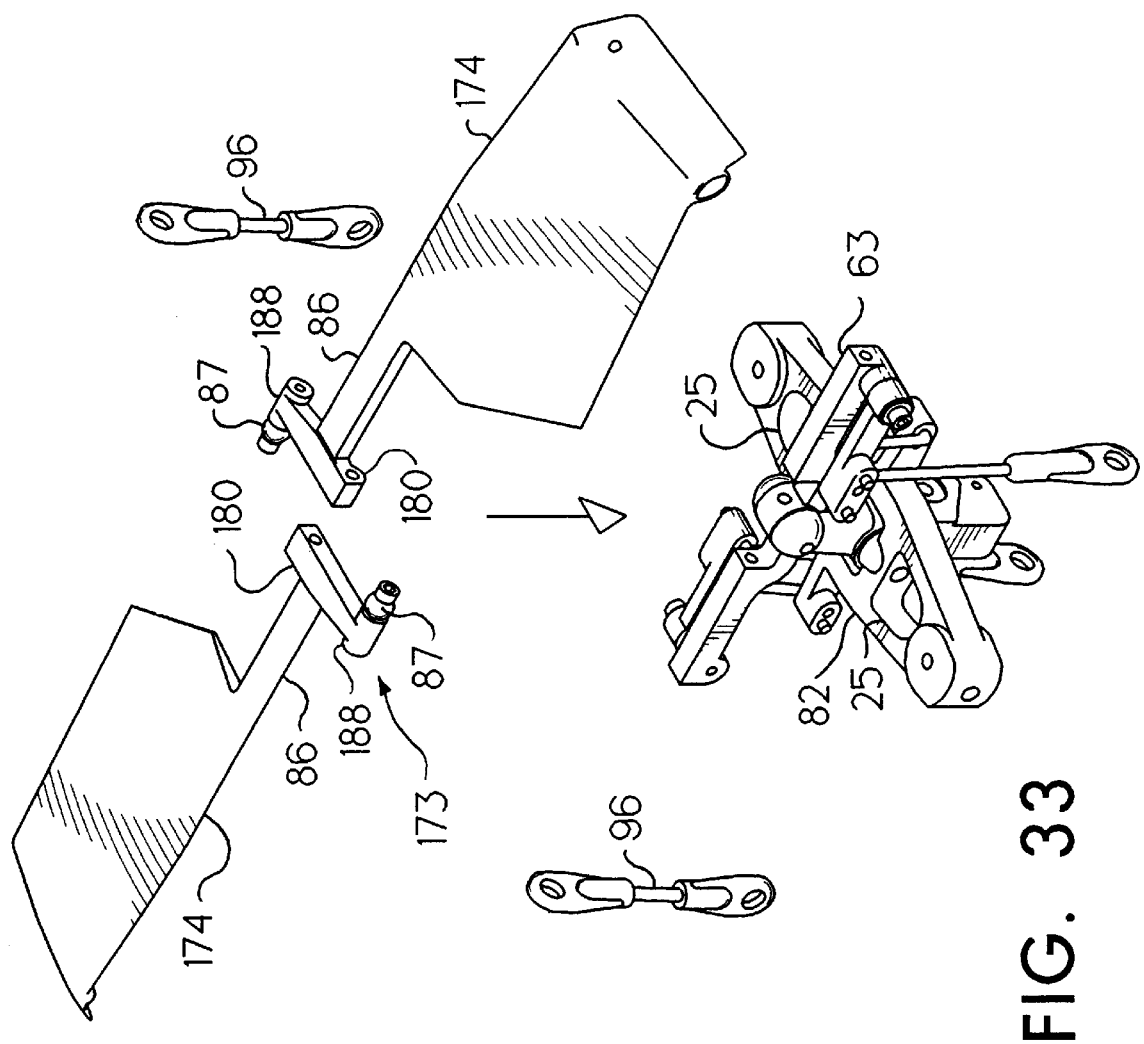
FIG. 33 is a perspective view of an alternative embodiment of stabilizer rotor system employing collectively adjustable stabilizing rotor blades.

Two embodiments of stabilizer rotor blades are described and illustrated in the present invention. Stabilizer rotor blades 84 are shown in FIGS. 9, 10, 11, 15, and 29a–32, and a split stabilizer rotor 173 including split stabilizer rotor blades 174 is shown in FIG. 33.

Stabilizer rotor blades 84, 174 can be advantageously employed on all sizes of helicopters, and can be designed with many of the same features described above for main rotor blades 100. In their most basic form, stabilizer rotor blades 84, 174 are shorter blades that increase the blade density near the center of main rotor 1 as shown in FIG. 1. Stabilizer rotor blades 84, 174 are pitched upward to increase the lift of main rotor 1 and may be set at a fixed pitch relative to each other or may be independently pitchable for use on collective-pitch rotor systems. Even if not designed to provide a substantial lift force, stabilizer rotor blades 84 develop substantially less aerodynamic drag than do the round flybar wires (not shown) of common flybar stabilizers.

Figure 14:
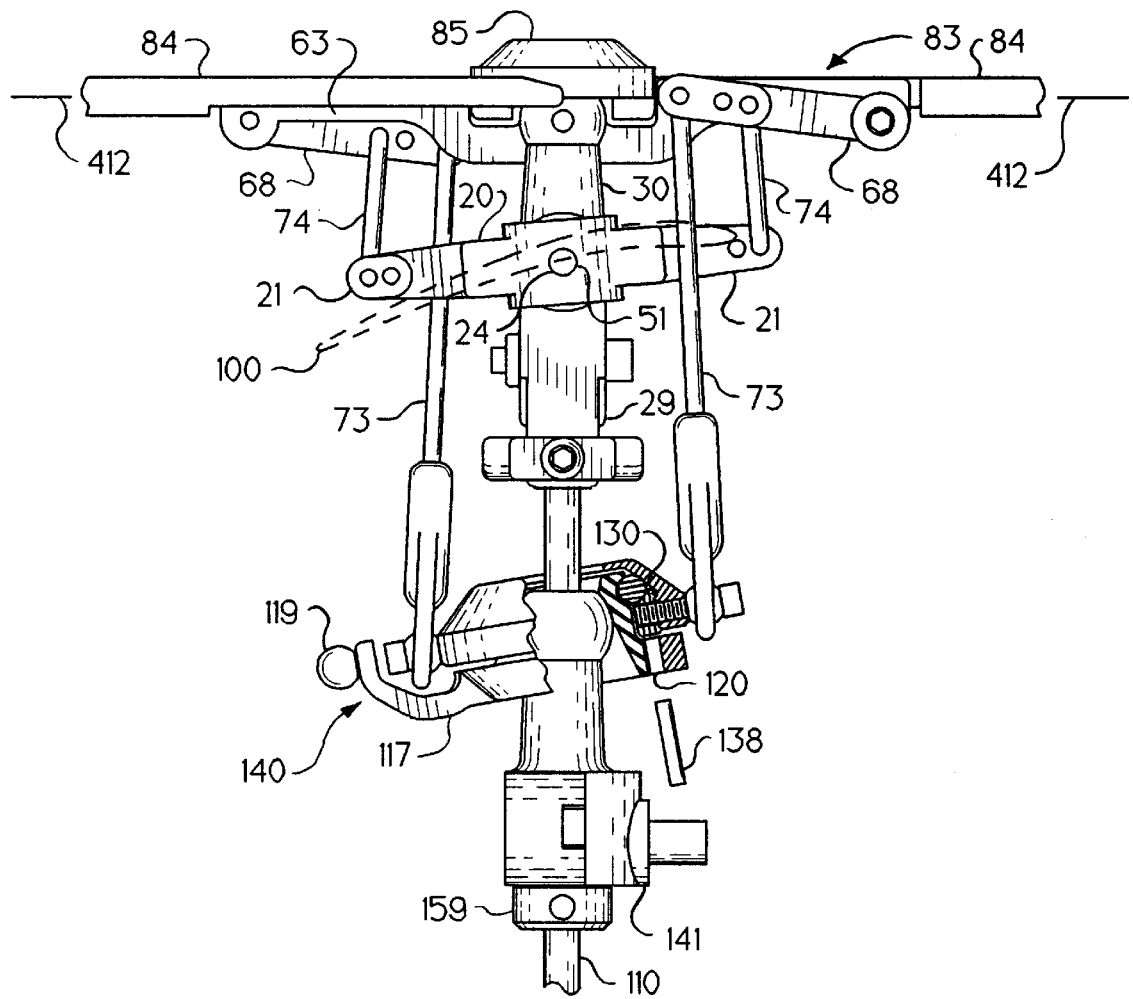
FIG. 14 is a side elevation view of the main rotor system of FIG. 1, with portions cutaway, showing a swashplate and mixing arm control linkages connected to the swashplate to cause the main rotor blade to be pitched in response to tilting of the swashplate, with all other parts omitted for clarity.
Figure 31:
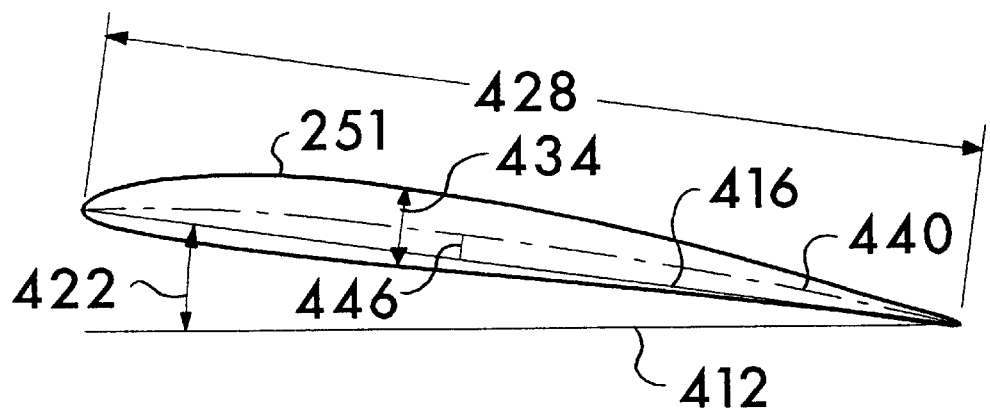
Figure 30:
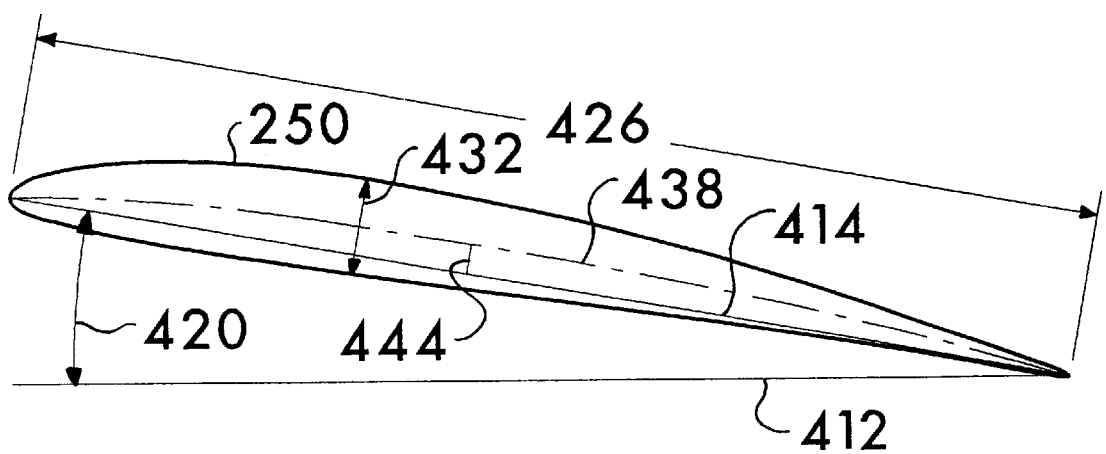

Several airfoils 250, 251, 252 of stabilizer rotor blade 84 are shown in FIGS. 29b–29d. Enlarged views of airfoils 250, 251, 252 are shown in FIGS. 30–32. Each airfoil 250–252 includes a chord line 414, 416, 418, respectively, that is oriented relative to stabilizer rotor blade plane of rotation 412 shown in FIGS. 14 and 15 to provide each airfoil, 250–252, with a particular steady-state pitch angle or angle-of-attack 420, 422, 424. In addition, each airfoil 250–252 includes a chord length 426, 428, 430, respectively, a camber line 438, 440, 442, respectively, a thickness 432, 434, 436, respectively, and a camber 444, 446, 448, respectively, where thickness and camber are measured as a percentage of chord length 426, 428, 430, respectively, and where camber 444, 446, 448 is measured as the maximum distance between camber line 438, 440, 442 and chord line 414, 416, 418, respectively, along a line drawn perpendicular to chord line 414, 416, 418, respectively.

As part of the main rotor control system, stabilizer rotor blades 84, 174, can be expected to pitch through a wide range of angles-of-attack including negative angles. For this reason, stabilizer rotor airfoils 250 and 251 shown in FIGS. 29a–32, are generally chosen to be about 8% to 11% thick 432, 434 with about 0% to 4% camber 444, 446 (where thickness and camber are measured as a percentage of chord lengths 426 and 428, respectively). Airfoil 252 is shown with zero camber 448 and small thickness 436 (about 5% of chord length 430) relative to airfoils 250, 251.

The steady-state pitch or angle-of-attack 420, 422, 424 of each spanwise station of stabilizer rotor blades 84 is usually set relative to the corresponding station of the inboard section 211 of main rotor blades 100 as shown in FIGS. 17c–23. If an airfoil of a stabilizer rotor blade 84 has the same camber as the corresponding main rotor airfoil, then it is generally pitched to the same angle-of-attack. If the stabilizer rotor airfoil has less camber, then it is generally pitched to a lower angle-of-attack. An empirical formula of about 1 degree of pitch difference for every 2 degrees of camber difference can be used successfully on model helicopters.

Root airfoil 250 of stabilizer rotor blade 84 preferably has a chord length 426 roughly equal to root chord length 324 of main rotor blade 100 (about 7% to 10% of main rotor diameter 249). Root airfoil 250 is generally located at approximately the same radial distance 452 from main rotor rotation axis 9 shown in FIG. 29a from as is root airfoil 204 of main rotor blade 100 if this is possible without interfering with the mechanical linkages of the main rotor 1 such as mixing arms 68 shown in FIG. 8. The tip chord length 430 of airfoil 252 of stabilizer rotor blade 84 is preferably 10% to 16% of a diameter 456 of stabilizer rotor 83 as shown in FIG. 9. The last ⅓ tip-chord length of stabilizer rotor blade 84 is designated as a low-drag tip 458 having no camber.

If stabilizer rotor blades 84 are designed to operate at Reynolds numbers below about 60,000, it is desirable that the airflow over stabilizer rotor blades 84 be turbulent to prevent separation. Turbulators 216, as described above for use on main rotor blades 100, may be advantageously employed on stabilizer rotor blades 84.

Figure 9:
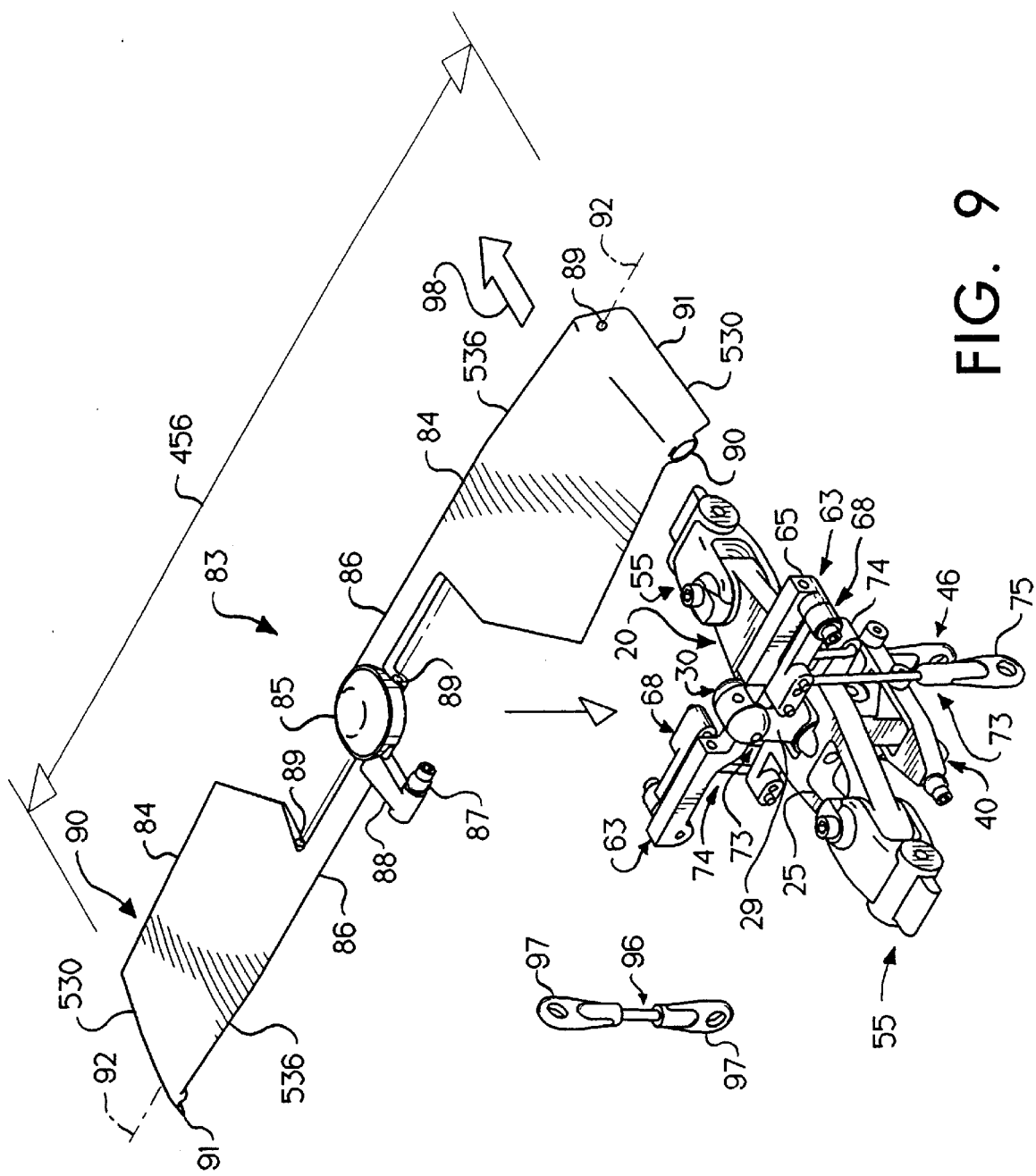
FIG. 9 is an exploded perspective view of the assembly of FIG. 8 showing stabilizer rotor blades exploded away from the assembly, with all other parts omitted for clarity.
Figure 10:
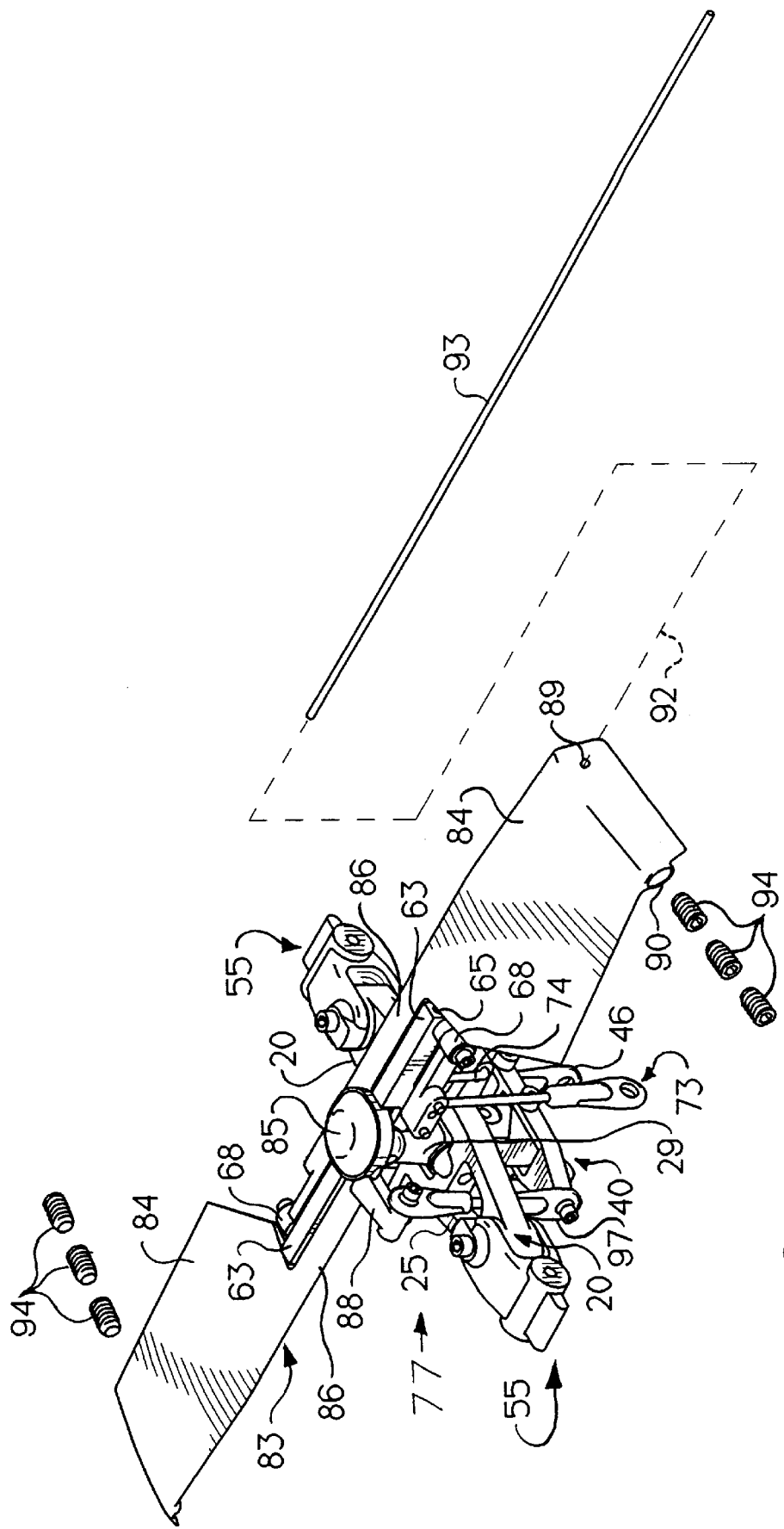
FIG. 10 is an exploded perspective view of the assembly of FIG. 9 showing the stabilizer rotor blades connected to the assembly and a stabilizer pivot rod and weights exploded away from the stabilizer rotor blades, with all other parts omitted for clarity.

Stabilizer rotor inertia is important to the gyroscopic stability of main rotor 1 so streamlined weights or bulges 94 are usually attached at the outboard end of stabilizer rotor blades 84 as shown in FIG. 10. The long dimension of the weights 94 is preferably configured perpendicular to the stabilizer rotor pitch axis 92 to expose the least frontal area to the airflow to minimize drag. Additional tip weight may be molded into the plastic of stabilizer rotor blade 84 if desired. In the embodiment shown in FIGS. 2 and 9, stabilizer rotor 83 has a diameter 456 of 9.5 inches and weighs 26 grams without stabilizer rotor weights 94. For the best combination of stability and control, stabilizer rotor weights 94, shown as steel setscrews, together weigh 6 to 8 grams for each stabilizer rotor blade 84 (for a total of 12 to 16 grams for all stabilizer rotor weights 94 combined).

Figure 7:
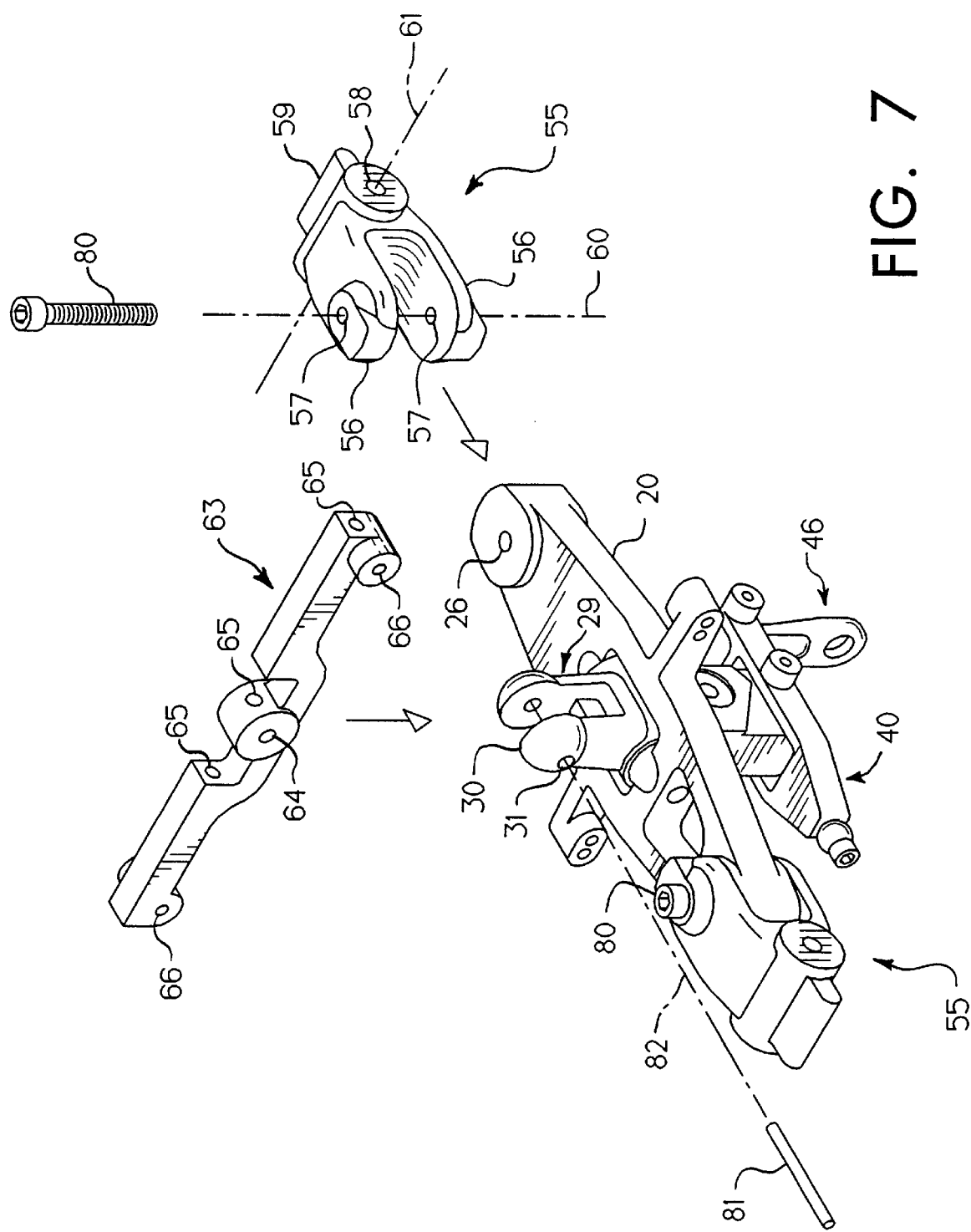
FIG. 7 is an exploded perspective view of the main rotor hub assembly and first, a first rotor blade grip connected to the main rotor hub assembly, and a teeter attachment and second rotor blade grip exploded away from the main rotor hub assembly, with all other parts omitted for clarity.
Figure 8:
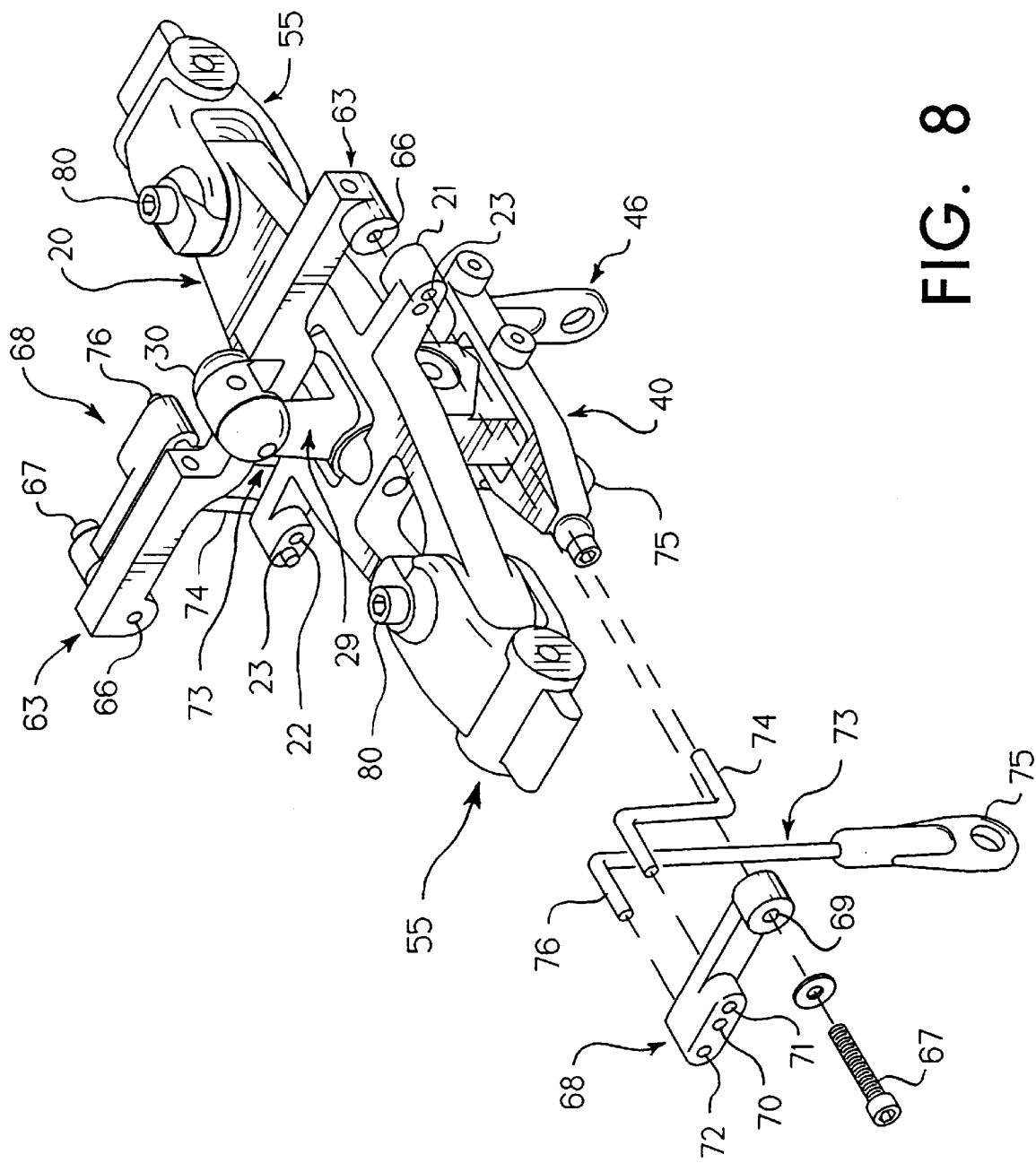
FIG. 8 is an exploded perspective view of the teeter and first and second blade grips connected to the main rotor hub assembly and showing a mixing arm link attachment exploded away from the main rotor hub assembly, with all other parts omitted for clarity.

A teeter 63 is pivotably mounted to the top of rotor hub 29 as shown in FIGS. 7 and 8. The teeter 63 is provided for supporting stabilizer rotor blades 84 as shown in FIG. 10. Teeter 63 is formed to include teeter pin hole 64, teeter through-holes 65, and teeter mixing-arm bolt holes 66 sized to receive mixing arm bolts 67. As will become apparent, once stabilizer rotor 83 is mounted on teeter 63, stabilizer rotor pitch axis 92 is a line passing through teeter through-holes 65 as shown in FIG. 10.

As shown in FIG. 9, stabilizer rotor blades 84 may be injection-molded in one piece from a plastic material such as nylon with all airfoil pitch angles molded in place. Setscrew weights 94 entrap a stabilizer rotor pivot rod 93 to prevent it from being thrown out radially as stabilizer rotor 83 rotates at high speed. Advantageously, pivot rod 93 is made of a tough, springy material such as ASTM-A-228 music wire to withstand crashes.

The combination of plastic blades and spring steel pivot wire makes stabilizer rotor 83 very durable. A unique feature of stabilizer rotor blade 84 of the current invention is that they can be made to withstand repeated crashes that would ruin the soft flybar wire (not shown) of the Hiller stabilizer (not shown) found on most conventional model helicopters. Furthermore, plastic stabilizer rotor blades 84, in conjunction with plastic teeter 63, spread impact forces along the length of pivot wire 93 so that pivot wire 93 flexes uniformly along its length rather than permanently deforming at one or more points of concentrated stress.

Common Hiller stabilizer paddles (not shown) can be modified for use with a spring steel flybar wire (not shown) if a section of the paddles is extended inboard and operably connected to a portion of the rotor hub to hold the paddle (not shown) onto the end of the wire (not shown). In alternative embodiments of the present invention, plastic paddles (not shown) may be molded to the ends of a spring steel wire (not shown) which has been bent at the ends to retain the paddles (not shown). The spring steel flybar (not shown) may then be operably connected to the rotor hub in many ways.

Devices combining durable stabilizer blades and spring-metal pivot wire are in accordance with the current invention. Aerodynamic stabilizer elements, such as Hiller paddles (not shown), having an appendage extending inboard to the main rotor hub to hold the element onto the end of a metal pivot wire (not shown), are in accordance with the current invention. Stabilizer elements entrapping a metal pivot wire (not shown) for use as a pivot rod are in accordance with the current invention.

As shown in FIG. 33, split stabilizer rotors 174, for use primarily on collective-pitch rotor systems, may employ a form of reach-around grip comprising a blade extension 86 extending radially inboard of stabilizer rotor blade 174 to a bearing holder 180 which is adapted to pivotably support axial flight loads as with a ball-bearing or bushing. A reach-around grip for use with tail rotor blades is disclosed and illustrated by Paul Arlton in U.S. patent application Ser. No. 08/292,719, filed Aug. 18, 1994. Teeter 63 supports stabilizer rotor blades 174 to pivot about stabilizer rotor teeter axis 82, and transfers flight loads between stabilizer rotor blades 174. A pitch arm 188 is operably attached to stabilizer rotor 174 and swashplate 140 with pitch links 96 to cyclically and/or collectively control the pitch of stabilizer rotor 174. In a preferred embodiment, stabilizer rotor blade 174, blade extension 86, bearing holder 180, and pitch arm 188 are molded as a single piece from a plastic material such as nylon.

Although the drawings show a main rotor 1 having two stabilizer rotor blades 84, it will be understood that a rotor system may have several rotor blades, and that each set of blades may be of a different diameter. In alternative embodiments of the current invention, stabilizer rotor blades have a primary configuration and a secondary configuration as described for main rotor blades 100.

In accordance with a preferred embodiment of the present invention, rotor hub assembly 77 forms the center of main rotor 1 as shown in FIG. 5. Rotor hub assembly 77 is mounted underneath the stabilizer rotor blades 84 and between the main rotor blades 100 as shown best in FIGS. 1 and 2. Rotor hub assembly 77 includes pitch plate 20, rotor hub 29, and follower arm 40. Pitch plate 20 includes pitch arms 21 with pitch plate inner and outer Z-link holes 22 and 23, pitch-pin through-holes 24, pitch plate lead/lag holes 26, and link clearance opening 25. Rotor hub 29 includes hub teeter posts 30, hub teeter-pin holes 31, hub pitch-pin hole 32, shaft bolt hole 33, hub pivot-pin hole 34, and rotor shaft hole 35 exiting the bottom surface. Follower arm 40 includes follower pivot-pin holes 41 for follower pivot-pin 42, follower arm link-pin holes 43 for follower link-pin 44, and follower ball link 45. Follower link 46 includes follower link pin hole 47 and follower link ball-socket 48.

Figure 6:
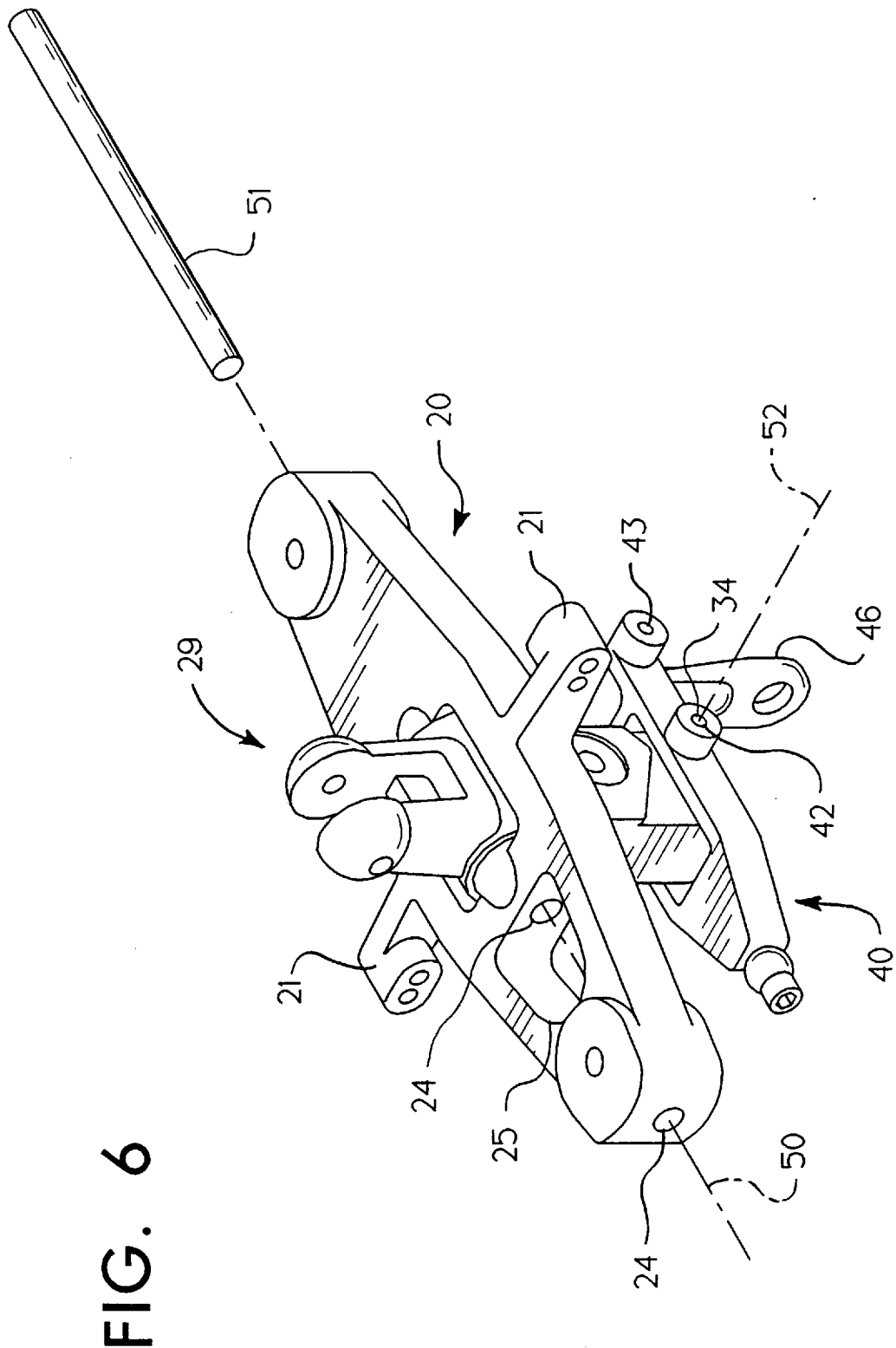
FIG. 6 is a perspective view of the main rotor hub assembly of FIG. 5 after partial assembly, with all other parts omitted for clarity.

Once assembled, as shown in FIG. 6, pitch plate 20 is pivotably supported by rotor hub 29 and constrained to rotate about pitch axis 50 by pitch pin 51. During assembly, pitch pin 51 is slid through pitch-pin through-holes 24 in pitch plate 20 and forcibly pressed into slightly undersized hub pitch-pin hole 32 in rotor hub 29. Pitch pin 51 extends through rotor hub 29 until flush with link clearance opening 25 in pitch plate 20. Follower arm 40 is pivotably mounted to rotor hub 29 and constrained to pivot about follower arm pivot axis 52 by follower arm pivot-pin 42. Follower arm pivot-pin 42 is forcibly pressed into slightly undersized hub pivot-pin hole 34 in rotor hub 29. Similarly, follower link 46 is operably connected to follower arm 40 with follower link-pin 44 extending through follower link pin hole 47.

Two mixing arms 68 are mounted on teeter 63, as shown in FIG. 8, and each mixing arm 68 is formed to include a mixing arm bolt hole 69, a mixing arm swashplate-link hole 72, and mixing arm inner and outer Z-link holes 70 and 71 for novel Z-links 74. Swashplate links 73 terminate in swashplate link ball-socket 75 and swashplate link elbow 76. Mixing arms 68 are pivotably secured to teeter 63 by mixing arm bolts 67 which extend through mixing arm bolt holes 69 and are secured against rotation in teeter mixing-arm bolt holes 66. Teeter 63 is pivotably supported by hub teeter posts 30 and constrained to rotate about teeter axis 82 by teeter pin 81 after teeter pin 81 is slid through hub teeter pin holes 31 in hub teeter posts 30 and forcibly pressed through slightly undersized teeter pin hole 64 in teeter 63. Z-links 74 operably connect mixing arm outer Z-link holes 71 and pitch plate outer Z-link holes 23 for standard control authority, or mixing arm inner Z-link holes 70 and pitch plate outer Z-link holes 22 for boosted control authority. Advantageously, novel Z-links 74 are substantially less expensive and more compact than conventional ball-joints employed in most main rotor systems. To control main rotor 1, pilot commands are transmitted through swashplate 140 as shown, for example, in FIGS. 1, 2, 14, and 15, to mixing arms 68 by swashplate link 73. In the illustrated embodiment of the invention, swashplate 140 and swashplate link 73 comprise a pilot control system.

Referring now to FIG. 9, stabilizer rotor 83 comprises airfoiled stabilizer rotor blades 84 fixedly connected to stabilizer rotor cap 85 by stabilizer rotor blade extensions 86. Stabilizer rotor blades 84 include an inner edge 528 facing toward main rotor shaft 110, an outer edge 530 facing away from main rotor shaft 110, a leading edge 536 extending from inner edge 528 to outer edge 530, and a trailing edge 538 extending from inner edge 528 to outer edge 520 and being spaced apart from leading edge 536 as shown, for example, in FIG. 29*a* . Stabilizer rotor blade extensions 86 include a first end 532 connected to stabilizer rotor cap 85, a second end 534 connected to inner edge 528 of stabilizer rotor blade 84, a leading edge 540 extending from first end 532 to second end 534, and a trailing edge 542 spaced apart from leading edge 540 and extending from first end 532 to second end 534. The stabilizer rotor blade extensions 86 are spaced apart from stabilizer pivot rod 93 as shown in FIGS. 10 and 29a. The leading edge 536 of stabilizer rotor blade 84 and the leading edge 540 of stabilizer rotor blade extension 86 are continuous. The distance between leading edge 536 at inner edge 528 and stabilizer pivot rod 93 is equal to the distance between leading edge 540 at second end 534 and stabilizer pivot rod 93. Inner edge 528 of stabilizer rotor blades 84 is situated as close to pitching linkages such as mixing bars 68 as possible.

Stabilizer rotor blades 84 are generally pitched to a steady-state positive angle-of-attack and extend substantially inboard from the tips of stabilizer rotor 83. In the preferred embodiment, stabilizer rotor blades 84 are pitched upward 8 to 15 degrees about stabilizer rotor pitch axis 92. Stabilizer rotor rod through-holes or stabilizer pivot rod-receiving channels 89 extend completely through stabilizer rotor blades 84 and stabilizer rotor cap 85 and intersect stabilizer rotor weight holes 90 in each stabilizer rotor blade 84. Stabilizer rotor pitch arm 88 is fixedly connected to one stabilizer rotor blade extension 86 and terminates in stabilizer rotor ball link 87. Stabilizer rotor angled tips 91 hide bulges containing stabilizer rotor weight holes 90. Stabilizer rotor pitch link 96 terminates in stabilizer rotor pitch-link ball-sockets 97.

In the preferred embodiment of the present invention, the chordwise location of stabilizer rotor through-hole 89 geometrically divides stabilizer rotor blades 84 so that less than 25% of the surface area of stabilizer rotor blades 84 lies ahead in direction of stabilizer rotor pitch axis 92. Stabilizer rotor 83 thereby tends to be pitch-convergent and insensitive to linkage slop.

As shown in FIGS. 7, 9, and 10, stabilizer rotor 83 is pivotably supported by teeter 63 and constrained by stabilizer rotor rod 93 to rotate about stabilizer rotor pitch axis 92 (defined by teeter through-holes 65) after stabilizer rotor rod 93 is slid through stabilizer rotor rod through-holes 89 in stabilizer rotor 83 and teeter through-holes 65 in teeter 63. Stabilizer rotor rod 93 is confined within stabilizer rotor 83 and teeter 63 by stabilizer rotor weights 94 which screw into stabilizer rotor weight holes 90 and occlude stabilizer rotor rod through-holes 89. Stabilizer rotor weights 94 also act to increase the gyroscopic stability of stabilizer rotor 83. Stabilizer rotor 83 is operably connected to follower arm 40 by pitch link 96 which passes through link clearance opening 25 in pitch plate 20. As shown in cutaway on FIG. 15, stabilizer rotor cap 85 has a generally concave surface 95 underneath to prevent interference with hub teeter posts 30.

Alternate embodiments of the current invention are contemplated wherein a split stabilizer rotor 173 is split into two independently variable stabilizer rotor blades 174 as shown in FIG. 33. Split stabilizer rotor 173 comprises split stabilizer rotor blades 174 pivotably engaging modified teeter 63 with pivoting means similar to stabilizer rotor 83. Dual pitch links 96 extending through dual link clearance openings 25 are provided to pitch split stabilizer rotor blades 174 independently or in unison as for cyclic and collective control.

Figure 11:
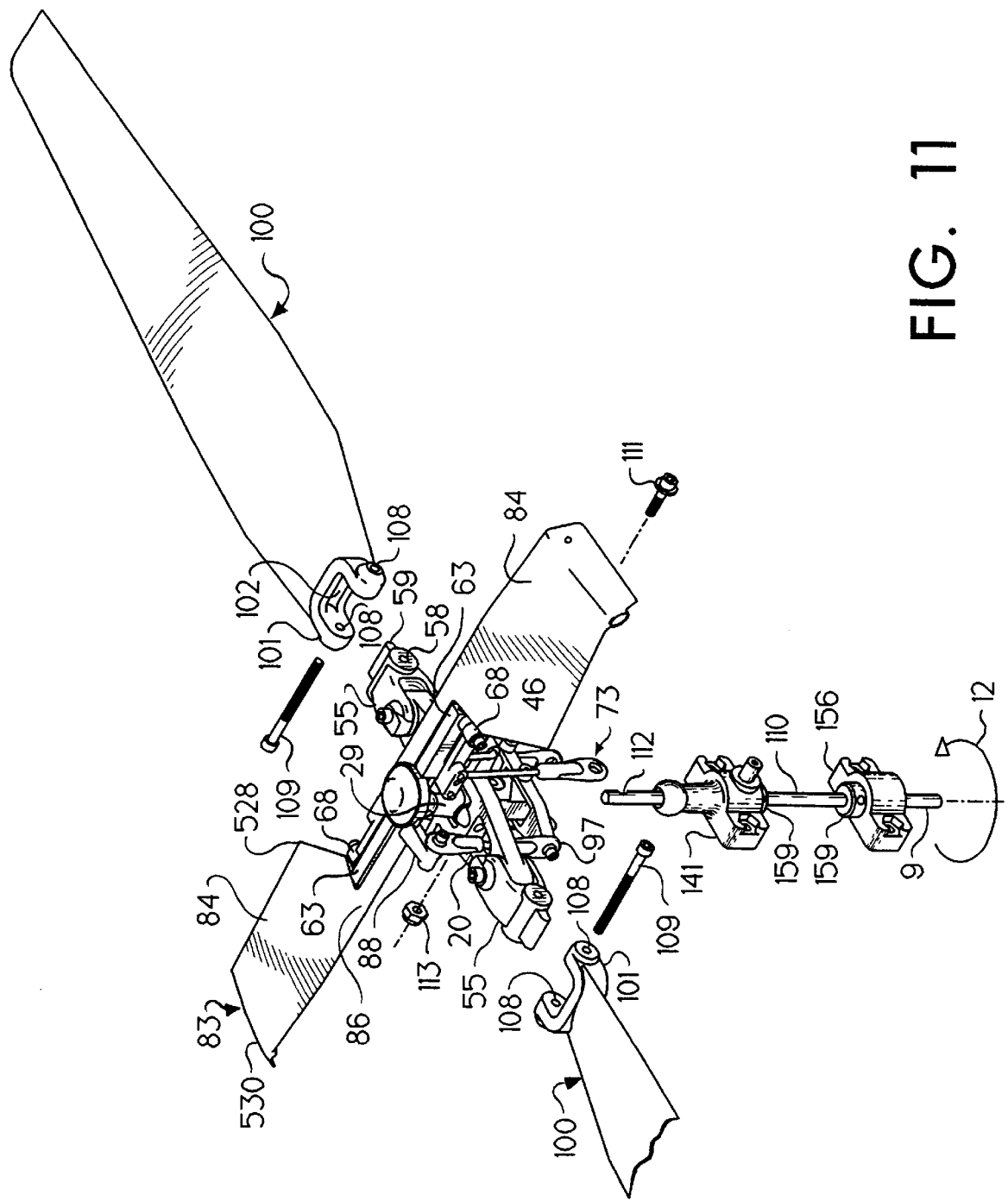
FIG. 11 is an exploded perspective view of the assembly of FIG. 10 showing the main rotor blades and a rotor shaft attachment as they appear before they are installed on the hub and stabilizer rotor assembly, with all other parts omitted for clarity.
Figure 12:
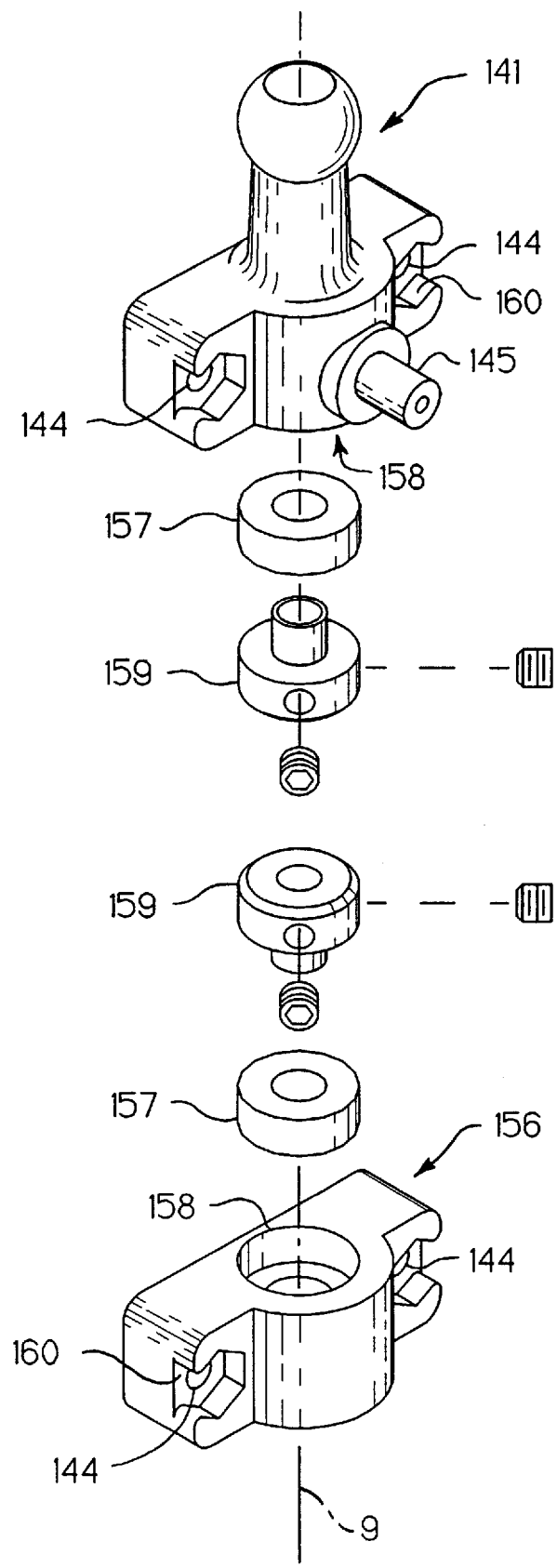
FIG. 12 is an exploded view of upper and lower bearing support blocks included in the main rotor system, with all other parts omitted for clarity.

FIG. 11 and FIG. 12 show upper bearing block 141 and lower bearing block 156 with bearing block nut recesses 160, and bearing recesses 158 on the bottom of upper bearing block 141 and on the top of lower bearing block 156 receptive to ball bearing units 157. Bearing retaining collars 159 retain ball bearing units 157 in bearing recesses 158 and adapt bearings to rotor shaft 110 extending along vertical axis 9.

Now referring to FIG. 5 and FIG. 11, rotor shaft 110 extends through retaining collars 159 in upper and lower bearing blocks 141 and 156, into shaft hole 35 in rotor hub 29, and is fixedly secured to rotor hub 29 by rotor hub bolt 111 passing through shaft bolt hole 33 and shaft notch 112 into hub locknut 113. Rotation of rotor shaft 110 about shaft axis 9 in rotor rotation direction 12 (as by an engine 3 within the fuselage 4 of a helicopter 15) rotates rotor hub 29 and all interconnected elements of the main rotor.

Rotor Blade Attachment and Pitch Adjustment

The pitch of main rotor blades 100 may be changed to alter the steady-state angle-of-attack 6 of the main rotor blades 100. Several means are available within the scope of the current invention for adjusting the pitch of rotor blades 100 on main rotor 1. These pitch-adjusting means include replaceable rotor elements, such as sets of interchangeable blade grips 55 shown in FIGS. 7, 13, 13a and 15 that define various base pitch angles for rotor blades and adjustable pitch setting means such as reach-around grips shown in FIGS. 34 and 35.

Conventional radio-controlled model helicopters having fixed-pitch rotor systems commonly have metal tabs securing the rotor blades to the rotor head. The metal tabs must be bent with wrenches to adjust blade pitch. It is difficult for a pilot to accurately set the rotor blades to a particular angle-of-attack because it is difficult to determine exactly how much blade pitch actually changes when these metal tabs are bent. Thus, it is also difficult to reproduce any particular pitch setting.

Any means to adjust blade pitch in discrete, reproducible increments, as with replaceable or adjustable main rotor elements, has advantages over the prior art, and is in accordance with the current invention. Said adjustment means does not necessarily require replacement of some part of the rotor system. In alternative embodiments of the present invention, blade pitch may be adjusted via a mechanism for infinitely adjusting blade pitch that has an indicator mark or detent for certain pitches.

Referring to FIG. 11, replaceable, interchangeable sets of blade grips 55 connect rotor blades 100 to pitch plate 20. Alternatively, multiple rotor blade sets, each having an aerodynamic part set at a particular pitch angle relative to C-shaped root 101, but otherwise being identical, may be interchanged to effectively adjust rotor blade 100 pitch of main rotor 1. Advantageously, changing rotor blade 100 requires the removal of only one bolt 109. One drawback of interchanging blades 100, however, is that rotor blades 100 are more complicated and expensive to manufacture than blade grips 55. Thus, multiple interchangeable rotor blade 100 sets would be more expensive than interchangeable blade grip 55 sets.

Blade grips 55 are connected to pivot plate 20 to support main rotor blades 100 as shown in FIG. 15. Referring to FIGS. 7 and 8, blade grips 55 include upper and lower grip fingers 56, flapping limit-tab 59, blade grip lead/lag holes 57 defining a lead/lag axis 60, and blade grip flapping hole 58 defining a flapping or blade attachment axis 61. Blade grips 55 are pivotably secured to pitch plate 20 by lead/lag bolts 80 which extend through and are secured against rotation in blade grip lead/lag holes 57 and freely rotate within pitch plate lead/lag holes 26.

C-shaped blade root 101 of rotor blades 100 include a flapping detent 102 and is pivotably secured to blade grips 55 by flapping bolts 109. Flapping bolts 109 extend through and freely rotate within blade root flapping holes 108 and are secured against rotation in blade grip flapping holes 58. Flapping motion of rotor blade 100 is limited by flapping limit-tab 59 on blade grip 55 contacting upper and lower surfaces of flapping detent 102. Note that flapping limit tab 59 may alternately be located on rotor blade 100, and flapping detent 102 may be located on blade grip 55.

In FIG. 15a, rotor blade 100 has flapped upward until lower surface 126 of flapping detent 102 contacts flapping limit-tab 59 on grip 55 thereby mechanically defining the upper limit of flapping of rotor blade 100 to upward flapping angle 201. Upward flapping angle 201 is shown to scale and is 6 degrees in the current embodiment. In FIG. 15b, rotor blade 100 has flapped downward until upper surface 127 of flapping detent 102 contacts flapping limit-tab 59 on grip 55 thereby mechanically defining the limit of downward flapping of rotor blade 100 to downward flapping angle 202. Downward flapping angle 202 is shown to scale and is 3.5 degrees in the current embodiment.

Impacts with the ground or other obstacles (as caused by a crash of helicopter 15) can cause flapping limit-tab 59 to disengage from flapping detent 102 allowing rotor blade 100 to fold past the mechanical upper limit to angles greater than 6 degrees, but generally less than about 110 degrees as illustrated in FIG. 24. This ability to fold in crashes greatly reduces the amount of force, and consequently the amount of damage, that rotor blade 100 can transmit to the rest of helicopter 15. On the small model helicopter 15 with a 24 inch diameter main rotor shown in FIG. 24, a force of less than one pound applied at the tip of rotor blade 100 will cause blade 100 to fold past its upper mechanical limit.

Figure 13:
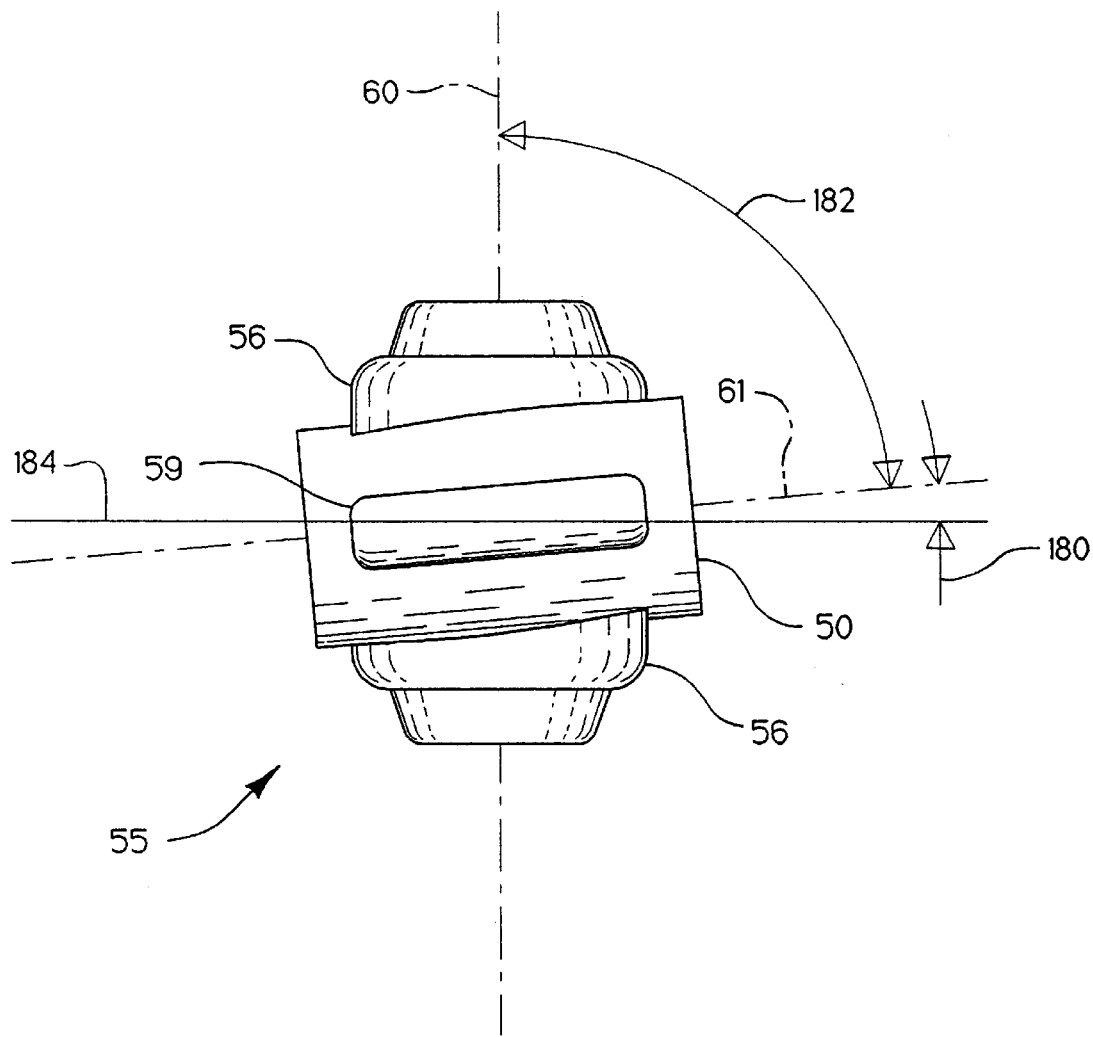
FIG. 13 is an end view of an interchangeable blade grip illustrating relative orientation of flapping and lead-lag axes.
Figure 13A:
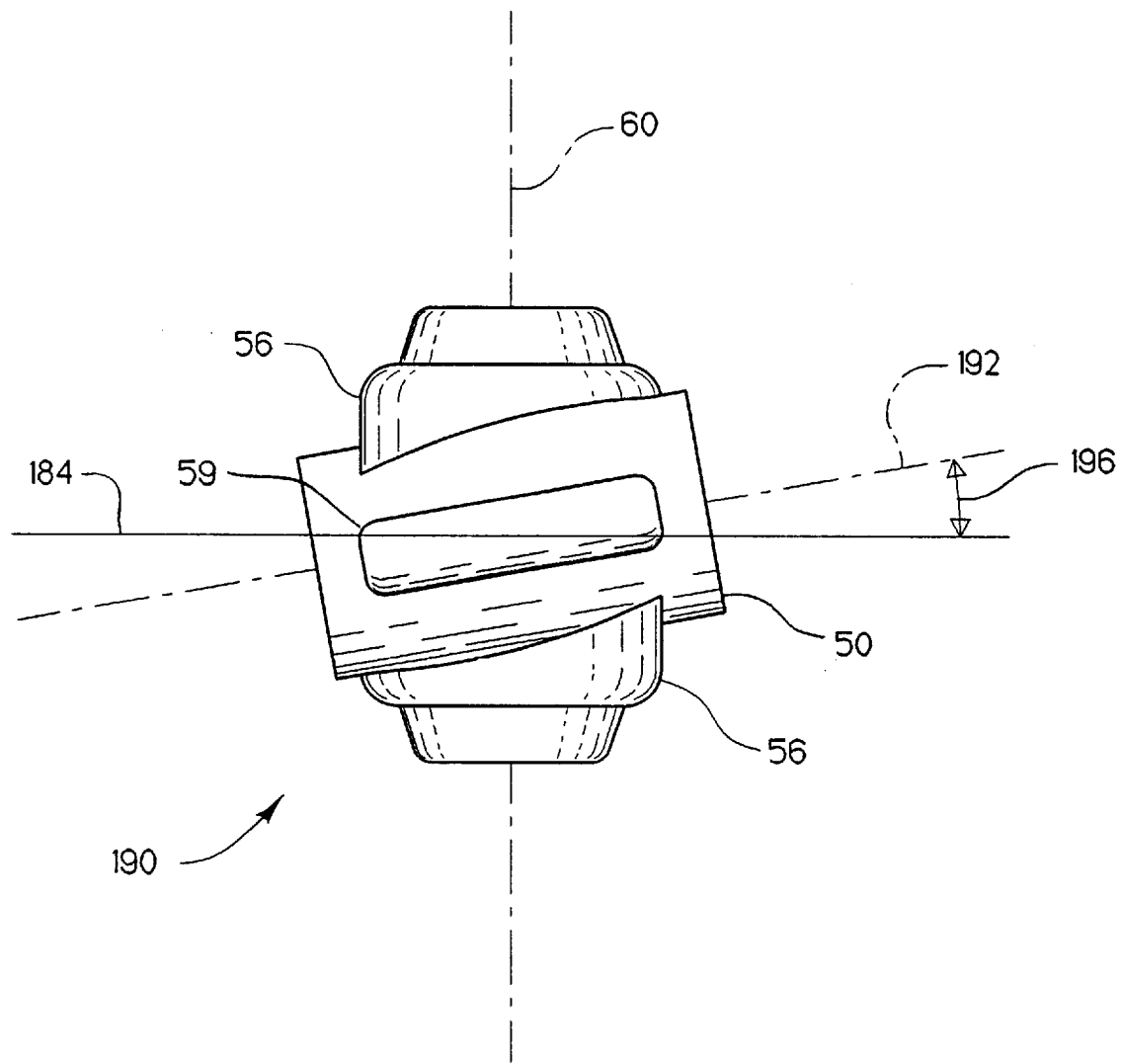
FIG. 13a is an end view of another interchangeable blade grip set at an angle other than 90 degrees and different from the angle set in the blade grip of FIG. 13.

As shown in FIGS. 7, 11, 13, and 13a, lead/lag axis 60 and flapping or blade attachment axis 61 extending through blade grip 55 can be set at angles other than 90 degrees thereby defining any pitch of rotor blade 100. Collective blade pitch is adjusted by manually interchanging blade grips such as blade grip 55 having one built-in pitch angle 180 as shown, for example, in FIG. 13 and blade grip 190 having another built-in pitch angle 196 as shown in FIG. 13A.

As shown in FIG. 13, blade grip 55 is formed with a vertical lead/lag axis 60 and a flapping axis 61 set at an angle 182 of about 85 degrees from lead/lag axis 60 and thus at a built-in pitch angle 180 of about 5 degrees from a horizontal axis 184. Referring now to FIG. 11, each blade grip 55, therefore, contributes 5 degrees of pitch to a corresponding rotor blade 100 relative to pitch plate 20. A blade grip 55 may be removed from main rotor 1 (by manually removing the corresponding lead/lag bolt 80 as shown in FIG. 7 and flapping bolt 109 as shown in FIG. 11) and replaced with another blade grip formed with a flapping axis set to a built-in pitch angle different than that of blade grip 55. FIG. 13A shows a blade grip 190 formed with a flapping axis 192 set at a built-in pitch angle 196 other than 90 degrees and different from the built-in pitch angle 180 of blade grip 55. When blade grip 55 is interchanged with blade grip 190, the pitch of rotor blade 100 is changed relative to pitch plate 20. The pitch of rotor blade 100 can be adjusted to any desired angle by manually interchanging blade grips having different built-in pitch angles. This method of setting blade pitch may be generalized to any interchangeable main rotor element capable of defining the pitch of the aerodynamic portion of rotor blade 100.

Figure 34:
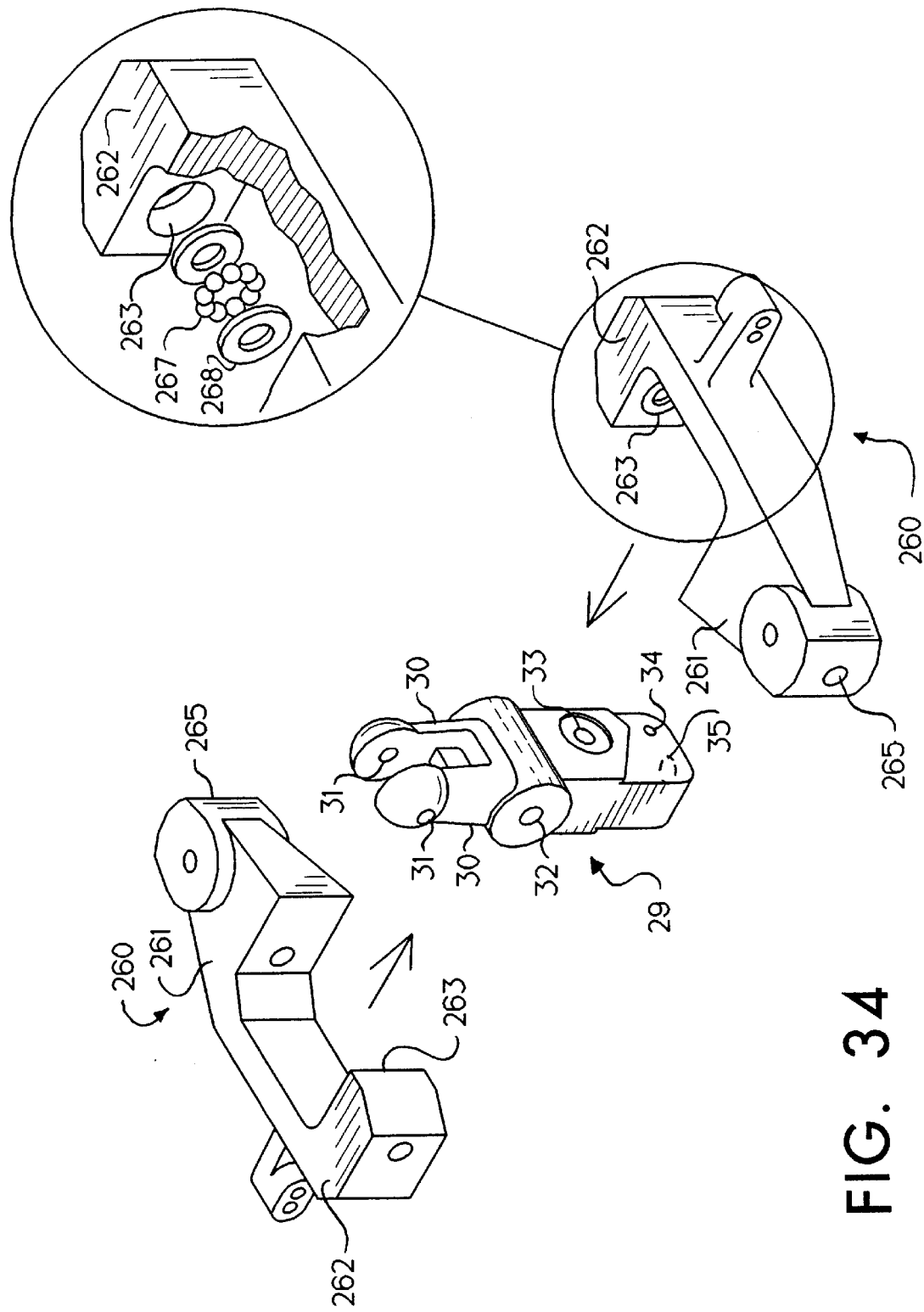
FIG. 34 is an exploded perspective view of a portion of the main rotor hub assembly and interconnected reach-around blade grips.
Figure 35:
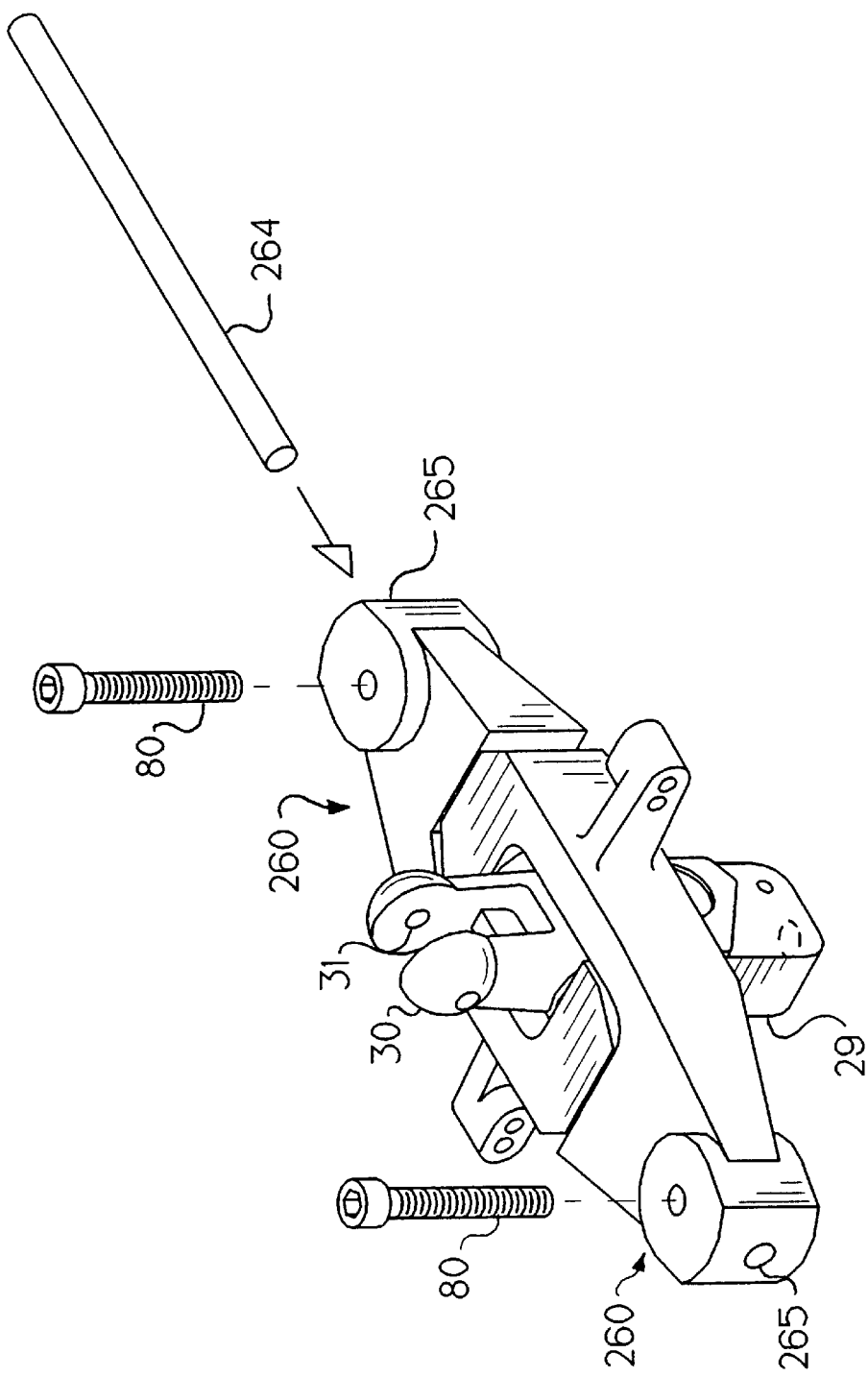
FIG. 35 is an exploded perspective view of a portion of the main rotor hub assembly showing the interconnected reach-around grips connected to the main rotor hub assembly and a pitch pin exploded away from the assembly.

Another preferred method for setting and controlling rotor blade 100 pitch utilizes reach-around grips 260 as shown in FIGS. 34 and 35. Reach-around grips for use on tail rotor systems were first disclosed by Paul Arlton in U.S. patent application Ser. No. 08/292,719, filed Aug. 18, 1994, and are shown herein for the first time for use on main rotor systems. Reach-around grips 260 are characterized by body section or blade attachment section 261 operably secured to the root of a main rotor blade 100 (as by blade grips 55) and appended to grip extension or rotor hub attachment section 262 extending to the opposite side of main rotor hub 29 to bearing holder 263 which houses ball bearings 267 and bearing races 268 to pivotably support the axial thrust load generated by main rotor blades 100 in flight. As shown in FIG. 35, two reach-around grips 260 interlock with each other and main rotor hub 29. Pitch pin 264 is inserted through pitch pin holes 265 in both grips 260 and through slightly undersize hole 32 in hub 29 thereby pivotably securing grips 260 to hub 29. Press-fit of pitch pin 264 into hub 29, and presence of lead/lag bolts 80 across the terminating ends of pitch pin holes 265 insures that pitch pin 264 will not come out of pitch pin holes 265 in flight. Advantageously, reach-around grips 260 are mechanically very simple, can pivot independently about pitch pin 264, and need no radial ball bearings since pitch pin 264 has substantial surface contact along the interior of pitch pin hole 265. Alternatively, reach-around grips 260 may be horizontally offset (perpendicular to pitch pin 264) from one another, and pivot about two separate pivot axes on two separate pivot pins if desired to accommodate different rotor hub configurations.

To adjust main rotor blade 100 collective pitch on a rotor system having reach-around grips 260, both swashplate links 73 (shown in FIG. 14) are lengthened or shortened simultaneously thereby displacing mixing arms 68 and Z-links 74 slightly. Reach-around grips 260 may also be employed advantageously with collective-pitch main rotor systems.

Alternative embodiments of the current invention include flexible plastic hinges (not shown) molded into the rotor blades so that lead/lag or flapping hinges are not required. The semi-flexible nature of the plastic material may be tailored to eliminate the need for mechanical hinges.

Relative Size Defined

While elements of the current invention may be applied to large model helicopters powered by engines of 0.60 cubic-inch displacement or more (with about 1.8 horse power, and rotor spans of about 56 inches), the current invention is best suited for application to mid-size model helicopters having engines of about 0.30 cubic-inch displacement or less (with about 1.2 horse power, and rotor spans of about 50 inches or less). Because of the aerodynamic and mechanical scale effects cited above, the current invention is especially well suited to small model helicopters having engine displacements in the 0.05 to 0.15 cubic-inch range (with about 0.1 to 0,4 horse power, and rotor spans of about 24 to 36 inches).

The current invention is especially advantageous when used on model helicopters powered by electric motors. Electric helicopters are typically heavier and have lower available power than are helicopters powered by gas engines. As a consequence, electric helicopters must operate as efficiently as possible.

Improving Existing Model Helicopters

The current invention has many manufacturing advantages and superior operational features that may be applied in whole or in part, to improve the performance of rotor systems on existing small helicopters.

Some small electric helicopters, such as the Kalt "Whisper", Kyosho "Concept EP", Kyosho "Concept 10" and Hirobo "MH-10" utilize blade designs scaled down from larger helicopters. These helicopters use collective-pitch rotor systems and have the ability to fly upside-down, so excessive rotor blade 100 airfoil camber is not desirable. In accordance with the current invention, the current constant chord rotor blades on these helicopters can be improved by reducing the thickness of the outboard airfoils to about 8% to 10% of local chord length and increasing camber to about 2% of local chord length, increasing the chord of the inboard airfoils to about 8% of local chord length and camber to about 4% of local chord length, and increasing the root airfoil pitch to about 6 to 8 degrees relative to the tip airfoil. Note that relatively low camber and root airfoil pitch is desirable for use with collective pitch rotor systems.

While intended primarily for model helicopters, certain elements of the current invention, such as lifting stabilizer blades, can be generally applied to full-size helicopters.

Although this invention has been described in detail with reference to certain embodiments, variations and modifications exist within the scope and spirit of the invention as described and as defined in the following claims.

We claim:

1. A main rotor for use on a model helicopter, the main rotor comprising a main rotor shaft rotatable about a main rotor rotation axis, first and second main rotor blades linked to the main rotor shaft to extend radially outward from and substantially perpendicular to the main rotor shaft and to rotate with the main rotor shaft in a steady-state main rotor blade plane of rotation when the main rotor blade plane of rotation is perpendicular to the main rotor rotation axis, and means for pitching the first and second main rotor blades about first and second main rotor blade pitching axes, respectively, each of the first and second main rotor blades including a blade root linked to the main rotor shaft, a blade tip spaced apart from the blade root, a leading edge, a trailing edge spaced apart from the leading edge, a plurality of chord lines extending in a straight line between the leading edge and the trailing edge perpendicular to the first and second main rotor blade pitching axes, an inboard section situated adjacent to the blade root, and an outboard section situated adjacent to the blade tip, the inboard section having a first steady-state angle-of-attack defined as an included angle between one of the plurality of chord lines in the inboard section and the main rotor blade plane of rotation and the outboard section having a second steady-state angle-of-attack defined as an included angle between one of the plurality of chord lines in the outboard section and the main rotor blade plane of rotation, the first steady-state angle-of-attack being greater than the second steady-state angle-of-attack, wherein the one of the plurality of chord lines in the inboard section includes a first length and the one of the plurality of chord lines in the outboard section includes a second length that is shorter than the first length and wherein the inboard section includes a cupped-shaped cross-section between the trailing edge and the leading edge and the outboard section includes a flat cross-section between the trailing edge and the leading edge.

2. A main rotor blade for use on a model helicopter having a rotatable main rotor shaft to rotate the main rotor blade about a main rotor rotation axis in a steady-state main rotor blade plane of rotation when the main rotor blade rotation axis is perpendicular to the main rotor rotation axis, the main rotor blade being pitchable about a main rotor blade pitch axis, the main rotor blade comprising a blade root adapted to link to the main rotor shaft,
   a blade tip spaced apart from the blade root,
   a leading edge extending from the blade root to the blade tip,
   a trailing edge extending from the blade root to the blade tip and being spaced apart from the leading edge,
   an upper surface extending between the blade root, blade tip, leading edge, and trailing edge,
   a lower surface extending between the blade root, blade tip, leading edge, and trailing edge and spaced apart from the upper surface,
   an inboard section situated adjacent to the blade root, the inboard section having an inboard section chord line extending in a straight line from the trailing edge to the leading edge perpendicular to the main rotor blade pitch axis, the inboard section chord line having an inboard section chord length and being oriented relative to a steady-state main rotor blade plane of rotation to define an inboard section included angle, a thickness between the upper surface and lower surface of about 4% to 8% of the inboard section chord length, and an inboard section camber line extending from the trailing edge to the leading edge, midway between the upper surface and the lower surface, and perpendicular to the main rotor blade pitch axis, the maximum distance perpendicular to inboard section chord line between the inboard section chord line and the inboard section camber line is about 4% to 7% of the inboard section chord length, and
   an outboard section situated adjacent to the blade tip, the outboard section having an outboard section chord line extending in a straight line from the trailing edge to the leading edge perpendicular to the main rotor blade pitch axis, the outboard section chord line having an outboard section chord length and being oriented relative to a steady-state main rotor blade plane of rotation to define an outboard section included angle that is less than the inboard section included angle, a thickness between the upper surface and lower surface of about 8% to 11% of the outboard section chord length, and an outboard section camber line extending from the trailing edge to the leading edge, midway between the upper surface and the lower surface, and perpendicular to the main rotor blade pitch axis, the maximum distance perpendicular to the outboard section chord line between the outboard section chord line and the outboard section camber line is about 0% to 4% of the outboard section chord length.

3. The main rotor blade of claim 2, further comprising a thin, raised strip of material appended to one of the upper and lower surfaces.

4. The main rotor blade of claim 3, wherein the thin, raised strip of material is appended to the upper surface of the inboard section.

5. The main rotor blade of claim 3, wherein the thin, raised strip of material extends substantially parallel to the leading edge between the leading edge and the main rotor blade pitch axis.

6. The main rotor blade of claim 2, further comprising means for inducing the airflow passing over the main rotor blade to become turbulent and stick more readily to at least one of the upper surface and lower surface.

7. The main rotor blade of claim 2, further comprising a transition section situated between the inboard section and the outboard section, the transition section includes a length extending between the inboard section and outboard section along main rotor blade pitch axis of no greater than 8% of the main rotor blade assembly diameter.

8. A main rotor blade for use on a model helicopter having a rotatable main rotor shaft to rotate the main rotor blade in a steady-state main rotor blade plane of rotation, the main rotor blade comprising a blade root adapted to link to the main rotor shaft, a blade tip spaced apart from the blade root, and a blade body situated in a nominal position when a straight line connects the blade root and blade tip and one of a plurality of bent positions when an arcuate line connects the blade root and the blade tip, when the blade body is situated in one of the plurality of bent positions the blade body returns to the nominal position so that forces transmitted to a main rotor shaft of a model helicopter by the rotor blade during a crash-landing of a model helicopter are minimized due to the bending of the blade body relative to the main rotor shaft from the nominal position to one of the plurality of bent positions.

9. The main rotor blade of claim 8, wherein when the blade body is in at least one of the plurality of bent positions the blade tip contacts the blade root.

10. The main rotor blade of claim 8, wherein the blade body includes an inboard section situated adjacent to the blade root and an outboard section situated adjacent to the blade tip and in at least one of the plurality of bent positions the arcuate line cooperates with the steady-state main rotor blade plane of rotation to define a first included angle in the inboard section and a second included angle in the outboard section that is greater than the first included angle.

11. The main rotor blade of claim 8, wherein when the blade body is in one of the plurality of bent positions the blade body deforms within a maximum elastic range without causing any permanent deformation.

12. A main rotor for use on a rotary wing aircraft, the main rotor comprising a main rotor shaft rotatable about a main rotor rotation axis, first and second main rotor blades linked to the main rotor shaft to rotate about the main rotor axis of rotation in a main rotor blade plane of rotation, means for pitching the first and second main rotor blades about first and second main rotor blade pitch axes, respectively, first and second stabilizer rotor blades linked to the main rotor shaft to rotate about the main rotor axis of rotation in a steady-state stabilizer rotor blade plane of rotation when the stabilizer rotor blade plane of rotation is perpendicular to the main rotor rotation axis, the first and second stabilizer rotor blades being linked to the first and second main rotor blades to pitch the first and second main rotor blades about the first and second main rotor blade pitch axes, respectively, and means for pitching the first and second stabilizer rotor blades about first and second stabilizer rotor blade pitch axes, respectively, each of the first and second stabilizer rotor blades having a leading edge, a trailing edge spaced apart from the leading edge, and a plurality of chord lines extending from the leading edge to the trailing edge perpendicular to the first and second stabilizer rotor blade pitch axes, at least one of the plurality of chord lines of the first and second stabilizer rotor blades being oriented to situate the leading edge above the steady-state stabilizer rotor blade plane of rotation and the trailing edge below the steady-state stabilizer rotor blade plane of rotation so that the steady-state stabilizer rotor blade plane of rotation is between the leading edge and the trailing edge.

13. A main rotor for use on a rotary wing aircraft, the main rotor comprising a main rotor shaft rotatable about a main rotor axis of rotation, first and second main rotor blades linked to the main rotor shaft to rotate about the main rotor axis of rotation in a main rotor blade plane of rotation, a pitch mechanism configured to pitch the first and second main rotor blades about first and second main rotor blade pitching axes, respectively, first and second stabilizer rotor blades linked to the main rotor shaft to rotate about the main rotor axis of rotation in a stabilizer rotor blade plane of rotation, the first and second stabilizer rotor blades being linked to the first and second main rotor blades to pitch the first and second main rotor blades about the first and second main rotor blade pitch axes, respectively, the first and second stabilizer rotor blades being formed to include stabilizer pivot rod-receiving channels, first and second stabilizer rotor blade extensions, each of the first and second stabilizer rotor blade extensions having a first end linked to the main rotor shaft and a second end connected to the first and second stabilizer rotor blades, respectively, and a stabilizer pivot rod extending through the stabilizer pivot rod-receiving channels formed in the first and second stabilizer rotor blades along first and second stabilizer pitching axes, respectively, the first and second stabilizer rotor blade extensions being spaced apart from the stabilizer pivot rod.

14. The main rotor of claim 13, wherein the pitch mechanism is adjacent to the main rotor shaft, each of the first and second stabilizer rotor blades include an inner edge facing toward the main rotor shaft and an outer edge facing away from the main rotor shaft, and the inner edge of each of the first and second stabilizer rotor blades is adjacent to the pitch mechanism.

15. The main rotor of claim 13, wherein each of the first and second stabilizer rotor blades includes a leading edge and a trailing edge spaced apart from the leading edge, each of the first and second stabilizer rotor blade extensions have a leading edge and a trailing edge spaced apart from the leading edge, each of the first and second stabilizer rotor blades includes an inner edge connected to the second end of the first and second stabilizer rotor blade extensions, respectively, the leading edge of the first and second stabilizer rotor blades at the inner edge is spaced apart from the stabilizer pivot rod a first distance, and the leading edge of the first and second stabilizer rotor blade extensions at the second end is spaced apart from the stabilizer pivot rod a second distance that is equal to the first distance.

16. A system for changing the steady-state pitch angle of a main rotor blade about a blade pitching axis relative to a main rotor shaft in a model helicopter, the main rotor being linked to the main rotor shaft to extend radially outward from and substantially perpendicular to the main rotor shaft, the system comprising providing a plurality of interchangeable main rotor element sets, each set of interchangeable main rotor elements being configured to situate the main rotor blade in a different steady-state pitch angle relative to the main rotor shaft, and interchanging a set of the interchangeable main rotor elements to change the pitch of the main rotor blade relative to the main rotor shaft in predetermined, discrete, reproducible increments.

17. The system of claim 16, wherein the interchangeable main rotor sets include a first pair of rotor blade grips having a vertical lead/lag axis that is substantially parallel to the main rotor shaft and a blade attachment axis, the vertical lead/lag axis and blade attachment axis of the first pair of rotor blade grips define a first included angle, and a second pair of rotor blade grips having a vertical lead/lag axis that is substantially parallel to the main rotor shaft and a blade attachment axis, the vertical lead/lag axis and blade attachment axis of the second pair of rotor blade grips define a second included angle, and the second included angle is different than the first included angle.

18. On a main rotor system for use on a radio-controlled model rotary wing aircraft having a main rotor blade extending radially from a main rotor hub and supported for rotation by a main rotor shaft to rotate in a main rotor blade plane of rotation substantially perpendicular to the main rotor shaft, a rotor blade comprising a blade root situated in proximity to the main rotor hub, a blade tip situated in spaced apart relation to the blade root at the distal end of the rotor blade, a blade length measured as the radial distance between the blade root and blade tip, a blade body extending radially between the blade root and the blade tip and transversely between a leading edge and a trailing edge, and having a primary configuration wherein the blade body lies substantially in the main rotor blade plane of rotation with the blade tip extending radially away from the blade root, the blade body being semi-flexible to bend during a crash landing of the radio controlled model rotary winged aircraft to a second configuration about a flex axis spacially offset from the main rotor blade plane of rotation, and the blade is returnable to substantially the primary configuration without repair for subsequent or continued operation of the model rotary winged aircraft.

19. The rotor blade of claim 18, wherein the blade is bendable around a radius of curvature to the second configuration thereby lifting the blade tip out of the rotor blade plane of rotation by a distance of about 50% of the blade length and the radius of curvature is less than about 30% of the blade length.

20. The rotor blade of claim 18, wherein the blade is bendable around a radius of curvature to the second configuration thereby bringing the blade tip into proximity with the blade root and the radius of curvature is less than about 15% of the blade length.

21. The rotor blade of claim 18, wherein the blade is bendable around a radius of curvature to the second configuration and the radius of curvature is less than about 2% of the blade length thereby forming a kink in the blade.

22. The rotor blade of claim 21, wherein the kink in the blade is struck sharply by hand with a mallet and the blade is still returnable to substantially the primary configuration without repair for subsequent or continued operation of the model rotary winged aircraft.

23. The rotor blade of claim 18, wherein the blade is made of a plastics material having a specific gravity of about 1.0 to 1.3, dry tensile-strength in the range of 5,000 to 12,000 psi, flextural modulus in the range of 250,000 to 500,000 psi, and ultimate elongation in the range of 25% to 200%.

24. The rotor blade of claim 18, wherein the rotor blade is made of a plastics material that is one of nylon, ABS, and polycarbonate plastics.

25. The rotor blade of claim 18, further comprising a folding axis located at the blade root, the blade being foldable about the folding axis though an angle in excess of 6 degree to a maximum of 90 degrees or more, and the second configuration involving both bending of the rotor blade around a radius of curvature and folding of the rotor blade about the folding axis.

26. The rotor blade of claim 18, wherein the blade body further includes an inboard section adjacent to the blade root, an outboard section adjacent to the blade tip, and a transition section separating and connecting the inboard section and outboard section, the inboard section including an inboard airfoil having an inboard airfoil thickness, inboard airfoil camber, and inboard airfoil chord line, the inboard airfoil chord line extending directly from the leading edge to the trailing edge and having an inboard airfoil chord length with the inboard airfoil thickness and inboard airfoil camber being measured as a percentage of the inboard airfoil chord length, the outboard section including an outboard airfoil having an outboard airfoil thickness, outboard airfoil camber, and outboard airfoil chord line, the outboard airfoil chord line extending directly from the leading edge to the trailing edge and having an outboard airfoil chord length with the outboard airfoil thickness and outboard airfoil camber being measured as a percentage of the outboard airfoil chord length, and the inboard airfoil camber expressed as a percentage of inboard airfoil chord is greater than the outboard airfoil camber expressed as a percentage of outboard airfoil chord length and the inboard airfoil thickness expressed as a percentage of inboard airfoil chord length is less than the outboard airfoil thickness expressed as a percentage of outboard airfoil chord length.

27. The rotor blade of claim 18, wherein the blade body further includes an inboard section adjacent to the blade root, an outboard section adjacent to the blade tip, and a transition section separating and connecting the inboard section and outboard section, the inboard section including an inboard airfoil having an inboard airfoil camber and inboard airfoil chord line, the inboard airfoil chord line extending directly from the leading edge to the trailing edge at an inboard airfoil steady-state pitch angle relative to the main rotor blade plane of rotation and having an inboard airfoil chord length with the inboard airfoil camber being measured as a percentage of the inboard airfoil chord length, the outboard section including an outboard airfoil having an outboard airfoil camber and outboard airfoil chord line, the outboard airfoil chord line extending directly from the leading edge to the trailing edge at an outboard airfoil steady-state pitch angle relative to the main rotor blade plane of rotation and having an outboard airfoil chord length with the outboard airfoil camber being measured as a percentage of the outboard airfoil chord length, and the inboard airfoil camber expressed as a percentage of inboard airfoil chord length is greater than the outboard airfoil camber expressed as a percentage of outboard airfoil chord length, and the outboard airfoil steady-state pitch angle relative to the main rotor blade plane of rotation is less than the inboard airfoil steady-state pitch angle relative to the main rotor blade plane of rotation.

28. A rotor blade for use on a radio-controlled model rotary wing aircraft including a rotatable main rotor having a main rotor blade extending radially from a main rotor hub and supported for rotation by a main rotor shaft to rotate in a steady-state main rotor blade plane of rotation substantially perpendicular to the main rotor shaft, the rotor blade comprising a blade root situated in proximity to the main rotor hub, a blade tip situated in spaced apart relation to the blade root at the distal end of the rotor blade, a blade length measured as the radial distance between the blade root and blade tip, a blade body extending radially between the blade root and the blade tip and transversely between a leading edge and a trailing edge, and having an inboard section adjacent to the blade root, an outboard section adjacent to the blade tip, and a transition section separating and connecting the inboard section and outboard section, the inboard section including an inboard airfoil having an inboard airfoil thickness, inboard airfoil camber and inboard airfoil chord line, the inboard airfoil chord line extending directly from the leading edge to the trailing edge and having an inboard airfoil chord length with the inboard airfoil thickness and inboard airfoil camber being measured as a percentage of the inboard airfoil chord length, the outboard section including an outboard airfoil having an outboard airfoil thickness, outboard airfoil camber, and outboard airfoil chord line, the outboard airfoil chord line extending directly from the leading edge to the trailing edge and having an outboard airfoil chord length with the outboard airfoil thickness and outboard airfoil camber being measured as a percentage of the outboard airfoil chord length, and the inboard airfoil camber expressed as a percentage of inboard airfoil chord length is greater than the outboard airfoil camber expressed as a percentage of outboard airfoil chord length and the inboard airfoil thickness expressed as a percentage of inboard airfoil chord length is less than the outboard airfoil thickness expressed as a percentage of outboard airfoil chord length.

29. The rotor blade of claim 28, wherein the inboard airfoil thickness is about 4% to 8% of the inboard airfoil chord length, the inboard airfoil camber is about 4% to 7% of the inboard airfoil chord length, the outboard airfoil thickness is about 8% to 11% of the outboard airfoil chord length, and the outboard airfoil camber is about 0% to 4% of the outboard airfoil chord length.

30. The rotor blade of claim 28, wherein the inboard airfoil is pitched to a steady-state angle-of-attack relative to the steady-state main rotor blade plane of rotation that is about 6 to 12 degrees higher than the steady-state angle-of-attack of the outboard airfoil relative to the steady-state main rotor blade plane of rotation.

31. The rotor blade of claim 28, wherein the inboard airfoil chord length is greater than the outboard airfoil chord length.

32. The rotor blade of claim 28, wherein the blade body is made of a plastics material having a specific gravity of about 1.0 to 1.3, dry tensile-strength in the range of 5,000 to 12,000 psi, flexural modulus in the range of 250,000 to 500,000 psi, and ultimate elongation in the range of 25% to 200%.

33. The rotor blade of claim 28, wherein the blade body has an exposed upper surface extending along the top of the blade from the blade root to the blade tip between the leading edge and trailing edge, an exposed lower surface extending along the bottom of the blade from the blade root to the blade tip between the leading edge and trailing edge, the exposed upper surface is uniformly convex from the blade root to the blade tip, and the exposed lower surface is concave adjacent to the blade root.

34. The rotor blade of claim 33, wherein the convexity of the exposed lower surface is reduced as the lower surface transitions from the blade root to the blade tip.

35. A rotor system for use on a rotary wing aircraft having a first rotor blade extending radially from a rotor hub and supported for rotation about a rotor rotation axis by a rotor shaft to rotate in a rotor blade plane of rotation substantially perpendicular to the rotor shaft and generate a lift force, the first rotor blade having a first rotor blade tip situated in spaced apart relation to the rotor hub at the distal end of the first rotor blade and a first rotor blade span measured as the radial distance from the rotor axis of rotation to the first rotor blade tip, and the rotor system has a second rotor blade supported for rotation about the rotor rotation axis to generate a lift force, the second rotor blade having a second blade root adjacent to the rotor hub, a second rotor blade tip situated in spaced apart relation to the rotor hub at the distal end of the second rotor blade, a second rotor blade span measured as the radial distance from the rotor axis of rotation to the second blade tip, and the rotor blade span of the second rotor blade is less than about half of the blade span of the first rotor blade.

36. The rotor system of claim 35, wherein the second rotor blade is mounted to pivot about a second rotor pivot rod defining a second rotor blade pitch axis extending through the second blade tip and perpendicular to the rotor rotation axis, and the second rotor blade extends inward from the second rotor blade tip to a point adjacent to the rotor hub and encloses substantially the entire pivot rod extending from the rotor hub.

37. The rotor system of claim 35, wherein the first rotor blade is pitchable about a first pitching axis extending radially away from the rotor hub and through the first blade tip, the second rotor blade is pivotably mounted to flap about a second rotor flapping axis substantially perpendicular to the rotor axis of rotation and the second rotor blade is linked to the first rotor blade, and flapping of the second rotor blade generates a second rotor control input to the first rotor blade causing the first rotor blade to change pitch about the first pitching axis.

38. The rotor system of claim 37, further including a pilot control system for controlling the first rotor blade, and the pilot control system is linked to the second rotor blade so that pilot control inputs are combined with second rotor control inputs to control the pitch of the first rotor blade.

39. The main rotor of claim 1, wherein at least one of the first and second main rotor blades is made of a plastics material having a specific gravity of about 1.0 to 1.3, dry tensile-strength in the range of 5,000 to 12,000 psi, flexural modulus in the range of 250,000 to 500,000 psi, and ultimate elongation in the range of 25% to 200%.

40. The main rotor of claim 1, wherein at least one of the first and second main rotor blades is made of a plastics material that is one of nylon, ABS, and polycarbonate plastics.

41. The main rotor blade of claim 2, wherein the main rotor blade is adapted to cooperate with another main rotor blade to define a main rotor blade assembly that includes a main rotor blade assembly diameter, the inboard section chord length is about 7% to 10% of the main rotor blade assembly diameter, and the outboard section chord length is about 3% to 6% of the main rotor blade assembly diameter.

42. The main rotor blade of claim 2, wherein the outboard section included angle is about 6 to 12 degrees less than the inboard section included angle.

43. The main rotor blade of claim 42, wherein the main rotor blade is adapted to cooperate with another main rotor blade to define a main rotor blade assembly that includes a main rotor blade assembly diameter, the inboard section chord length is about 7% to 10% of the main rotor blade assembly diameter, and the outboard section chord length is about 3% to 6% of the main rotor blade assembly diameter.

44. The main rotor blade of claim 8, wherein the blade body is made of a plastics material having a specific gravity of about 1.0 to 1.3, dry tensile-strength in the range of 5,000 to 12,000 psi, flexural modulus in the range of 250,000 to 500,000 psi, and ultimate elongation in the range of 25% to 200%.

45. The main rotor blade of claim 8, wherein the blade body is made of a plastics material that is one of nylon, ABS, and polycarbonate plastics.

46. The main rotor of claim 12, wherein each of the first and second stabilizer rotor blades include an inner edge facing toward the main rotor shaft and an outer edge facing away from the main rotor shaft and the inner edge of each of the first and second stabilizer rotor blades is adjacent to the main rotor shaft.

47. The main rotor of claim 46, wherein the pitching means is adjacent to the main rotor shaft.

48. The main rotor of claim 13, wherein the stabilizer pivot rod has a first end and a second end, the first end of the stabilizer pivot rod extends into the stabilizer pivot rod-receiving channel of the first stabilizer rotor blade, the second end of the stabilizer pivot rod extends into the stabilizer pivot rod-receiving channel of the second stabilizer rotor blade, and the first and second stabilizer rotor blades entrap the stabilizer pivot rod and cooperate to prevent the stabilizer pivot rod from being ejected from the main rotor as the main rotor rotates about the main rotor axis of rotation.

49. The main rotor of claim 48, wherein the stabilizer pivot rod is made of music wire.

50. The system of claim 16, wherein the interchangeable main rotor element sets include a first rotor blade having a first steady-state pitch angle relative to the main rotor shaft and a second rotor blade having a second steady-state pitch angle relative to the main rotor shaft and the first steady-state pitch angle is different from the second steady-state pitch angle.

51. The rotor blade of claim 18, wherein rotor blade is made of a plastics material that is chromo-thermic in nature and sensitive to changes in temperature and the plastics material changes color as the air temperature drops thereby providing a visual indication of the lowered temperature of the rotor blade.

52. The rotor blade of claim 18, further including a structural component which primarily contributes stiffness and tensile strength to the rotor blade and a shape component made of a plastics material which primarily contributes an aerodynamic shape of the rotor blade.

53. The rotor blade of claim 52, wherein the plastics material is one of nylon, ABS, and polycarbonate plastics.

54. The rotor blade of claim 52, wherein the plastics material has a specific gravity of about 1.0 to 1.3, dry tensile-strength in the range of 5,000 to 8,000 psi, flexural modulus in the range of 20,000 to 100,000 psi, and ultimate elongation in the range of 200% to 500%.

55. The rotor blade of claim 52, wherein the plastics material is thermoplastic urethane.

56. The rotor blade of claim 52, wherein the plastics material is a reaction-injection-molded plastics material such as reaction-injection-molded urethane.

57. The rotor blade of claim 52, wherein the structural component is manufactured in an injection-molding operation and the shape component is formed and appended to the structural component in an insert molding operation.

58. The rotor blade of claim 26, wherein the inboard airfoil camber is about 4% to 7% of the inboard airfoil chord length, the inboard airfoil thickness is about 4% to 8% of the inboard airfoil chord length, the outboard airfoil camber is about 0% to 4% of the outboard airfoil chord length, and the outboard airfoil thickness is about 8% to 11% of the outboard airfoil chord length.

59. The rotor blade of claim 27, wherein the inboard airfoil camber is about 4% to 7% of the inboard airfoil chord length, the outboard airfoil camber is about 0% to 4% of the outboard airfoil chord length, and the outboard airfoil steady-state pitch angle is about 6 to 12 degrees lower than the inboard airfoil steady-state pitch angle.

60. The main rotor of claim 28, wherein the rotor blade is made of a plastics material that is one of nylon, ABS and polycarbonate plastics.

61. The rotor blade of claim 31, wherein the inboard airfoil chord length is about 2 to 2.5 times longer than the outboard airfoil chord length.

62. The rotor blade of claim 34, further including a turbulator strip appended to one of the upper and lower surfaces at the inboard section.

63. The rotor system of claim 37, further including a third rotor blade diametrically opposed to the first rotor blade and essentially identical to the first rotor blade and a fourth rotor blade diametrically opposed to the second rotor blade and essentially identical to the second rotor blade, the fourth rotor blade being mounted to pivot about a fourth rotor blade pitch axis, flap about a fourth rotor blade flapping axis substantially perpendicular to the rotor axis of rotation, and link to the third rotor blade, flapping of the fourth rotor blade generates a rotor control input to the third rotor blade causing the third rotor blade to change pitch about the third rotor blade pitching axis, and the second and fourth rotor blades are pitchable independently to vary the collective pitch of the second and fourth rotor blades.

64. A main rotor for use on a model helicopter, the main rotor comprising a main rotor shaft rotatable about a main rotor rotation axis, first and second main rotor blades linked to the main rotor shaft to extend radially outward from and substantially perpendicular to the main rotor shaft and to rotate with the main rotor shaft in a steady-state main rotor blade plane of rotation when the main rotor blade plane of rotation is perpendicular to the main rotor rotation axis, and a mechanism configured to pitch the first and second main rotor blades about first and second main rotor blade pitching axes, respectively, each of the first and second main rotor blades including a blade root linked to the main rotor shaft, a blade tip spaced apart from the blade root, a leading edge, a trailing edge spaced apart from the leading edge, a plurality of chord lines extending in a straight line between the leading edge and the trailing edge perpendicular to the first and second main rotor blade pitching axes, an inboard section situated adjacent to the blade root, and an outboard section situated adjacent to the blade tip, the inboard section having a first steady-state angle-of-attack defined as an included angle between one of the plurality of chord lines in the inboard section and the main rotor blade plane of rotation and the outboard section having a second steady-state angle-of-attack defined as an included angle between one of the plurality of chord lines in the outboard section and the main rotor blade plane of rotation, the first steady-state angle-of-attack being greater than the second steady-state angle-of-attack, wherein the one of the plurality of chord lines in the inboard section includes a first length and the one of the plurality of chord lines in the outboard section includes a second length that is shorter than the first length and wherein the inboard section includes a cupped-shaped cross-section between the trailing edge and the leading edge and the outboard section includes a flat cross-section between the trailing edge and the leading edge.

65. The main rotor of claim 64, wherein at least one of the first and second main rotor blades is made of a plastics material having a specific gravity of about 1.0 to 1.3, dry tensile-strength in the range of 5,000 to 12,000 psi, flexural modulus in the range of 250,000 to 500,000 psi, and ultimate elongation in the range of 25% to 200%.

66. The main rotor of claim 65, wherein at least one of the first and second main rotor blades is made of a plastics material that is one of nylon, ABS, and polycarbonate plastics.

67. A main rotor for use on a rotary wing aircraft, the main rotor comprising a main rotor shaft rotatable about a main rotor rotation axis, first and second main rotor blades linked to the main rotor shaft to rotate about the main rotor axis of rotation in a main rotor blade plane of rotation, a mechanism configured to pitch the first and second main rotor blades about first and second main rotor blade pitch axes, respectively, first and second stabilizer rotor blades linked to the main rotor shaft to rotate about the main rotor rotation axis in a steady-state stabilizer rotor blade plane of rotation when the stabilizer rotor blade plane of rotation is perpendicular to the main rotor rotation axis, the first and second stabilizer rotor blades being linked to the first and second main rotor blades to pitch the first and second main rotor blades about the first and second main rotor blade pitch axes, respectively, and a mechanism configured to pitch the first and second stabilizer rotor blades about first and second stabilizer rotor blade pitch axes, respectively, each of the first and second stabilizer rotor blades having a leading edge, a trailing edge spaced apart from the leading edge, and a plurality of chord lines extending from the leading edge to the trailing edge perpendicular to the first and second stabilizer rotor blade pitch axes, at least one of the plurality of chord lines of the first and second stabilizer rotor blades being oriented to situate the leading edge above the steady-state stabilizer rotor plane of rotation and the trailing edge below the steady-state stabilizer rotor plane of rotation so that the steady-state stabilizer rotor plane of rotation is between the leading edge and the trailing edge.

* * * * *